(12) United States Patent
Cooke et al.

(10) Patent No.: US 7,945,136 B2
(45) Date of Patent: May 17, 2011

(54) MOUNTING OF FIBER OPTIC CABLE ASSEMBLIES WITHIN FIBER OPTIC SHELF ASSEMBLIES

(75) Inventors: Terry L. Cooke, Hickory, NC (US); David L. Dean, Jr., Hickory, NC (US); Tory A. Klavuhn, Newton, NC (US); Harley J. Staber, Coppell, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 12/488,443

(22) Filed: Jun. 19, 2009

(65) Prior Publication Data

US 2010/0322578 A1 Dec. 23, 2010

(51) Int. Cl.
*G02B 6/00* (2006.01)
(52) U.S. Cl. ...................................... 385/135
(58) Field of Classification Search ........... 385/134–137
See application file for complete search history.

(56) References Cited

U.S. PATENT DOCUMENTS

| | | | | |
|---|---|---|---|---|
| 5,689,607 A | * | 11/1997 | Vincent et al. | 385/136 |
| 5,956,439 A | * | 9/1999 | Pimpinella | 385/16 |
| 6,278,831 B1 | | 8/2001 | Henderson et al. | 385/139 |
| 6,687,450 B1 | | 2/2004 | Kempeneers et al. | 385/135 |
| 6,809,258 B1 | * | 10/2004 | Dang et al. | 174/50 |
| 7,200,316 B2 | | 4/2007 | Giraud et al. | 385/135 |
| 7,330,629 B2 | | 2/2008 | Cooke et al. | 385/136 |
| 7,764,858 B2 | * | 7/2010 | Bayazit et al. | 385/135 |
| 2002/0150372 A1 | * | 10/2002 | Schray | 385/135 |
| 2003/0174996 A1 | | 9/2003 | Henschel et al. | 385/135 |
| 2004/0013390 A1 | * | 1/2004 | Kim et al. | 385/135 |
| 2004/0208459 A1 | | 10/2004 | Mizue et al. | 385/92 |
| 2005/0111809 A1 | | 5/2005 | Giraud et al. | 385/135 |
| 2007/0031099 A1 | * | 2/2007 | Herzog et al. | 385/135 |
| 2008/0131068 A1 | | 6/2008 | Mertesdorf et al. | 385/135 |
| 2009/0060440 A1 | * | 3/2009 | Wright et al. | 385/135 |

FOREIGN PATENT DOCUMENTS

| | | |
|---|---|---|
| EP | 0490698 | 6/1992 |
| EP | 0544004 | 6/1993 |
| EP | 1041417 | 10/2000 |
| WO | WO 2008/063054 A2 | 5/2008 |

* cited by examiner

*Primary Examiner* — Daniel Petkovsek
(74) *Attorney, Agent, or Firm* — Michael E. Carroll, Jr.

(57) ABSTRACT

Fiber optic shelf assemblies and furcation mounting structures for securing a plurality of furcation bodies of respective fiber optic cable assembles within the fiber optic shelf are disclosed. In one embodiment, the fiber optic shelf has a one-to-one correspondence between a plurality of respective modules and the respective fiber optic cable assemblies. Additionally, the fiber optic shelf assemblies and furcation mounting structures disclosed advantageously allow the mounting of a relatively large number of furcation bodies within the fiber optic shelf assembly for supporting relatively large fiber optic connections per 1U rack space.

12 Claims, 46 Drawing Sheets

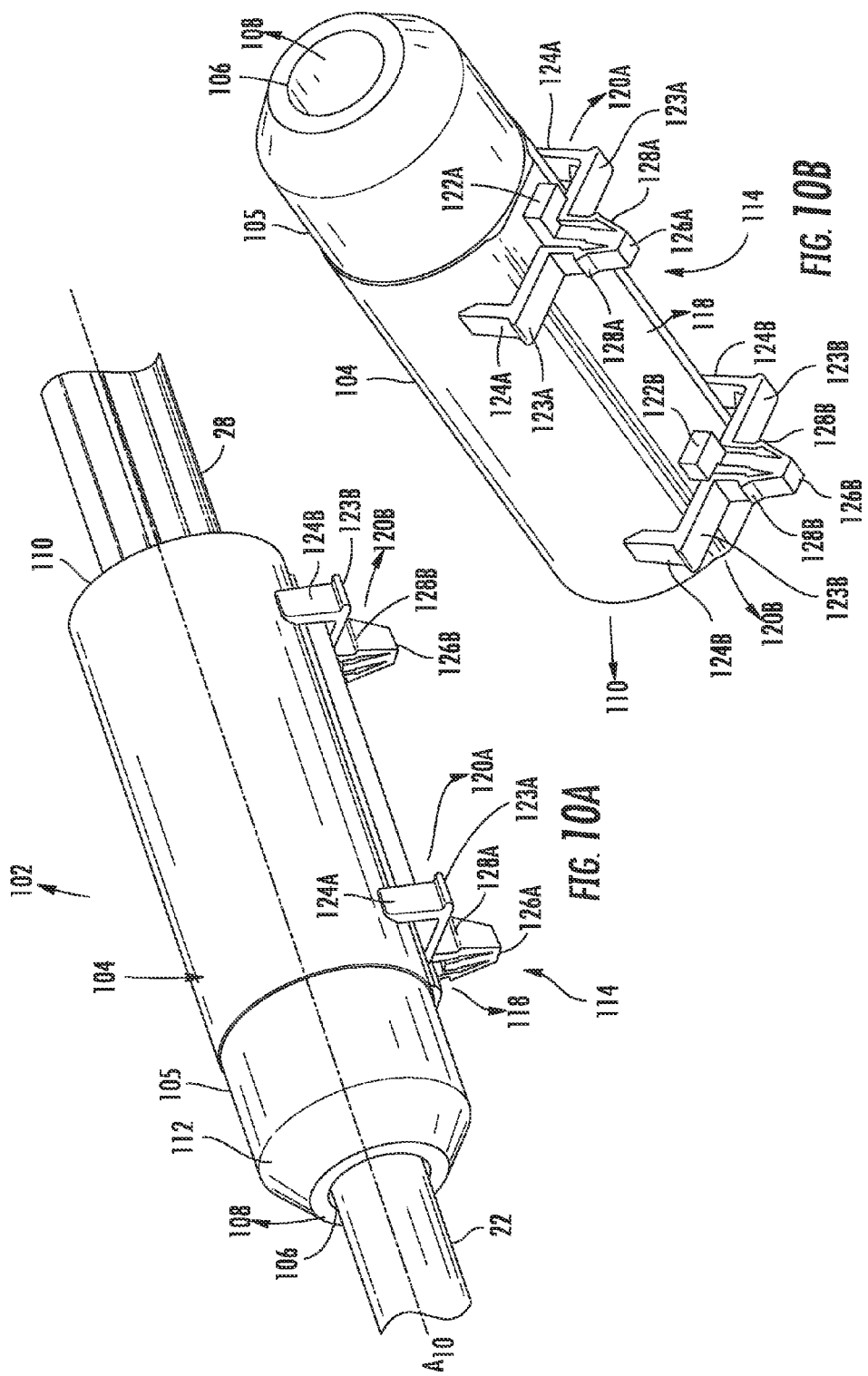

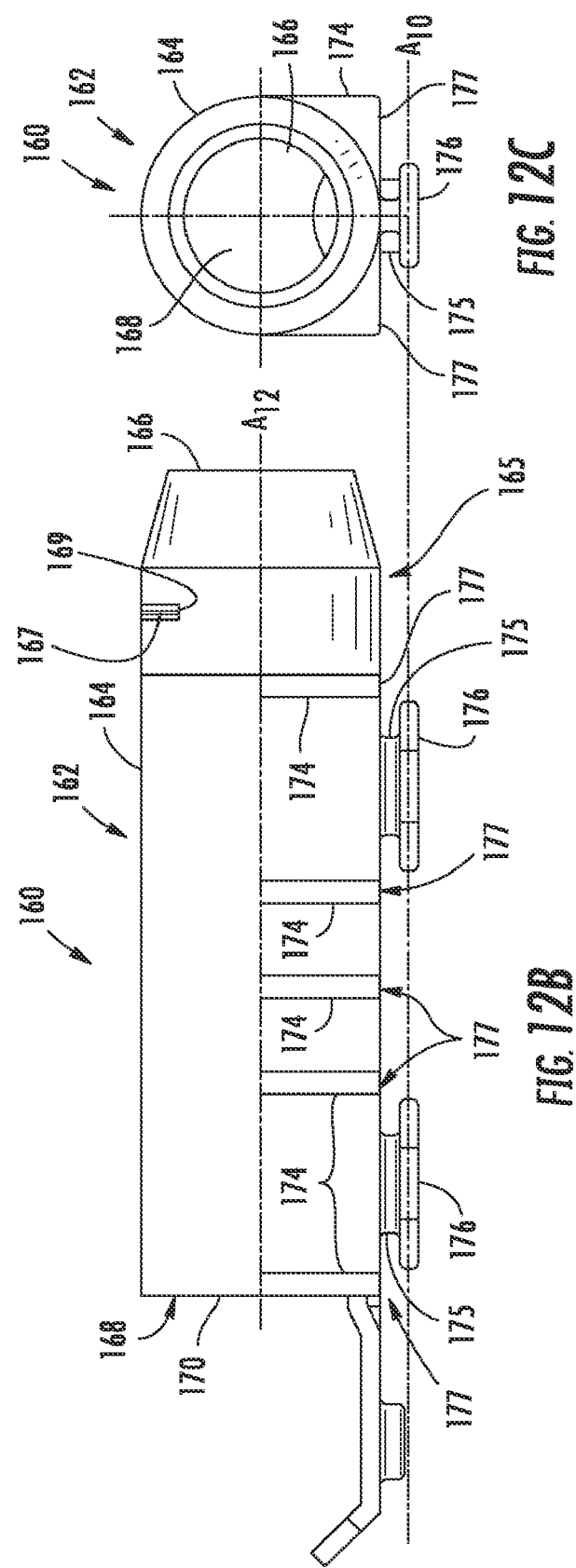

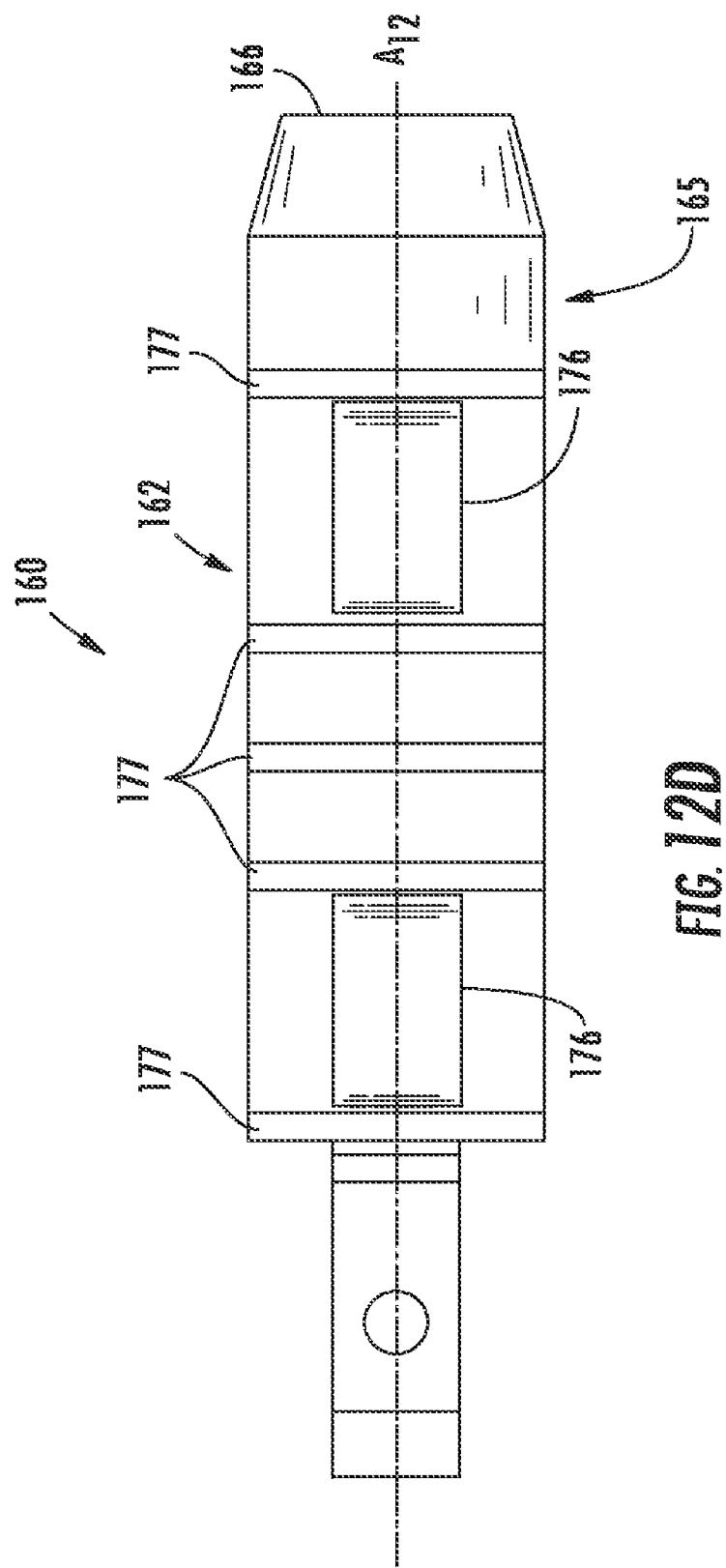

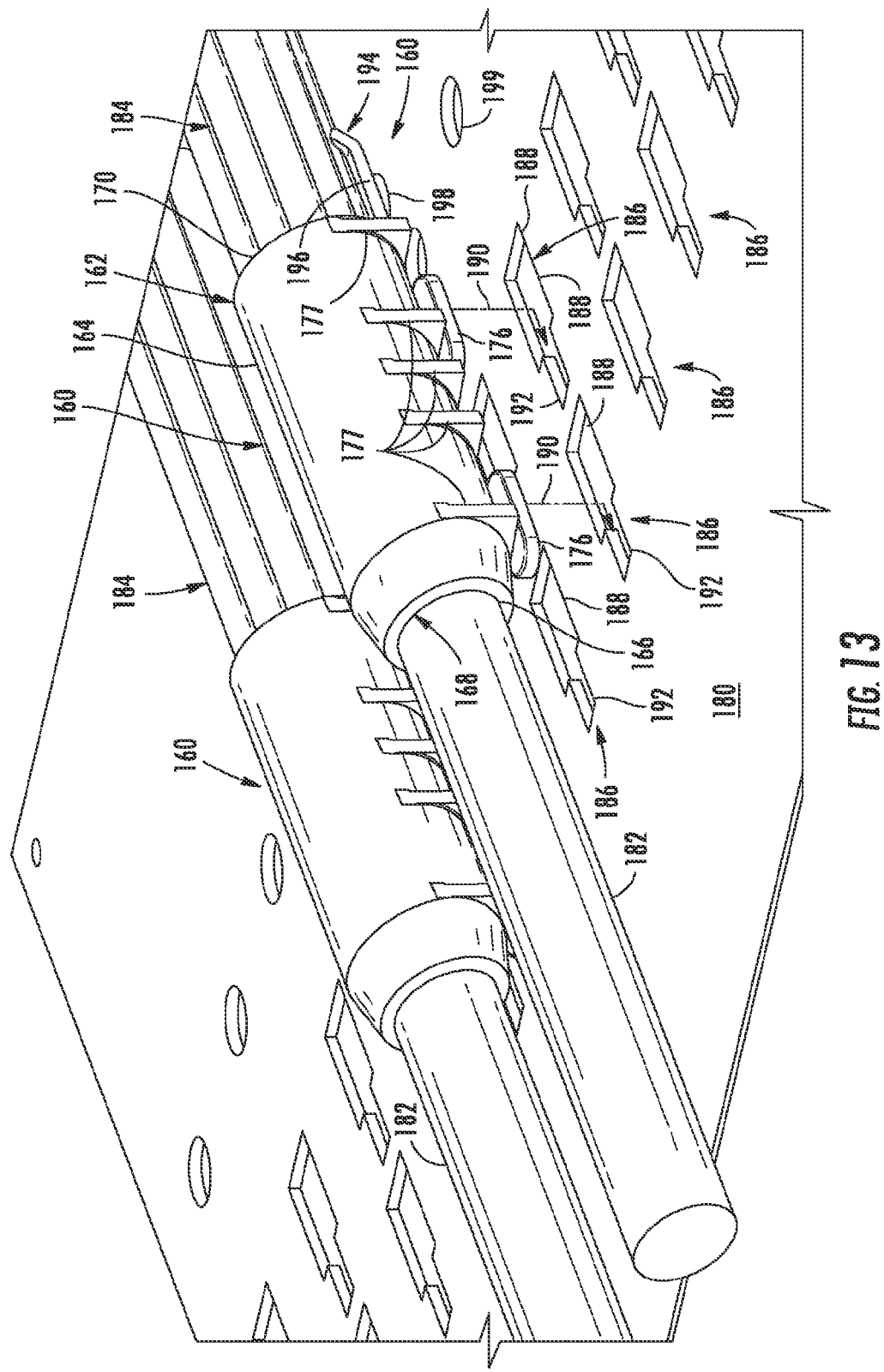

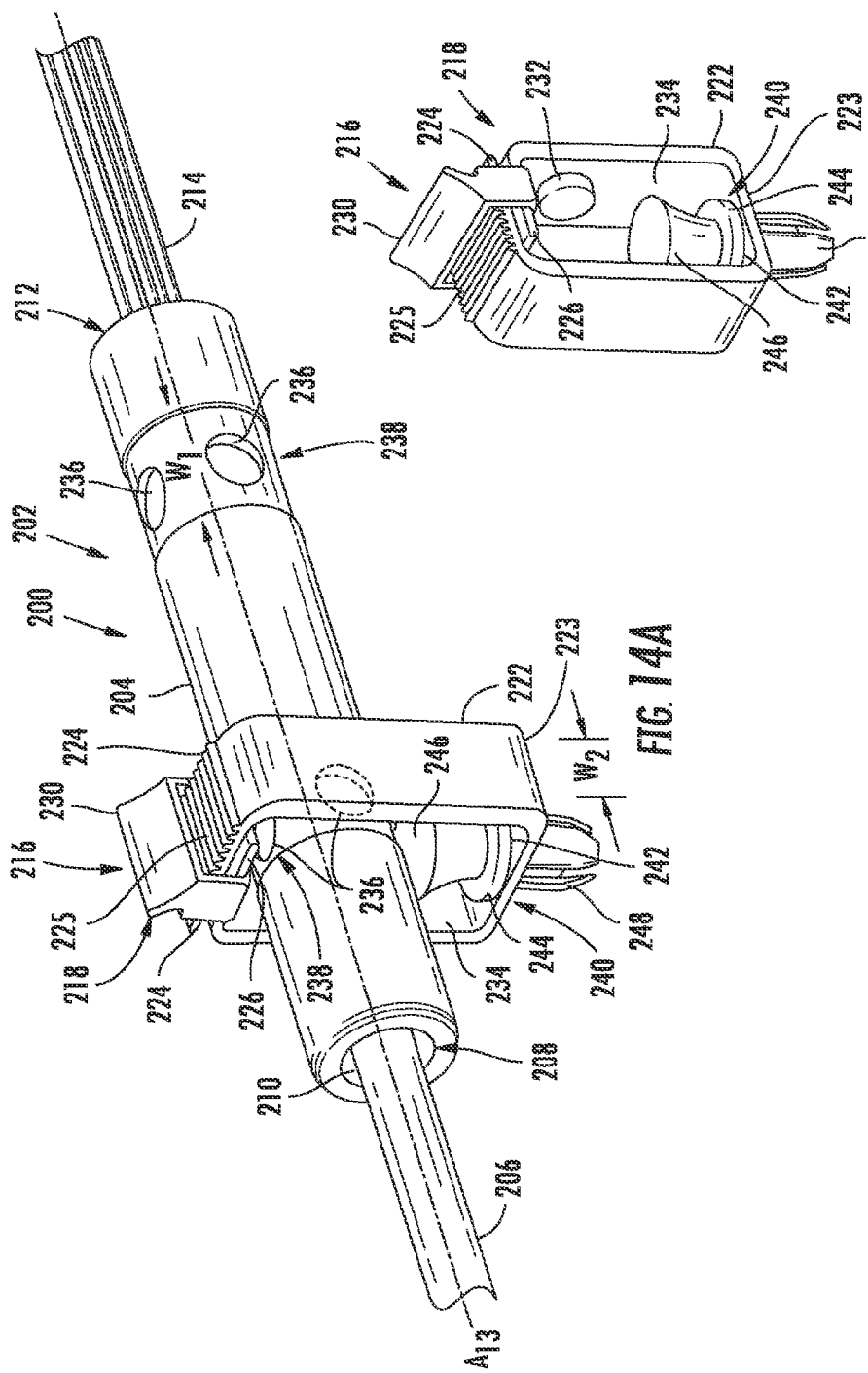

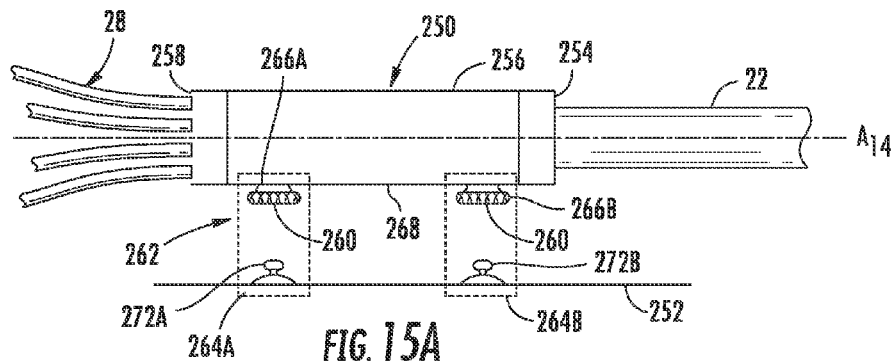
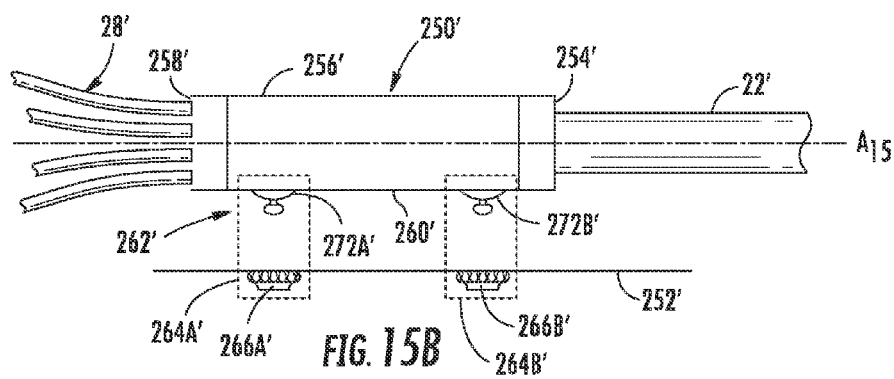
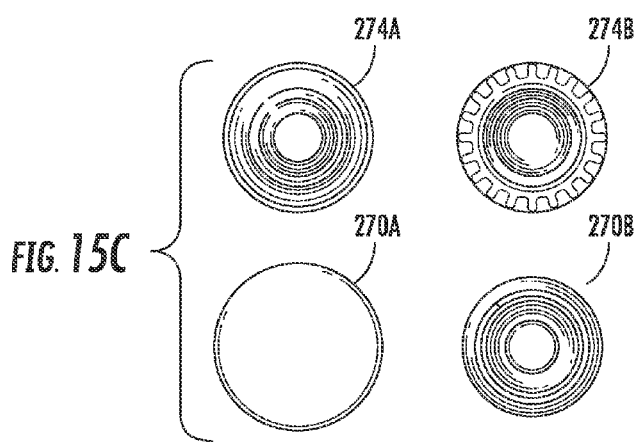

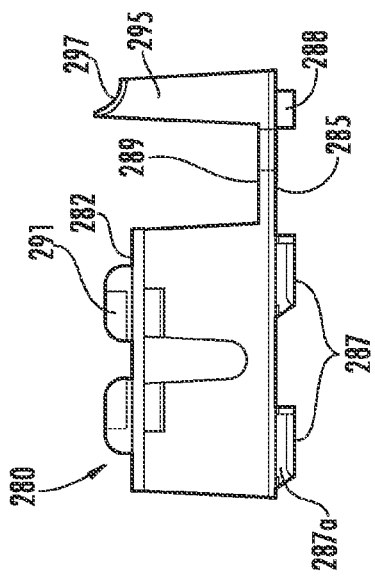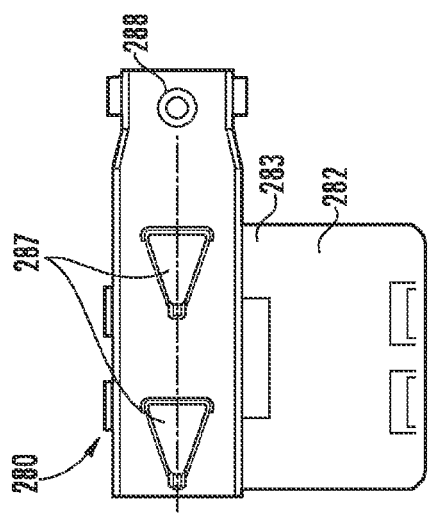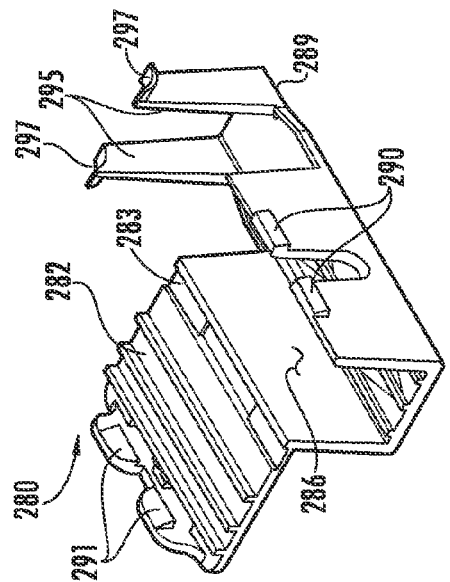

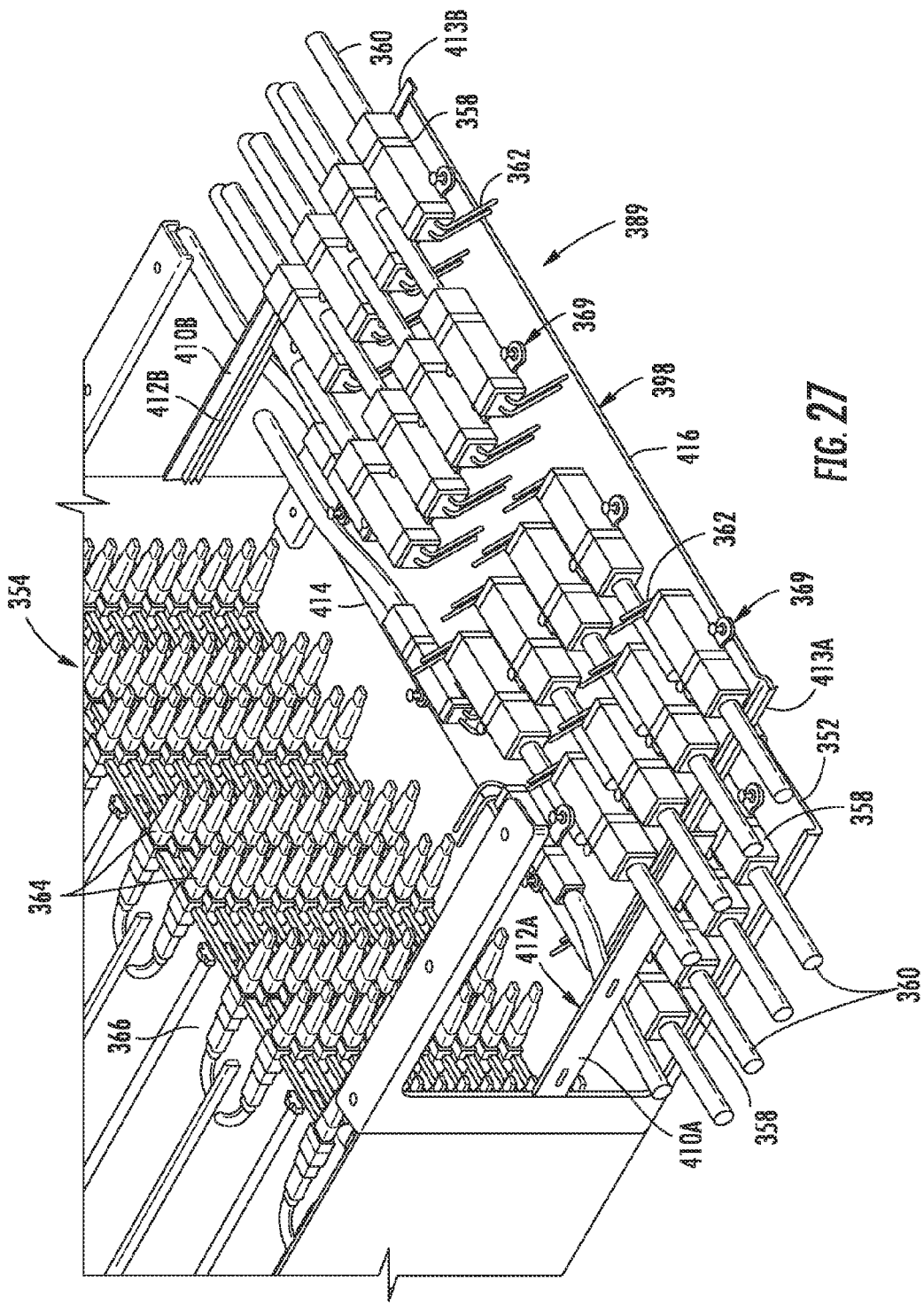

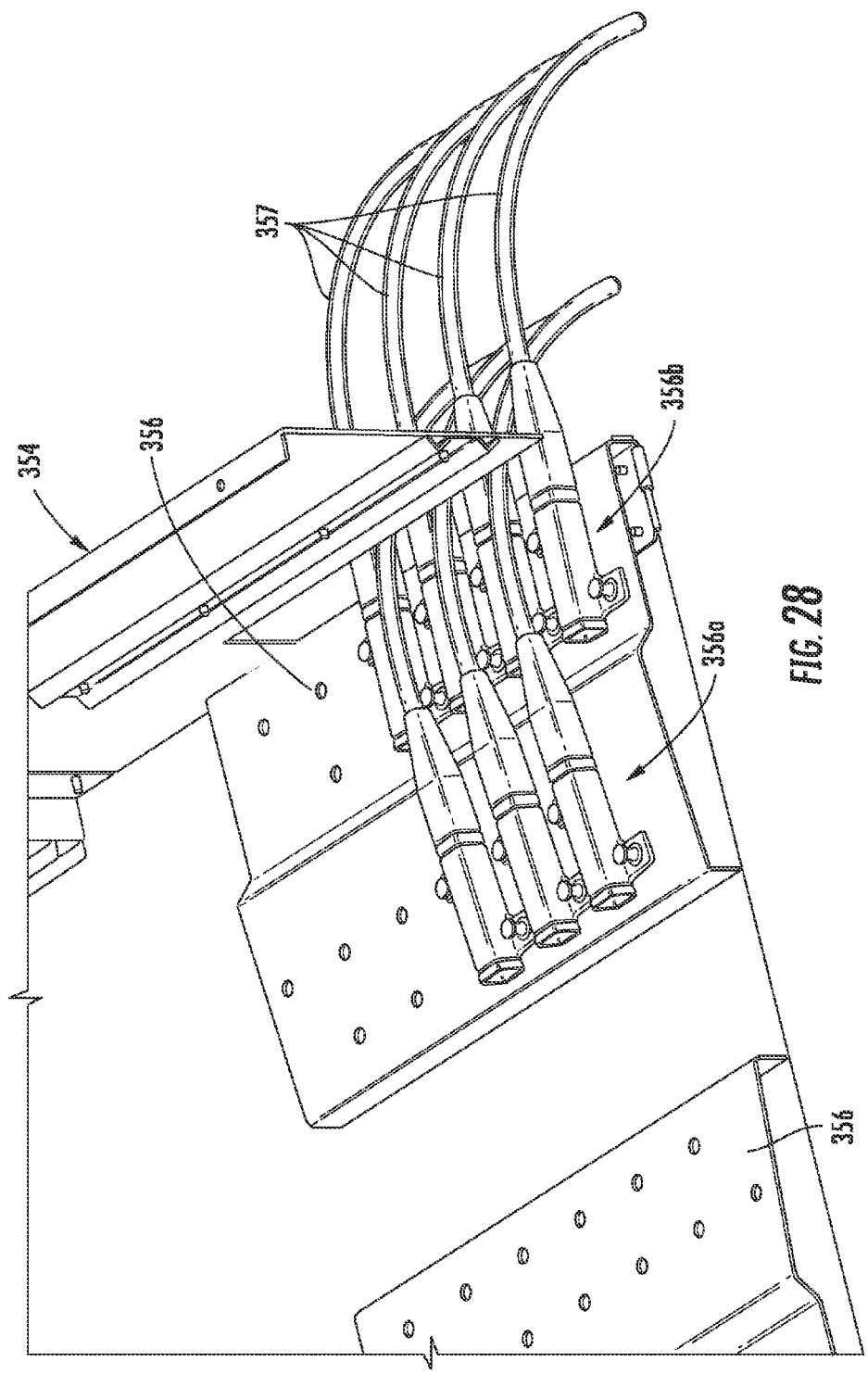

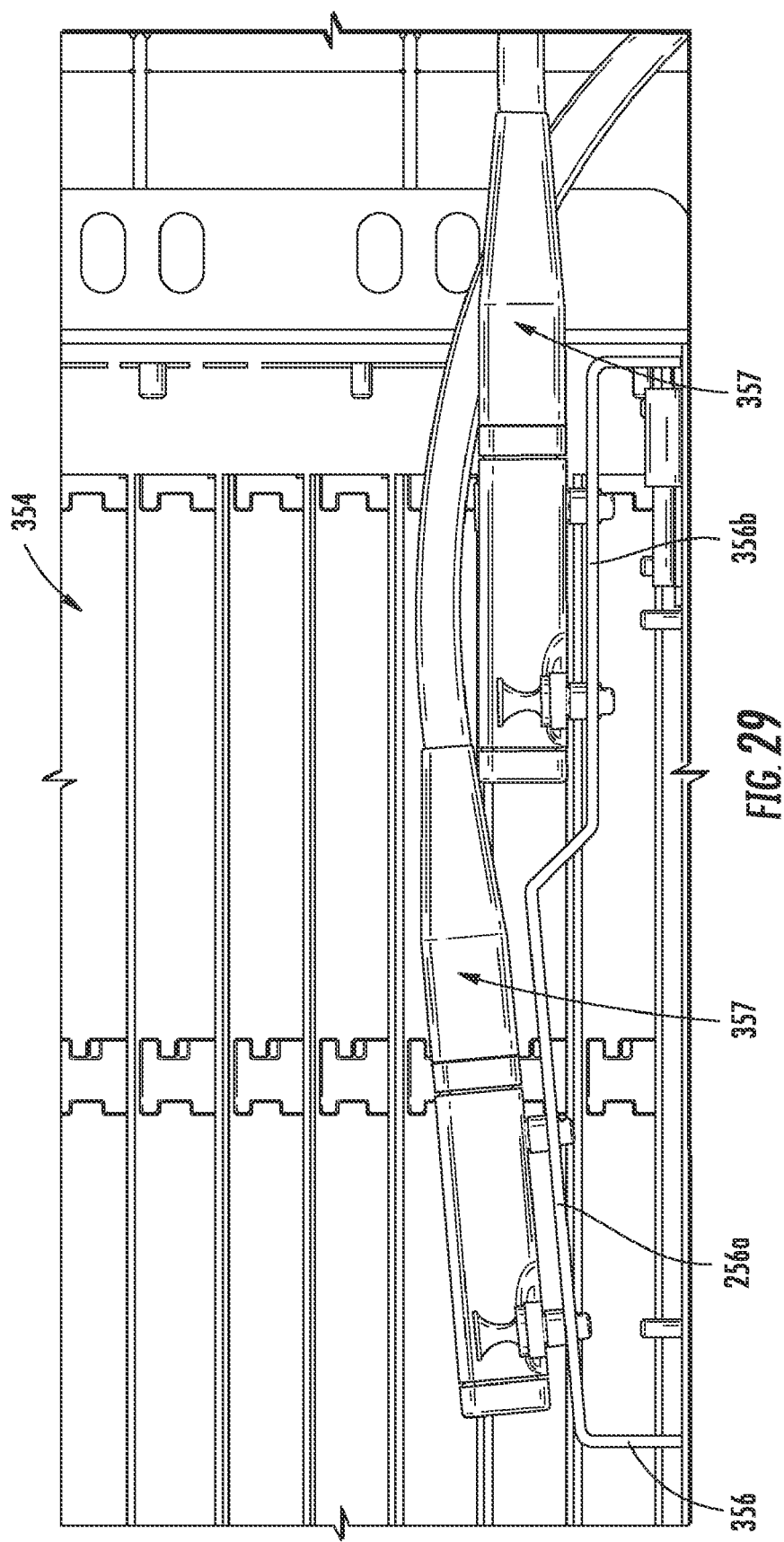

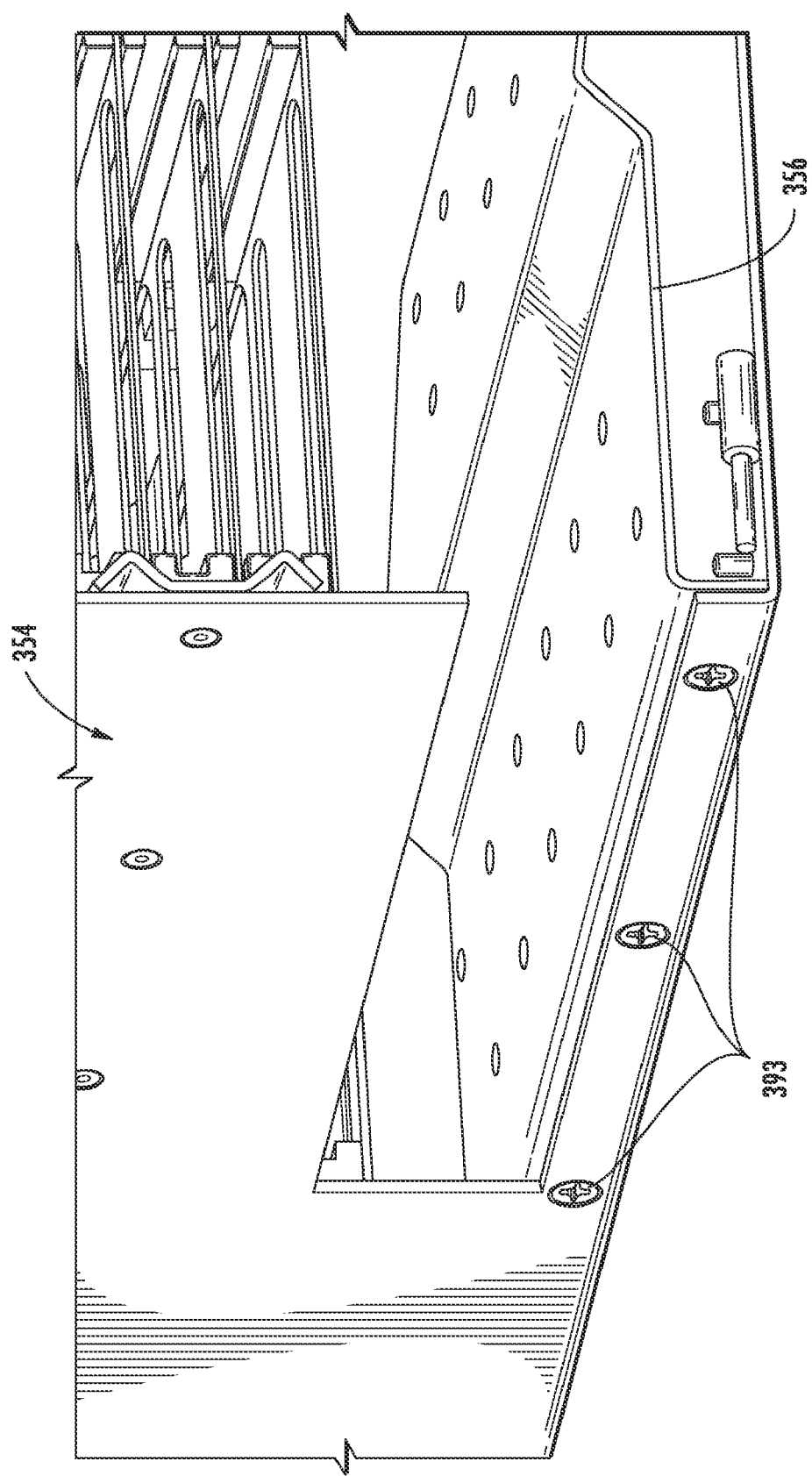

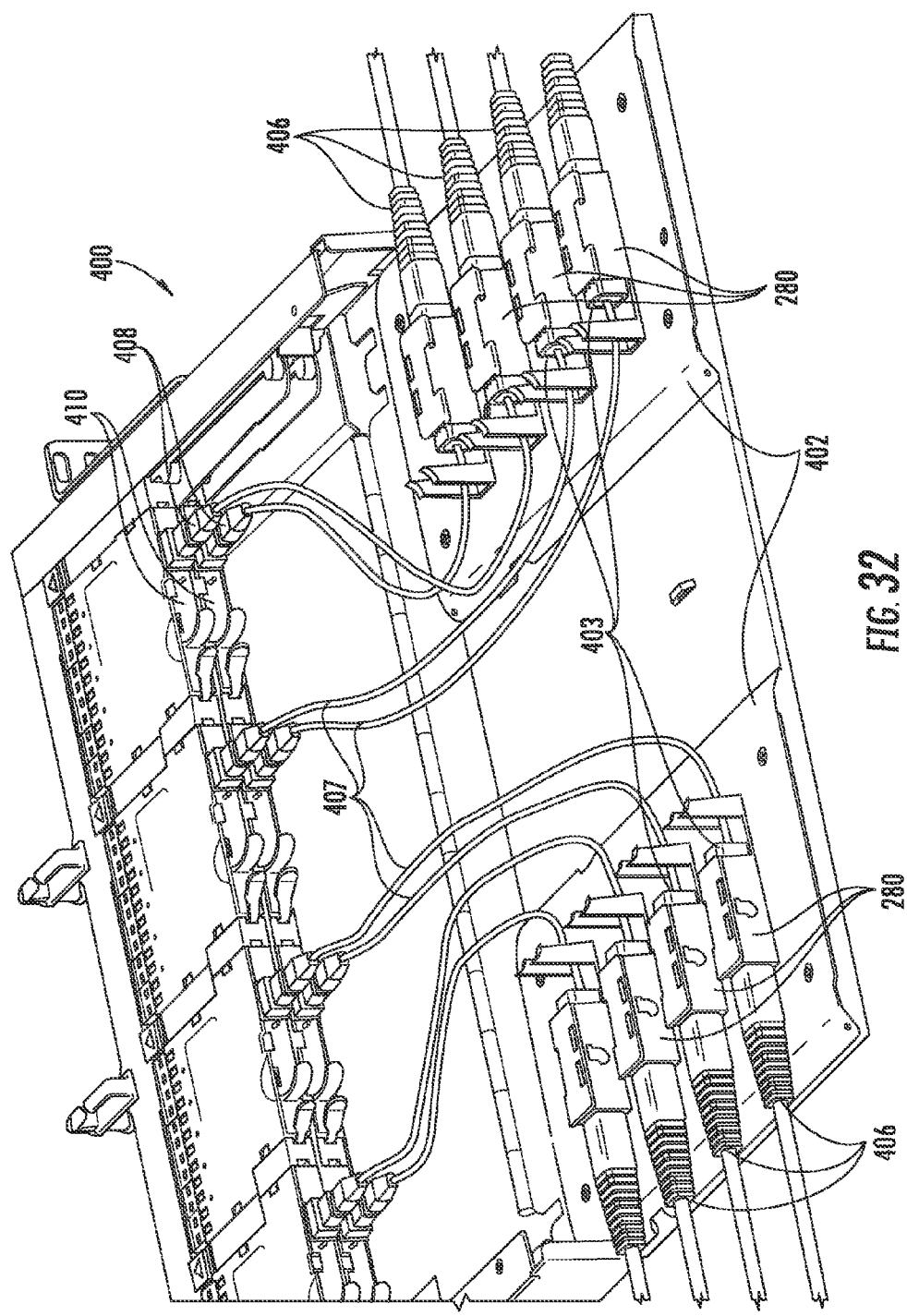

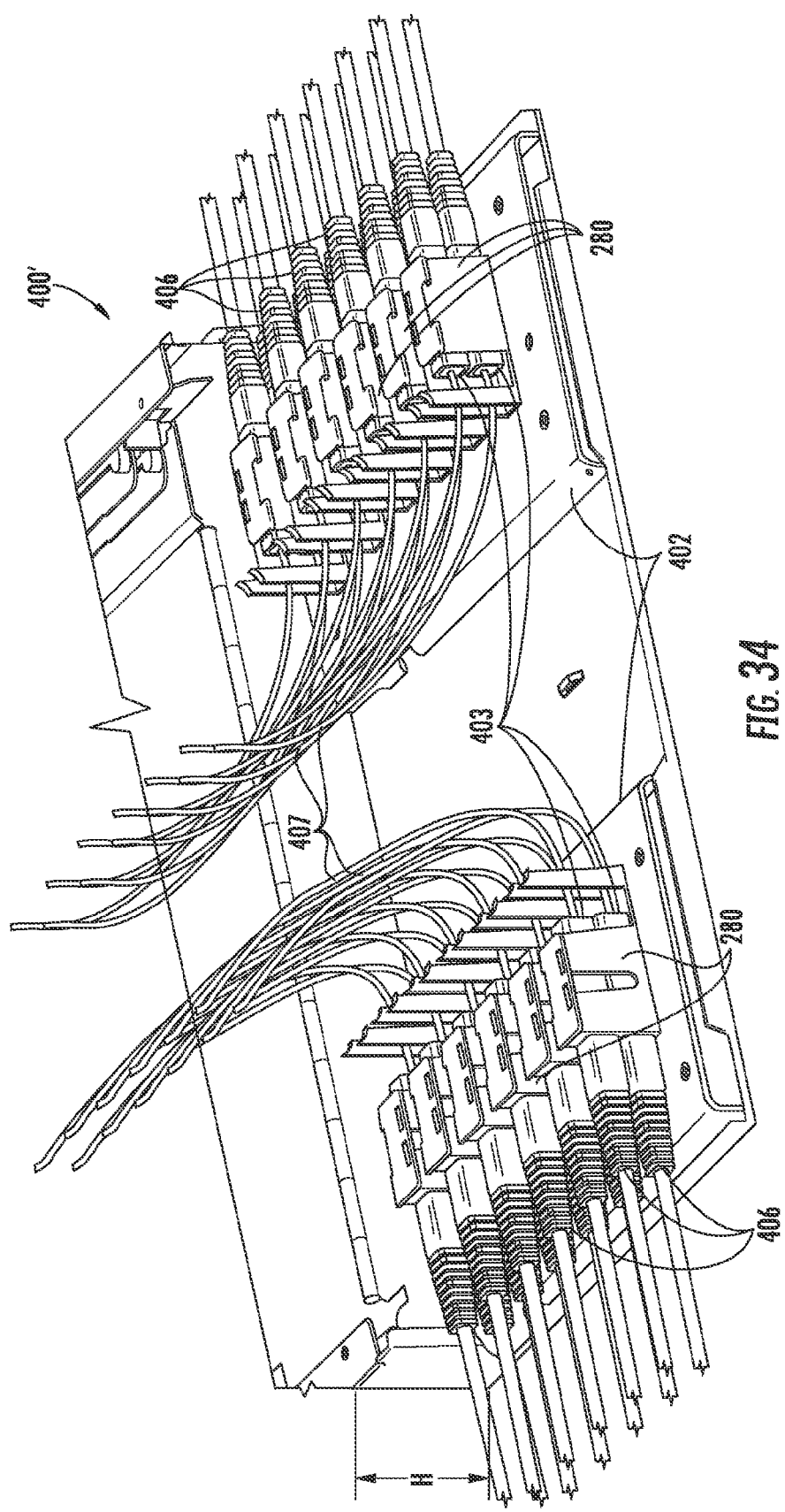

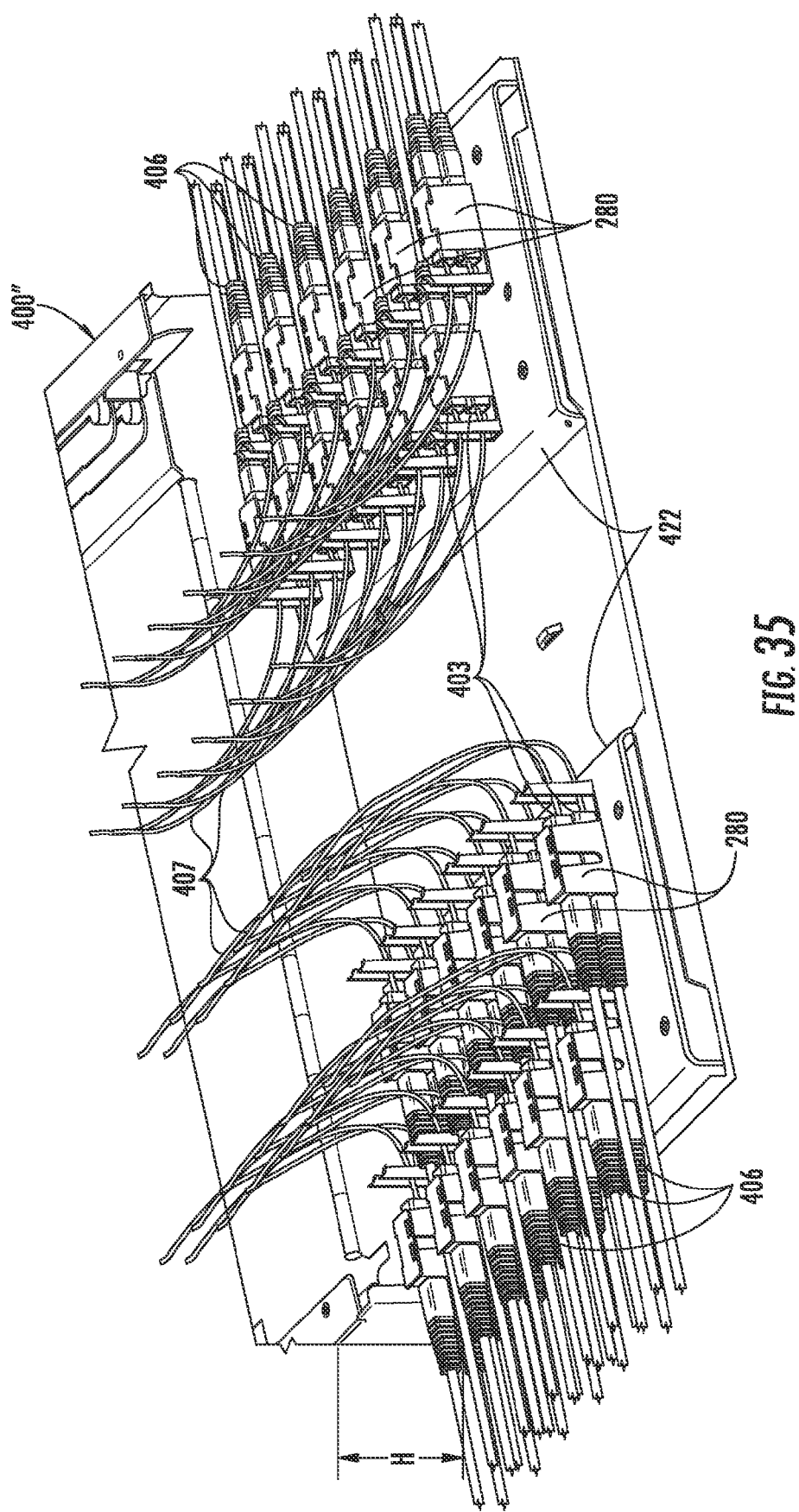

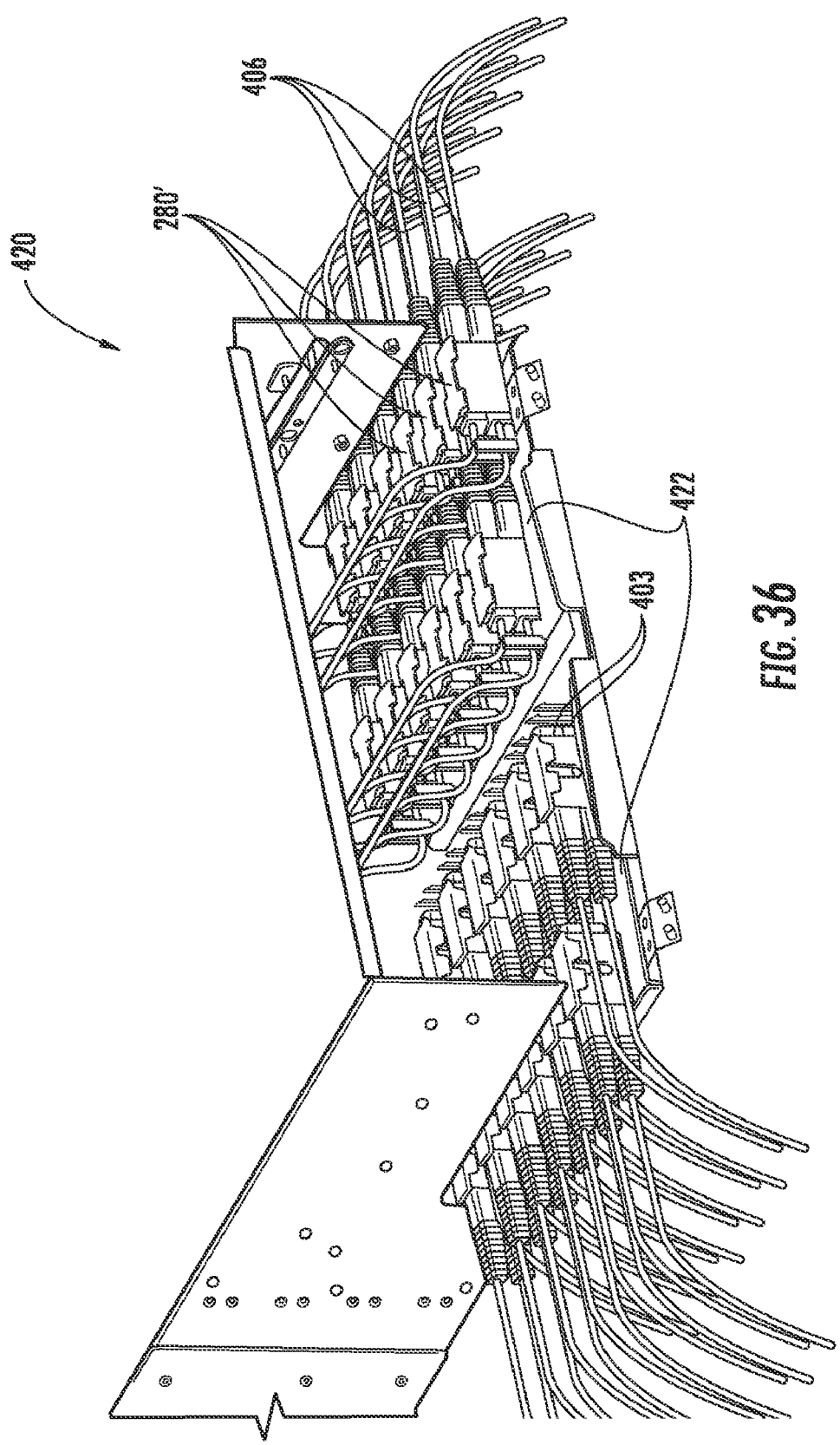

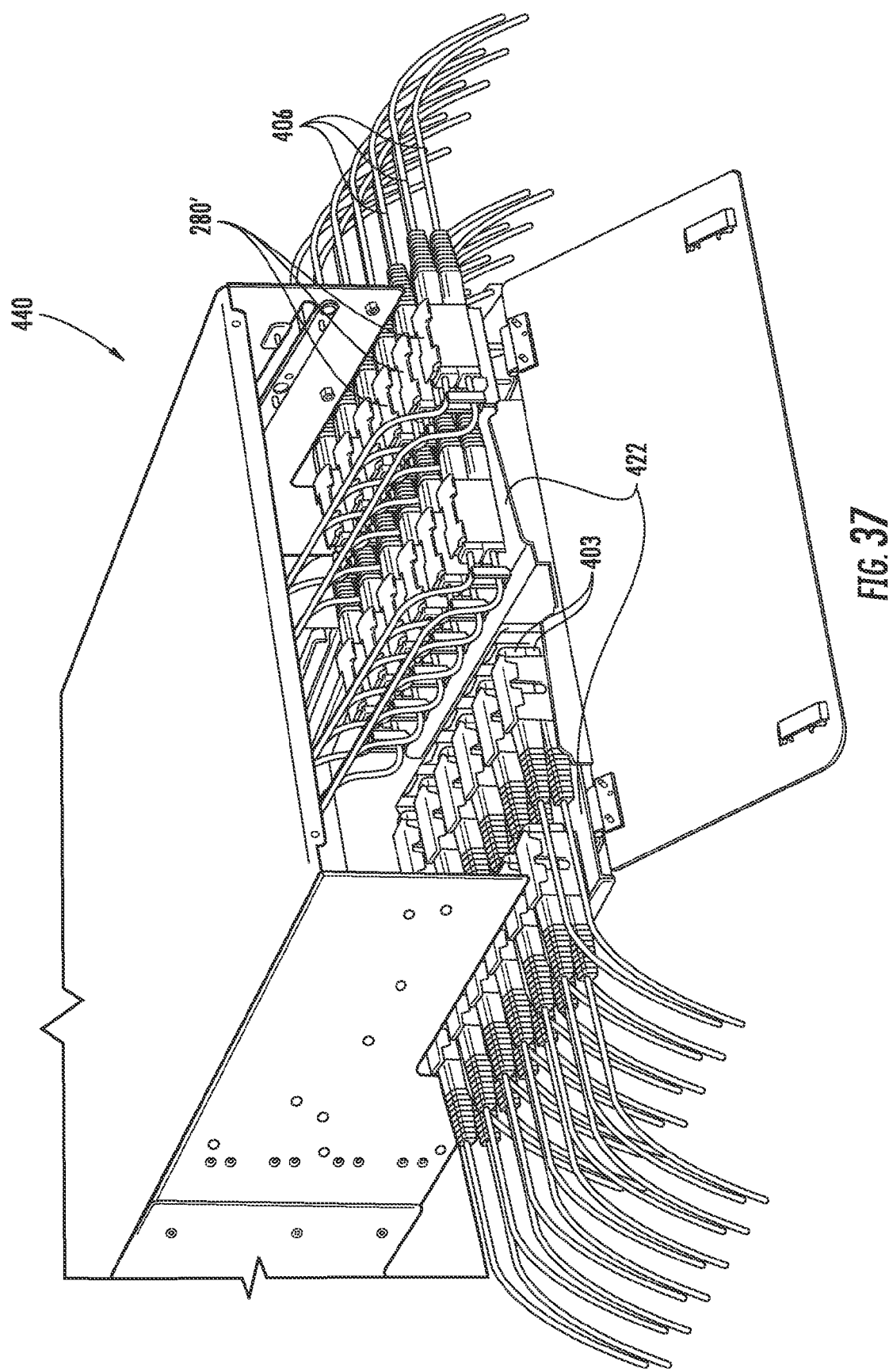

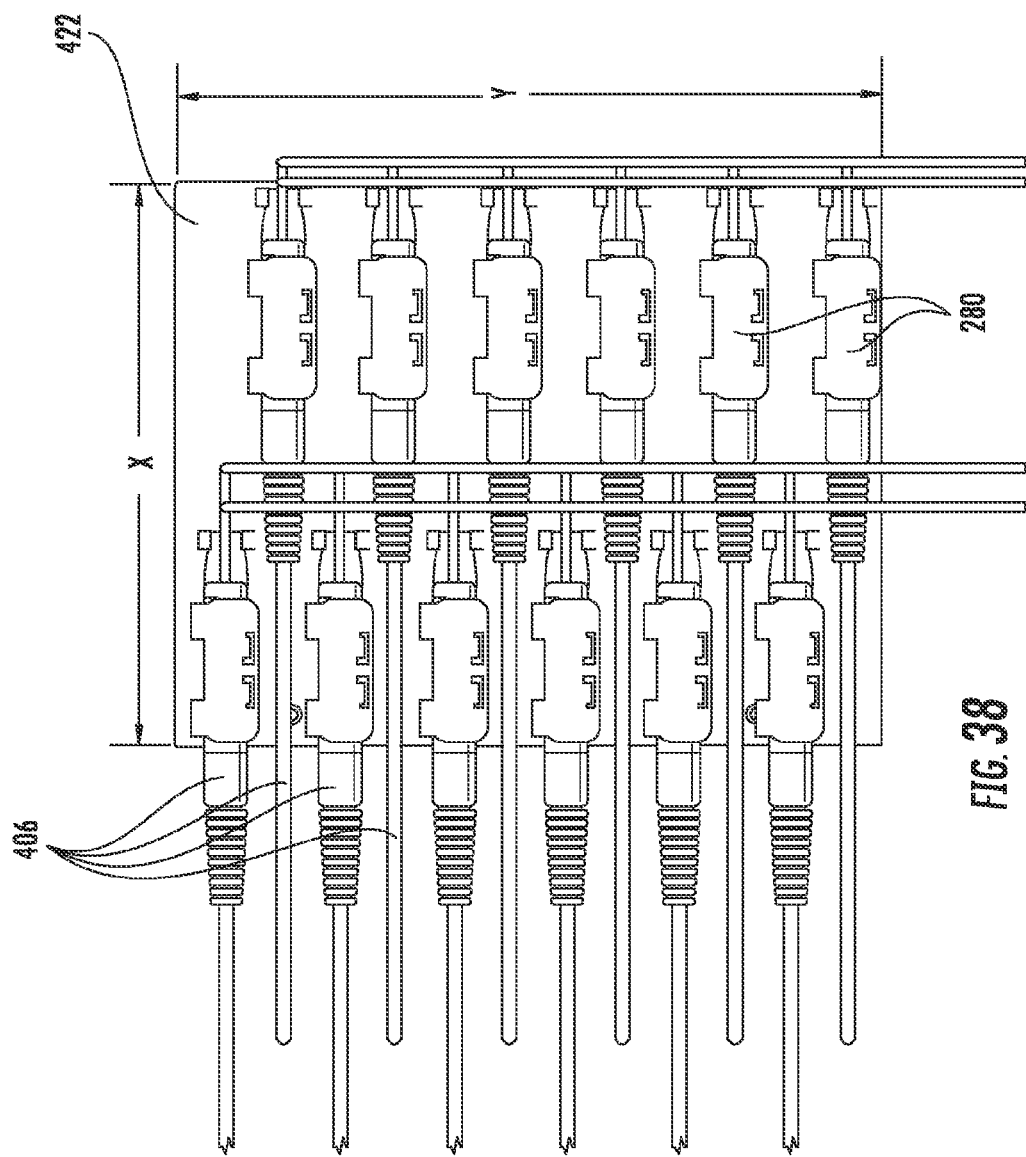

MOUNTING OF FIBER OPTIC CABLE ASSEMBLIES WITHIN FIBER OPTIC SHELF ASSEMBLIES

RELATED APPLICATIONS

The present application is related to co-pending U.S. patent application Ser. No. 12/487,929 filed on Jun. 19, 2009 and entitled "Clip For Securing a Fiber Optic Cable Assembly and Associated Assemblies" which is incorporated herein by reference in its entirety.

BACKGROUND

1. Field of the Disclosure

The technology of the disclosure relates to the mounting of fiber optic cable assemblies within fiber optic shelf assemblies and the like.

2. Technical Background

Benefits of optical fiber use include extremely wide bandwidth and low noise operation. Because of these advantages, optical fiber is increasingly being used for a variety of applications, including but not limited to broadband voice, video, and data transmission. As a result, fiber optic communications networks include a number of interconnection points at which multiple optical fibers are interconnected.

Fiber optic installations such as data centers, local-area networks (LAN) and the like route fiber optic cables to fiber optic equipment to establish optical connections. For instance, the fiber optic cables may be installed by pulling fiber optic cables to the equipment in cable runs under the floor, in the ceiling, or riser locations, etc. Preconnectorized fiber optic cable assemblies are typically furcated to separate out individual or groups of optical fibers for making optical connections at the fiber optic equipment. The cable assembly typically includes a furcation assembly near an end of the cable assembly where the optical fibers are split from the fiber optic cable. The furcation assembly includes a furcation body or plug that is usually secured such as on the outside of the housing for positioning, inhibiting damage, and strain relief. However, high-density fiber optic equipment designs may not be possible due to the inability of the fiber optic equipment to support a sufficient density of furcation assemblies.

Further, many of furcation assembly securing techniques can be simple fasteners, such tape, a Ty-Wraps®, or Velcro® as examples, and can be used to fasten the furcation assembly to the fiber optic equipment. However, these securing techniques may not be easily integrated into fiber optic equipment and/or not securely mount the furcation assembly. Also, if changes or reconfigurations of fiber optic cables or optical connections in already installed fiber optic equipment are necessary, it may be cumbersome to detach installed furcation assemblies and reattach them to the fiber optic equipment. Further, these securing techniques may affect the stability and strength of the furcation assembly attachment to fiber optic equipment, including the ability of the furcation plug to withstand lateral and rotational forces.

SUMMARY OF THE DETAILED DESCRIPTION

Disclosed are fiber optic shelf assemblies and furcation mounting structures for securing a plurality of furcation bodies of respective fiber optic cable assembles within the fiber optic shelf In one embodiment, the fiber optic shelf has a one-to-one correspondence between a plurality of respective modules and the respective fiber optic cable assemblies. By way of example, twelve furcation bodies of twelve respective fiber optic cable assemblies are secured within the fiber optic shelf and each fiber optic cable assembly is connected to a respective module. The concepts disclosed allow for securing relatively large numbers of furcation bodies within the fiber optic shelf assembly while advantageously allowing easy access, organization, and port mapping for the craft.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operation of the invention.

BRIEF DESCRIPTION OF THE FIGURES

FIGS. 10A and 10B illustrate side and bottom perspective views, respectively, of another exemplary fiber optic cable assembly;

FIGS. 12B-12D illustrate side, front, and bottom views, respectively, of the fiber optic cable assembly of FIG. 12A;

FIG. 13 illustrates multiple fiber optic cable assemblies of FIGS. 12A-12D installed on a mounting surface of a fiber optic shelf assembly;

FIGS. 14A and 14B respectively illustrate another exemplary fiber optic cable assembly and a securing device;

FIGS. 15A and 15B illustrate another exemplary fiber optic cable assembly;

FIG. 15C illustrates exemplary securing devices for the fiber optic cable assembly of FIGS. 15A and 15B;

FIGS. 16A-16C depicts various views of another clip for securing a fiber optic cable assembly;

FIG. 27 is a perspective view of the fiber optic shelf assembly of FIG. 26 with the intermediate furcation tray translated out from the fiber optic shelf assembly.

FIGS. 28-30 depict a various views of another alternate furcation management assembly mounted in a fiber optic shelf assembly.

FIG. 32 depicts a rear perspective view of a fiber optic shelf assembly having a plurality of furcation bodies of fiber optic cable assemblies secured therein.

FIG. 34-37 depict rear perspective views of various fiber optic shelf assemblies having a plurality of furcation bodies of fiber optic cable assemblies secured therein.

FIG. 38 depicts an explanatory furcation management structure for use in suitable fiber optic shelf assemblies.

DETAILED DESCRIPTION

Reference will now be made in detail to the preferred embodiments of the present invention, examples of which are illustrated in the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Certain embodiments disclosed in the detailed description include fiber optic cable assemblies having a fiber optic cable and a furcation body. Specifically, the fiber optic cable is received into the furcation body and furcated into one or more legs that exit the furcation body for routing to desired locations. An anti-rotation feature may be integrated into the furcation body for inhibiting rotation of the furcation body when mounted in or to fiber optic equipment. As used herein, "anti-rotation feature" means one or more generally planar surfaces disposed on the furcation body for abutting with at least one complementary planar mounting surface. An attachment feature which may be a separate component or integrated with the furcation body inhibits lateral movement and/or rotation of the furcation body when secured in position.

Figure 1A:
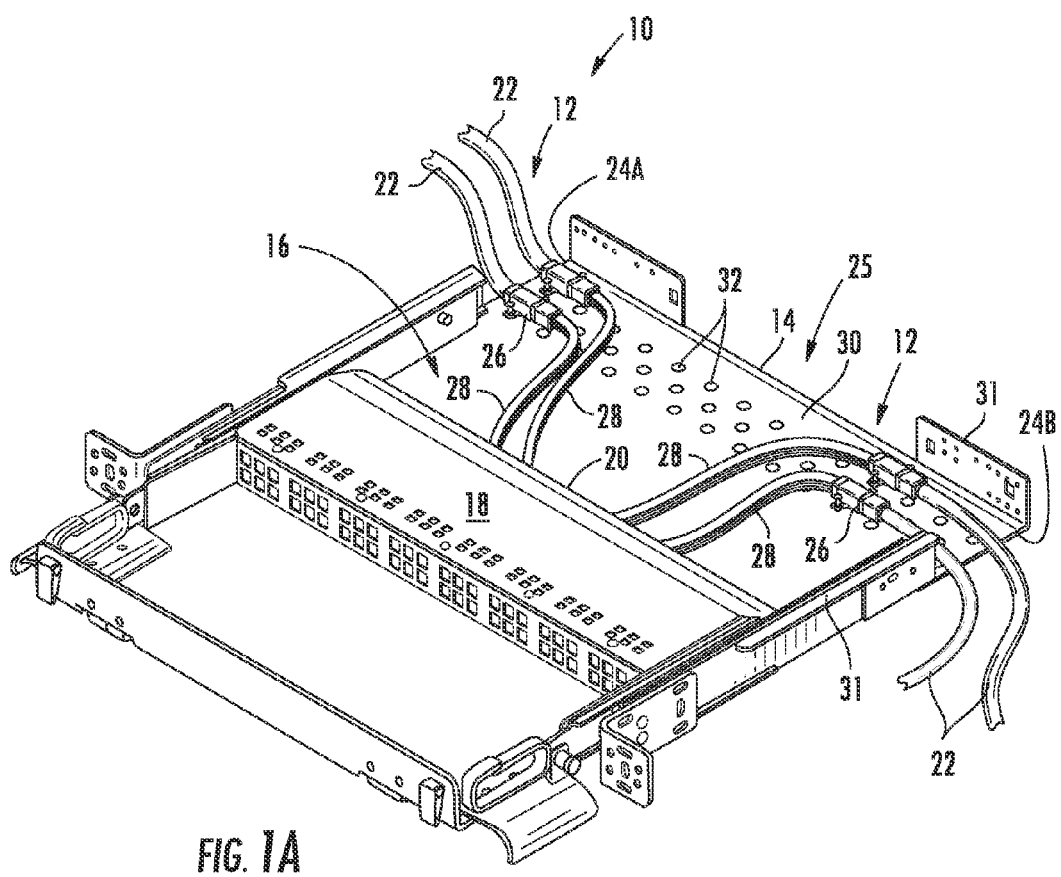
FIGS. 1A and 1B are perspective views of explanatory fiber optic cable assemblies secured to a mounting surface of an exemplary fiber optic shelf assembly.
Figure 1B:
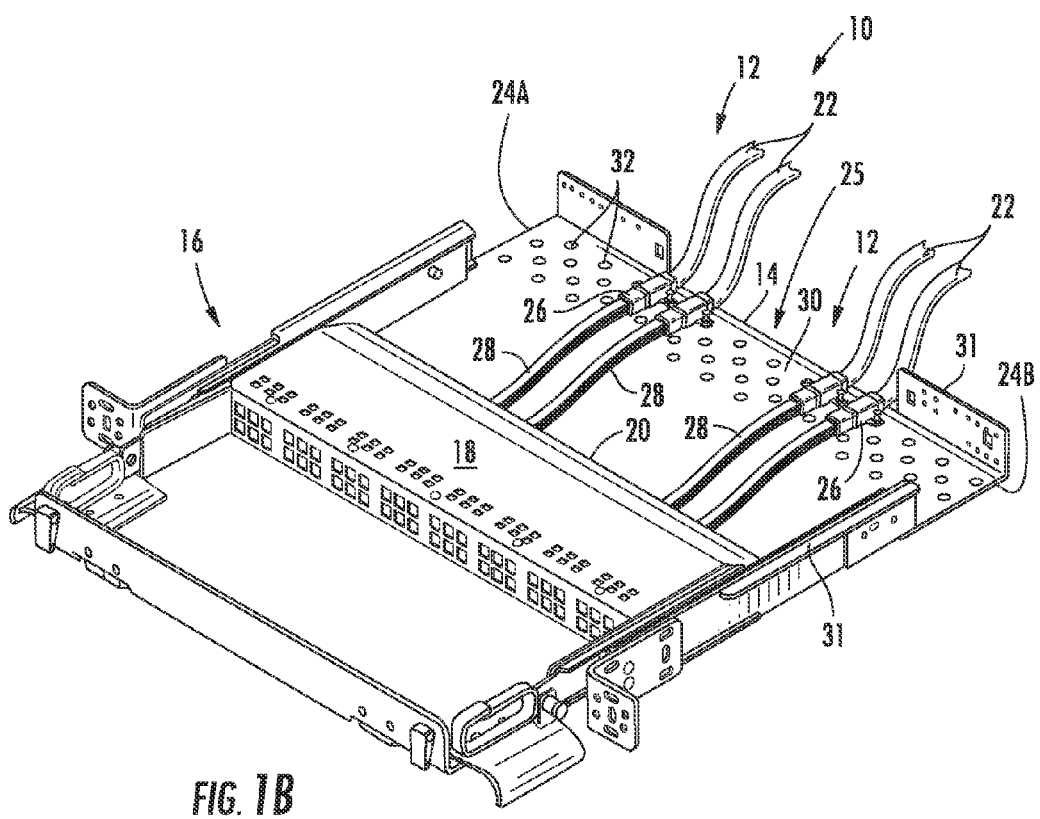

In this regard, FIGS. 1A and 1B illustrate front perspective views of explanatory fiber optic equipment in the form of a fiber optic shelf assembly 10. The fiber optic shelf assembly 10 allows mounting of one or more fiber optic cable assemblies 12 thereto. As used herein, fiber optic shelf assembly may be any suitable structure for mounting one or more fiber optic cable assemblies disclosed herein. Several fiber optic shelf assemblies, housings, or the like are typically mounted to an equipment rack (not shown), thereby creating a centralized location for fiber interconnections. As shown, fiber optic cable assemblies 12 are attached to the rear portion 14 of the fiber optic shelf assembly 10 in the form of a fiber optic tray 16. The fiber optic tray 16. In this example, the fiber optic tray 16 has a 1 U size (i.e., 1.75 inches in height) and supports a fiber optic adapter module 18, but the concepts disclosed herein may be used with any suitable mounting surface. Although the fiber optic shelf assembly is depicted as a 1-U any size or configuration is possible such as 4-U or vertical arrangement.

To establish fiber optic connections to the fiber optic adapter module 18, connections are made to one or more fiber optic adapters (not visible) disposed in a rear panel 20 of the fiber optic adapter module 18. In this regard, one or more fiber optic cables 22 of fiber optic cable assemblies 12 are pulled and routed to the fiber optic tray 16. The fiber optic tray 16 in FIG. 1A contains openings 24A, 24B disposed on each side of the rear portion 14 of the fiber optic tray 16 and an opening 25 in the rear portion 14 to allow the fiber optic cables 22 to be routed into the rear portion 14 of the fiber optic tray 16. Fiber optic cable assemblies 12 include one or more furcation bodies 26 having a desired number of furcated legs 28 exiting the same. The furcated legs 28 may be of any shape, including but not limited to round or rectangular. The furcations of the fiber optic cables 22 may be performed by the cable manufacturer in a factory setting before routing the fiber optic cable assembly 12 to the fiber optic tray 16. The furcated legs 28 are typically connectorized with fiber optic connectors (FIG. 17) for connecting with fiber optic adapters (not visible) or the like in the rear panel 20 of the fiber optic adapter module 18, thereby establishing fiber optic connections.

Also, as illustrated in FIGS. 1A and 1B, the fiber optic cable assemblies 12 are secured to the fiber optic shelf assembly 10; specifically, the fiber optic cable assemblies 12 are secured to the fiber optic tray 16, and particularly to the rear portion 14. Securing the fiber optic cable assemblies 12 to the fiber optic tray 16 prevents or reduces the chance of bending or damage to the fiber optic cables 22 and the optical fibers therein due to forces applied to the fiber optic cable assemblies 12. In this regard, as will be discussed in this application, the furcation body 26 may include at least one anti-rotation feature that is integrated therewith for inhibiting rotational forces on the furcation body 26 when installed in the fiber optic shelf assembly 10 or other suitable location. The furcation body 26 may also include one or more attachment features to inhibit lateral movement of the furcation body 26 when installed in the fiber optic shelf assembly 10.

As shown, the furcation bodies 26 of fiber optic cable assemblies 12 are secured to a mounting surface 30 formed in the rear portion 14 of the fiber optic tray 16. Because the fiber optic cables 22 are received in respective furcation bodies 26 and securely attached therein, securing of the respective furcation bodies 26 to the mounting surface 30 secures the respective fiber optic cables 22 to the fiber optic shelf assembly 10. In FIG. 1A, the fiber optic cables 22 are routed through the openings 24A, 24B. The furcation bodies 26 are mounted to the mounting surface 30 of the fiber optic tray 16 substantially parallel to the rear portion 14 of the fiber optic tray 16 since routing the fiber optic cables 22 through the openings 24A, 24B naturally aligns the furcation body 26 substantially parallel to the rear portion 14. However, as illustrated in FIG. 1B, the furcation body 26 can also be mounted to the mounting surface 30 of the fiber optic tray 16 in an orientation substantially orthogonal to the rear portion 14. Of course, any suitable orientation is possible for the furcation body 26.

As shown in FIGS. 1A and 1B, the furcation bodies 26 are mounted to the mounting surface 30 such that the furcation bodies 26 do not extend above a top plane 31 of the fiber optic tray 16. In this manner, the furcation bodies 26 are mounted in a low profile manner to the mounting surface 30. Consequently, the furcation bodies 26 do not interfere with additional fiber optic shelf assemblies and/or trays being stacked on top of the fiber optic tray 16. Additionally, as will be described in greater detail in this application, the mounting surface 30 contains a series of pre-defined apertures 32 that are configured to receive an attachment feature of the furcation body 26 for securing the furcation body 26 to the mounting surface 30. The apertures 32 are formed in mounting surface 30 by any suitable manner such as stamped, pre-drilled, or the like.

Figure 2:
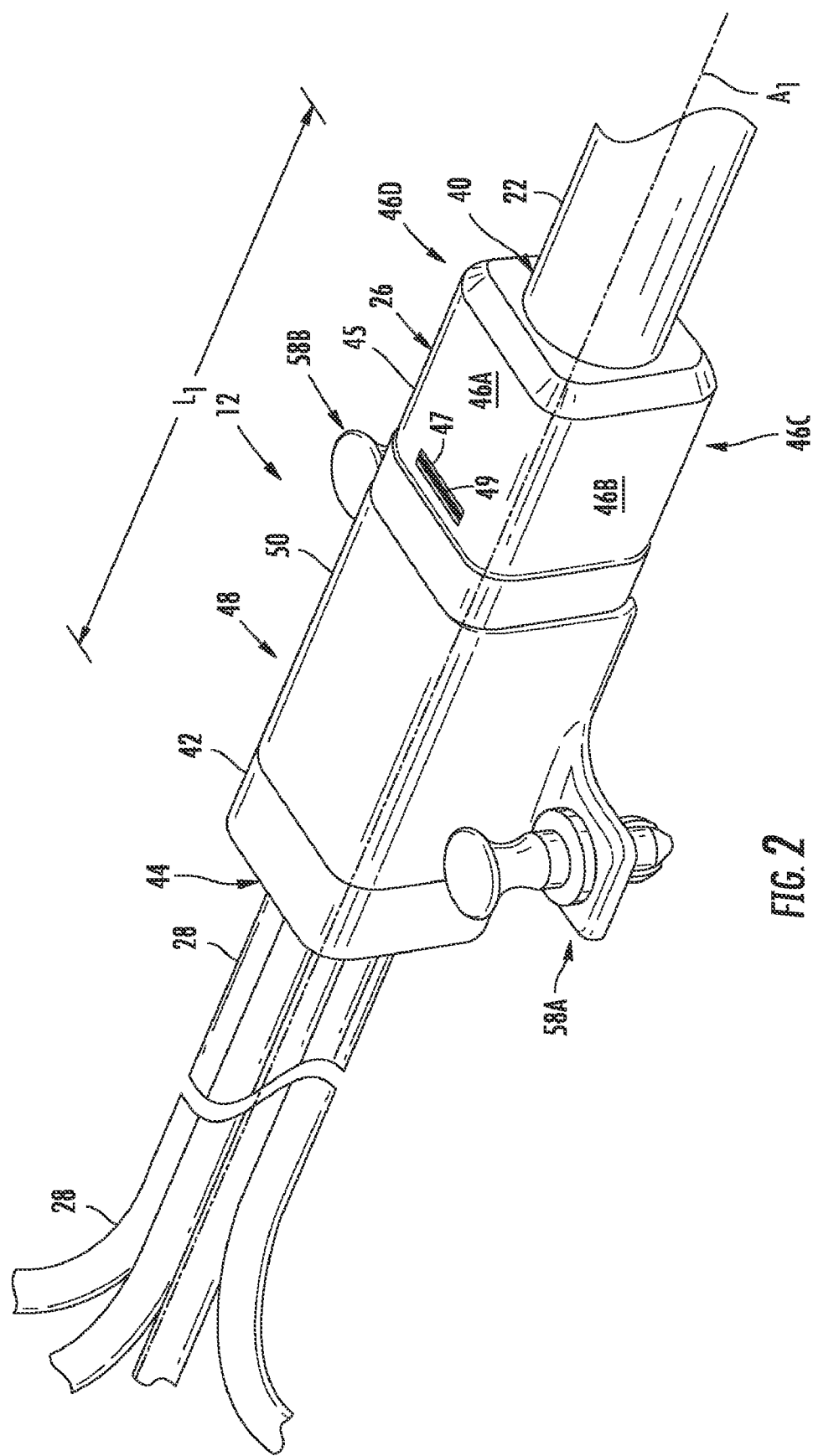
FIG. 2 is a perspective view of an explanatory fiber optic cable assembly illustrated in FIGS. 1A and 1B.

As illustrated in FIG. 2, the fiber optic cable 22 is received in a first end 40 of a furcation body 26. The furcation body 26 may be constructed out of plastic, metal, composite, and the like as examples. The fiber optic cable 22 is received along a longitudinal axis $A_1$ of the furcation body 26. The fiber optic cable 22 is furcated inside the furcation body 26 into a plurality of furcated legs 28 extending from a second end 44 of the furcation body 26 opposite the first end 40 of the furcation body 26. In this embodiment, an end cap 45 is secured to the furcation body 26 on the first end 40 of the furcation body 26 to cover the epoxy placed inside the furcation body 26 to secure the furcation therein. The end cap 45 is secured to the furcation body 26 via a latch opening 47 designed to receive a latch finger 49 disposed in the furcation body 26. The same latch structure may also be disposed on the opposite (i.e., bottom) side of the end cap 45 and furcation body 26, which is not shown in FIG. 2. In other embodiments, the furcation body may have a flexible boot for providing strain relief to the cable assembly.

Also in this example, the furcation body 26 is comprised of four (4) main outer surfaces 46A-46D to provide an anti-rotation feature integrated in the furcation body 26. The four outer surfaces 46A-46D are substantially planar surfaces that extend along a portion of the length $L_1$ of the furcation body 26 substantially parallel to the longitudinal axis $A_1$ of the furcation body 26. The four outer surfaces 46A-46D are arranged orthogonally or substantially orthogonally to each other to form a rectangular-shaped furcation body 26 having a rectangular-shaped cross-section. Each outer surface 46A-46D contains a substantially planar surface such that when the furcation body 26 is placed on the mounting surface 30, one of the substantially planar outer surfaces 46A-46D abuts with the mounting surface 30. In this regard, one of the substantially planar outer surfaces 46A-46D abutted against the mounting surface 30 provides an anti-rotation feature for the furcation body 26. As discussed above, the anti-rotation feature means that one or more generally planar surfaces are provided in a furcation body for abutting with at least one complementary planar surface for inhibiting rotation of the furcation body with respect to a substantially planar mounting surface (e.g., a flat surface); however, the anti-rotation feature excludes a bracket that is removably attached to the furcation body with a fastener such as a screw or the like.

Note that furcation body 26 may only contain one substantially planar outer surface instead of four substantially planar outer surfaces 46A-46D. Providing four substantially planar outer surfaces 46A-46D in the furcation body 26 of FIG. 2 allows the furcation body 26 to be abutted with the mounting surface 30 in any suitable orientation desired (i.e., a low-stress state). In other words, any one of the four substantially planar surfaces may abut with the mounting surface, thereby allowing mounting of the cable assembly in more than one rotational position. If only one substantially planar outer surface is provided in the furcation body 26, or less than all orientations or outer surfaces of the furcation body 26, the furcation body 26 may have to be arranged in a specific orientation so that a substantially planar surface of the furcation body 26 abuts with the mounting surface 30.

Figure 3A:
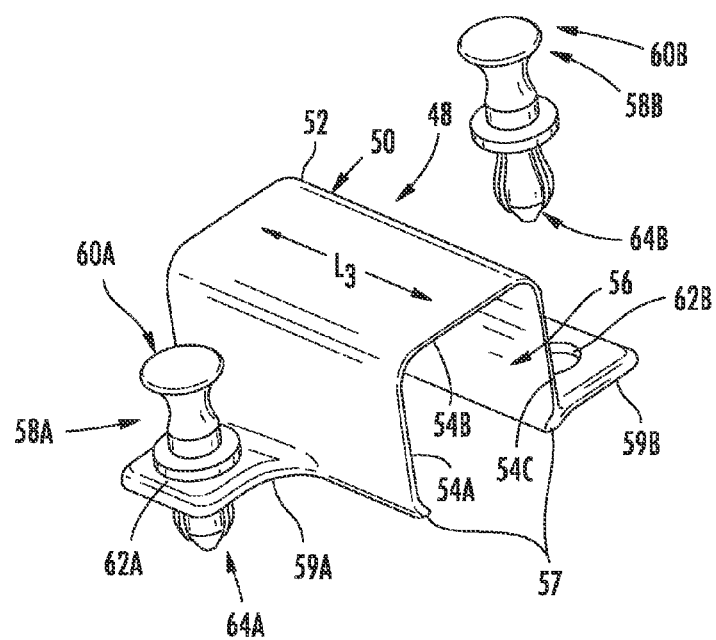
FIG. 3A is a perspective view of a clip for securing the fiber optic cable assembly of FIG. 2.
Figure 3B:
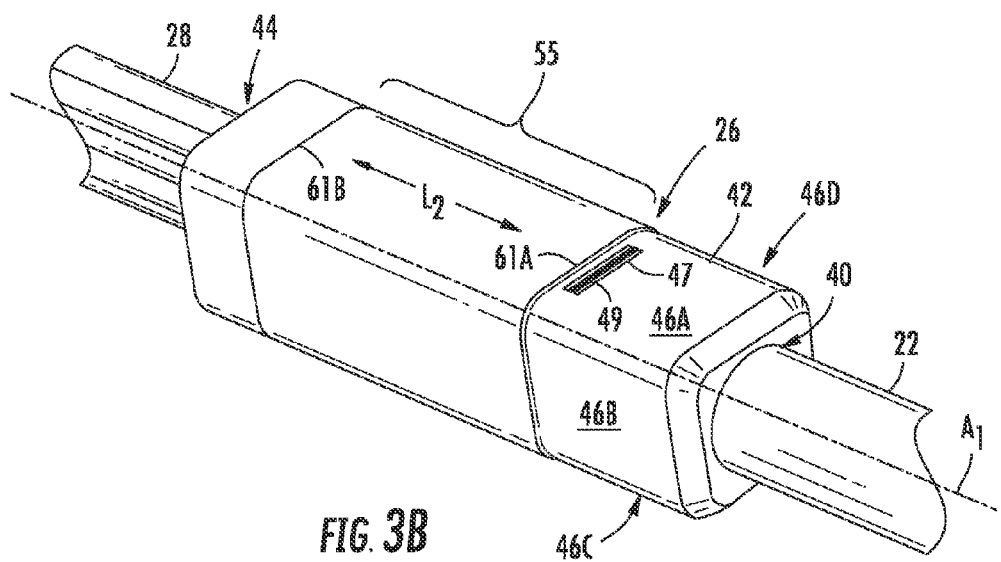
FIG. 3B is a perspective view of a portion of the fiber optic cable assembly of FIG. 2.

The fiber optic cable assembly 12 in FIG. 2 provides a first embodiment of an attachment feature 48 to secure the furcation body 26 to the mounting surface 30. An attachment feature facilitates attachment or securing of a furcation assembly to a mounting surface. In this embodiment, the attachment feature 48 is provided in the form of a discrete attachment bracket or clip 50. Clip 50 is shown as being disposed about the furcation body 26 in FIG. 2 and shown separately from the furcation body 26 in FIGS. 3A and 3B. As illustrated in FIGS. 2 and 3A-3B, the clip 50 is comprised of an outer shell 52 comprised of three (3) orthogonally or substantially orthogonally arranged surfaces 54A-54C. A cavity 56 is formed inside the outer shell 52 such that the clip 50 can be placed or cradled around the furcation body 26 in any suitable orientation. The clip 50 may be made out of plastic, metal, composite, and the like as examples. Additionally, the clip may have a marking indicia such as a label, markable surface, color code, etc. so that the craft can quickly identify the cable assembly within the fiber optic equipment.

To prepare the furcation body 26 to be secured to the mounting surface 30, the clip 50 is placed over the furcation body 26. In particular, three outer surfaces 46A, 46B, 46D of the furcation body 26 are received inside the cavity 56 of the clip 50. The surfaces 54A, 54C contain inward curled portions 57 that cradle around the substantially planar surface 46C of the furcation body 26 to secure the clip 50 about the furcation body 26.

The furcation body 26 may also include a notched portion 55 (FIG. 3B) having length $L_2$ that is about the same length or longer than the length $L_3$ of the clip 50. As used herein, "notched portion" means a portion of a furcation body that has a different cross sectional area or different cross-sectional geometry for cooperating with an attachment feature. In this manner, the clip 50 is configured to fit within the notched portion 55 of the furcation body 26 when placed about the furcation body 26. Providing a notched portion 55 in the furcation body 26 provides a biased position for the clip 50 to attach to the furcation body 26. This may further promote stability of the furcation body 26 attachment to the mounting surface 30. The notched portion 55 forces the clip 50 to be placed between the first and second ends 40, 44 of the furcation body 26 for greater stability and to be more resistant to rotational forces. Further, the notched portion 55 inhibits the furcation body 26 from being pulled from the clip 50 when a pulling force is applied to the fiber optic cable 22 of the fiber optic cable assembly 12. The pulling force will cause the top surface 54B of the clip 50 to abut with end portions 61A, 61B of the notched portion 55 depending on whether the pulling force is asserted on the furcated legs 28 or the fiber optic cable 22. However, providing a notched portion 55 in the furcation body 26 is not required for the concepts disclosed herein.

Additionally, furcation body 26 has an inner cavity that has a generally rectangular or square cross-section (i.e., conforms with the generally rectangular or square outer profile of the furcation body), thereby providing corners in the inner cavity for easily depositing epoxy therein for securing the same. Likewise, furcation bodies with other shapes besides round can also have an inner cavity with corner such as a triangular or pentagon cross-section that makes the cavity easier to fill with epoxy.

In order to secure the clip 50 to the mounting surface 30, which in turn secures the furcation body 26 to the mounting surface 30, one or more securing devices 58A, 58B are disposed in the clip 50. As will be described, the securing devices 58A, 58B secure the clip 50 to the mounting surface 30, which in turn secures the furcation body 26 to the mounting surface 30. In this embodiment, the securing devices 58A, 58B interact with attachment platforms 59A, 59B that extend from the clip 50. The attachment platforms 59A, 59B provide surfaces for the securing devices to pin the attachment feature such as clip 50 to the mounting surface 30, thereby securing the clip 50 and furcation body 26 to the mounting surface 30, as illustrated in FIG. 1.

In this example, the securing devices 58A, 58B include push latch mechanisms in the form of plungers 60A, 60B. Because there are two (2) attachment platforms 59A, 59B extending from the clip 50, two plungers 60A, 60B are provided. The plungers 60A, 60B are inserted within attachment platform orifices 62A, 62B disposed in the attachment platforms 59A, 59B. Thus, when the plungers 60A, 60B are placed over apertures 32 in the mounting surface 30 of the fiber optic tray 16 in FIG. 1 and pushed downward, flexing members 64A, 64B expand to compressibly fit inside the apertures 32, thereby securing the attachment feature such as clip 50 to the mounting surface 30 along with the furcation body 26. To release the furcation body 26 from the mounting surface 30, the plungers 60A, 60B are pulled and released from the apertures 32 in the mounting surface 30 for releasing the clip 50 from the mounting surface 30.

Although not limiting to the invention, the fiber optic cable assembly 12 of FIGS. 2-3B also provides a low profile attachment structure for the furcation body 26 such that no intermediate securing devices or structures, such as standoffs, are provided between the furcation body 26 and the mounting surface 30. This feature minimizes the standoff height of the furcation body 26 from the mounting surface 30. In this embodiment, the attachment feature 48 of the fiber optic cable assembly 12 is provided such that the furcation bodies 26 are not located above the top plane 31 of the fiber optic tray 16 when installed, as discussed above. The furcation body 26 may be mounted directly to the mounting surface 30 without intermediate attachment devices or standoffs such that the tops of the furcation body 26, when installed, do not extend beyond the top plane 31 of the fiber optic tray 16. Further, by locating the center of gravity of the furcation body 26 closer to the mounting surface 30, greater strength and stability may be established between the furcation body 26 and the mounting surface 30.

In the clip 50 illustrated in FIGS. 2-3B, the attachment platforms 59A, 59B are provided as part of a one piece mold of the clip 50. However, the attachment platforms 59A, 59B may be provided as separate pieces or materials attached to the clip 50. Also securing devices 58A, 58B in the form of the plungers 60A, 60B are retained within the attachment platforms 59A, 59B such that they remain with the clip 50; however, the securing devices 58A, 58B do not have to be retained with the clip 50. The securing devices 58A, 58B may be any type of fastener, including but not limited to a screw, dowel pin, rivet, etc., that is inserted into the attachment platform orifices 62A, 62B to secure the attachment platforms 59A, 59B to the mounting surface 30. Additionally, even though the substantially planar surfaces 54A-54C that comprise the clip 50 are provided in a shape that is substantially in the same form as the outer surfaces 46A-D of the furcation body 26, such does not have to be the case. By way of example, clip 50 should merely fit around at least a portion of the furcation body 26 for retaining the furcation body 26 when the clip 50 is secured to the mounting surface 30.

Figure 4:
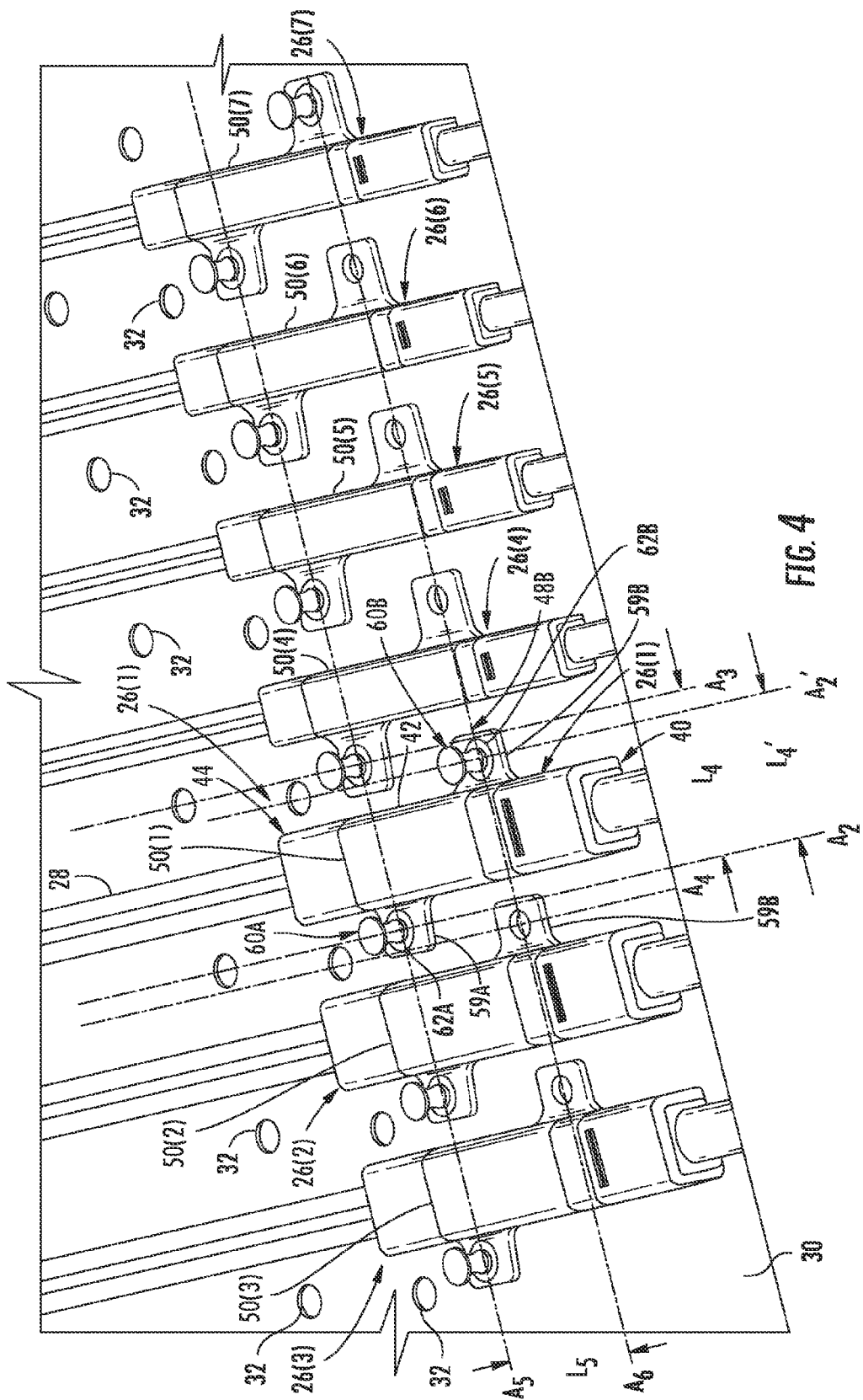
FIG. 4 illustrates multiple fiber optic cable assemblies of FIG. 2 installed on the mounting surface of the fiber optic shelf assembly of FIGS. 1A and 1B.

FIG. 4 illustrates a plurality of the furcation bodies 26(1)-26(7) attached to a mounting surface 30 to secure a plurality of fiber optic cable assemblies 12 to the mounting surface 30. A plurality of clips 50(1)-50(7) are also provided for securing the furcation bodies 26(1)-26(7) to the mounting surface 30. The furcation bodies 26(1)-26(7) may vary in size as illustrated. It is assumed for the purposes of this discussion that the mounting surface is the mounting surface 30 of the fiber optic tray 16 in FIG. 1. However, the mounting surface may be located on any suitable mounting surface of any type of fiber optic equipment.

As illustrated in FIG. 4, the apertures 32 are shown as being provided in the mounting surface 30 to receive the clips 50(1)-50(7), and more particularly the plungers 60A, 60B disposed in each of the attachment platforms 59A, 59B in each of the clips 50(1)-50(7). The apertures 32 on the mounting surface 30 may be arranged in a grid type fashion in rows and columns, or in any other suitable arrangement. To secure a furcation body 26 to the mounting surface 30, the furcation body 26 is placed in the desired location on the mounting surface 30. Thereafter, the clip 50 is placed over top the furcation body 26 such that a portion of the furcation body 26 is cradled within the cavity 56 of the clip 50. The clip 50 and cradled furcation body 26 are then placed on the mounting surface 30 such that the attachment platforms 59A, 59B and their plungers 60A, 60B are aligned with respective apertures 32 on the mounting surface 30. The plungers 60A, 60B are then inserted into the apertures 32 for securing the attachment platforms 59A, 59B of respective clips onto the mounting surface 30, thereby securing the furcation body 26 to the mounting surface 30. The plungers are also advantageous since they provide a quick and easy removable of the furcation body for reconfiguring, reorganizing, removing, etc.

Figure 31A:
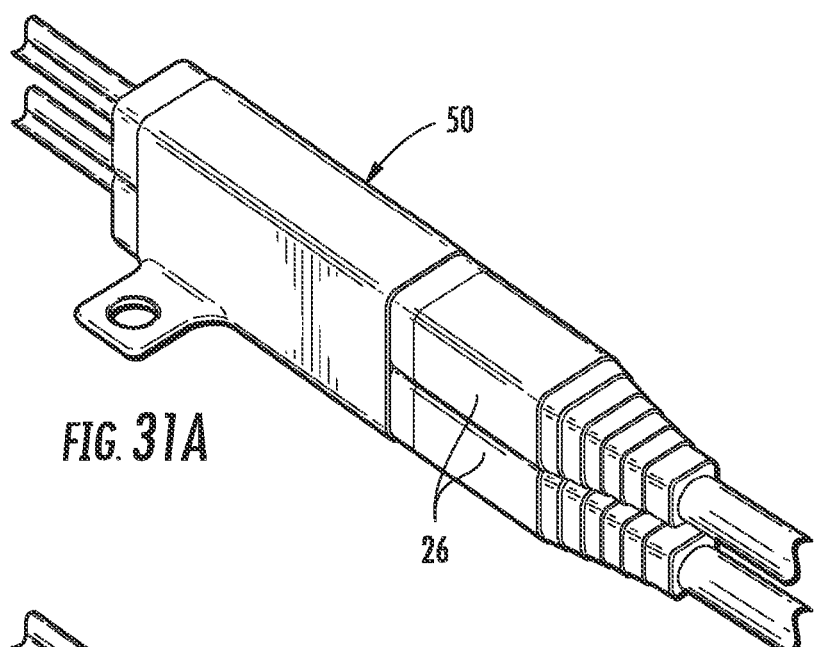
FIGS. 31A-31D are perspective views of clips for securing furcation bodies of fiber optic cable assemblies.
Figure 31B:
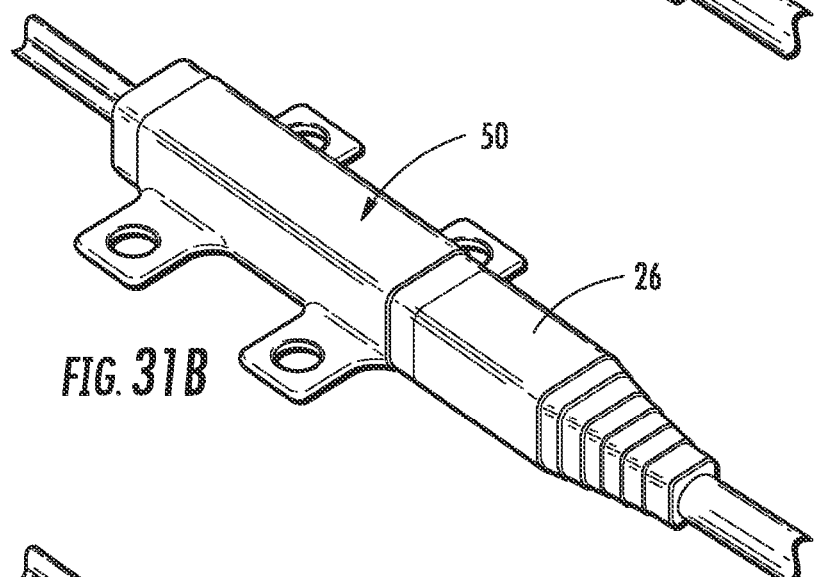
Figure 31C:
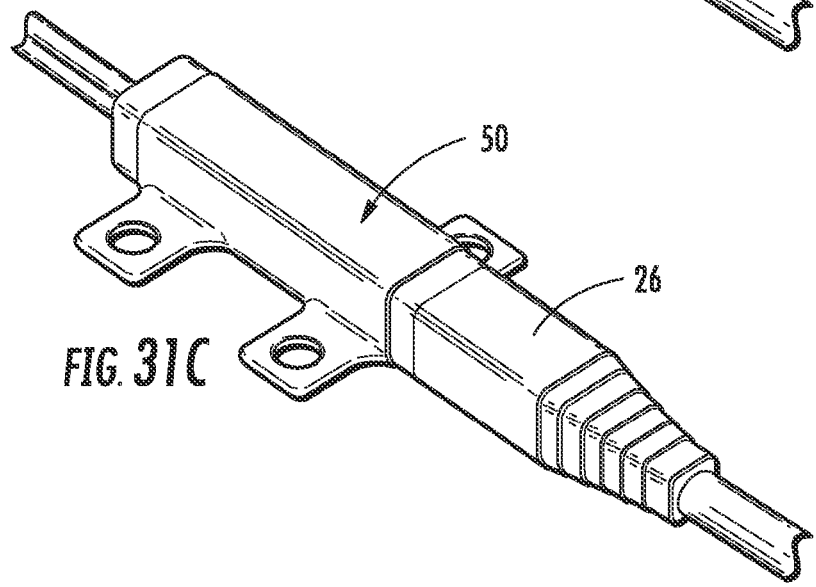

One advantage to securing the furcation body 26 directly to the mounting surface is to reduce or minimize any rotational forces translated to the furcated legs 28 from a rotational force applied to the fiber optic cable 22. By way of example, the attachment platforms 59A, 59B are disposed on each side of the clip 50. Thus, regardless of which direction a rotational force is applied to the fiber optic cable 22, the securing of the attachment platforms 59A, 59B to the mounting surface 30 will inhibit rotational movement of the furcation body 26 about the mounting surface 30. The attachment platforms 59A, 59B are also provided on opposing ends of the clip 50. In particular, the attachment platform 59B is provided in the clip 50 such that it is adjacent the first end 40 of the furcation body 26 when the clip 50 is installed on the furcation body 26. The attachment platform 59A is provided in the clip 50 such that it is adjacent the second end 44 of the furcation body 26 when the clip 50 is installed on the furcation body 26. This arrangement of the clip 50 providing symmetrically opposed securing devices 58A, 58B is not only resistant to rotational forces to provide an anti-rotational feature, but it also provides the ability to provide a greater density of furcation body 26 adjacent to each other on the mounting surface 30 as shown in FIG. 4. Other embodiments of the clip can include more than two attachment platforms such as having four attachment platforms disposed on opposite ends and opposite sides such as shown in FIGS. 31B and 31C.

As illustrated in FIG. 4, the attachment platform orifices 62A, 62B disposed in each attachment platform 59A, 59B that receive the plungers 60A, 60B for the attachment feature 48 are each aligned along a longitudinal axis. In particular, as illustrated for the clip 50(1), the attachment platform 59A is aligned along longitudinal axis $A_2$ and the attachment platform 59B is aligned along longitudinal axis $A_3$. The distance between the adjacent apertures 32 disposed in the mounting surface 30 is designed to be compatible with the distance $L_4$ between the longitudinal axes $A_2$ and $A_3$ of the attachment platform orifices 62A, 62B in the clip 50. In this embodiment, the distance $L_4$ is approximately 31.9 millimeters (mm), but any desired distance can be provided that is compatible with the attachment platforms 59A, 59B and apertures 32.

For example, if the apertures 32 were arranged in columns that were each aligned along the same longitudinal axes without offset (e.g., if $A_2$ and $A_4$ were aligned on the same longitudinal axis), the distance between the center axes (e.g., $A_2$ and $A_{2'}$) in the attachment platform orifices 62A, 62B of the furcation body 26(1)-26(7) would be provided to be the same as the distance between such adjacent apertures 32. Also, a larger furcation body 26 could be accommodated by providing a clip 50 where the distance between the center axes of the attachment platform orifices 62A, 62B span over more than one row and/or column of apertures 32 as long as the distance is a multiple of the distance between adjacent rows and/or columns of the apertures 32 (e.g., $L_{4'}$ and $L_5$).

The longitudinal axis $A_4$ of an adjacent attachment platform 59B of the clip 50(2) may also be located in the same longitudinal axis $A_2$ of the attachment platform 59A of clip 50(1) or located a distance away as illustrated in FIG. 4. Providing a distance between the longitudinal axes $A_2$, $A_4$ affects finger access between the furcation bodies 26(1)-26(7). Reducing the distance between the longitudinal axes (e.g., $A_2$, $A_4$) between attachment platforms 59A, 59B in adjacent clips 50 allows a greater density of clips 50 to be disposed in a given area of the mounting surface 30. Further, as illustrated in FIG. 4, the attachment platforms 59A, 59B in a given clip 50 are disposed along different latitudinal axes $A_5$ and $A_6$ a distance $L_5$ away from each other. This provides for the attachment platforms 59A, 59B and plungers 60A, 60B disposed therein to be arranged symmetrically opposed to each other. In this same regard, the distance between the adjacent rows of apertures 32 disposed in the mounting surface 30 is designed to be compatible with the distance $L_5$ between the latitudinal axes $A_5$ and $A_6$ of the attachment platforms 59A, 59B in the clip 50. In this embodiment, the distance $L_5$ is approximately 30 millimeters, but any suitable distance desired can be provided that is compatible with the attachment platforms 59A, 59B and apertures 32. Further, the rows of apertures 32 are aligned along latitudinal axes (e.g., $A_5$ and $A_6$) without offset between adjacent apertures 32 in the embodiment illustrated in FIG. 4. However, an offset could be provided similar to the offset provided between adjacent apertures 32 aligned in the longitudinal axes (e.g., $A_2$ and $A_4$).

In the embodiment illustrated in FIG. 4, the distance between adjacent apertures 32 aligned in the longitudinal axes (e.g., along $A_2$ and $A_{2'}$ and distance $L_{4'}$) is not the same as the distance between adjacent apertures 32 aligned in the latitudinal axes (e.g., along $A_5$ and $A_6$ and distance $L_5$). However, if the apertures 32 were provided such that these distances were the same or approximately the same, the furcation bodies 26(1)-26(7) could be rotated in any increment of ninety (90) degrees and the attachment platform orifices 62A, 62B align with apertures 32 in the mounting surface 30.

Figure 5:
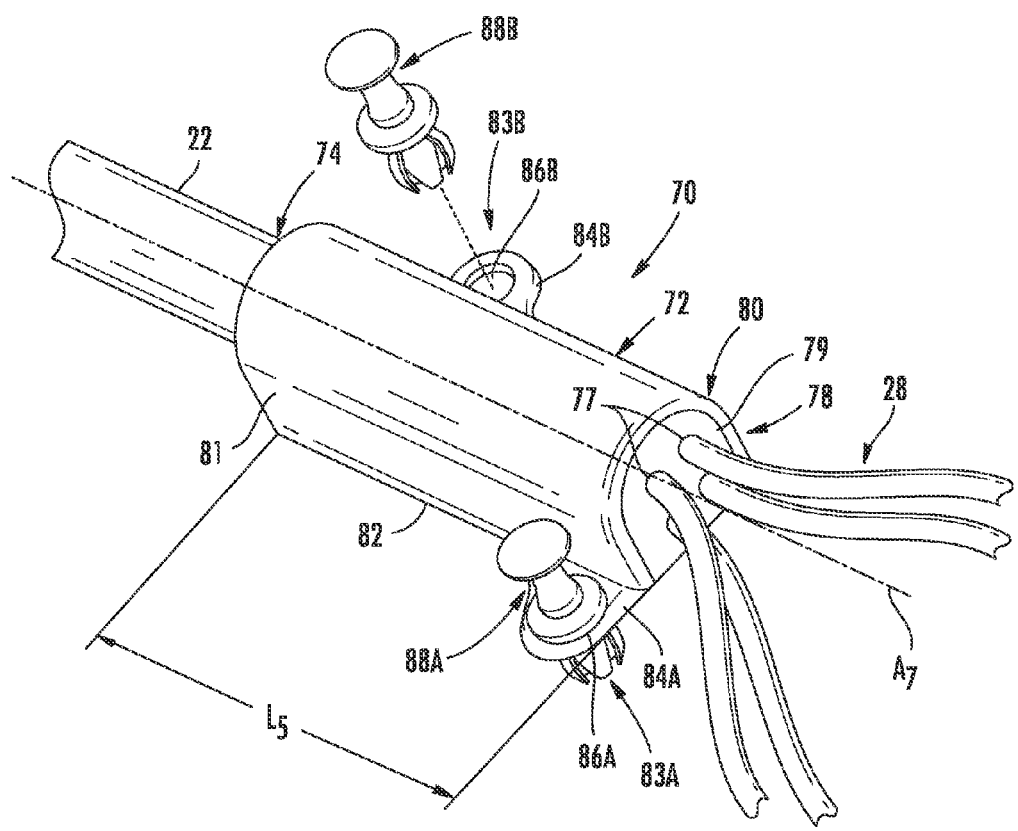
FIG. 5 is a perspective view of another exemplary fiber optic cable assembly with attachment features integrated into the furcation body.

Other fiber optic cable assemblies having different furcation assemblies and attachment features are also possible in addition to those illustrated and described in FIGS. 2-4. By way of example, FIG. 5 illustrates another fiber optic cable assembly 70 that may be employed for providing furcation of a fiber optic cable. In a similar regard, the fiber optic cable assembly 70 of FIG. 5 may also be employed in the fiber optic tray 16 of FIG. 1, thereby securing the fiber optic cable assembly 70 to the mounting surface 30 in the rear portion 14 of the fiber optic tray 16. The fiber optic cable assembly 70 of FIG. 5 is comprised of a furcation body 72 receiving the fiber optic cable 22 on a first end 74 along a longitudinal axis $A_7$ of the same. The fiber optic cable 22 is furcated inside a passage 78 extending through the furcation body 72 between the first end 74 and a second end 80 of the furcation body 72. One of more furcated legs 28 extend from the passage 78 at the second end 80 where they can be routed to various fiber optic components or equipment to make fiber optic connections. In this embodiment, an end cap 79 is provided on the second end 80 of the furcation body 72 that contains one or more orifices 77 disposed therethrough to receive individual furcated legs 28.

Similar to the furcation body 26 of FIG. 2, the furcation body 72 of FIG. 5 contains a substantially planar surface 82, thereby providing an anti-rotation feature integrated with the furcation body 72. The substantially planar surface 82 extends along the entire length $L_5$ of the furcation body 72 substantially parallel to the longitudinal axis $A_7$. The substantially planar surface 82 is configured to be abutted with the mounting surface 30 to provide an integrated anti-rotation feature in the furcation body 72. The substantially planar surface 82 abuts with a complementary planar mounting surface 30 for inhibiting rotation of the furcation body 72 with respect to a mounting surface 30. However, unlike the furcation body 26 of FIG. 2, the furcation body 72 of FIG. 5 includes an arched surface 81 adjacent and attached to the substantially planar surface 82. In this manner, the furcation body 72 is tunnel-shaped.

Further, similar to the furcation body 26 of FIG. 2, the furcation body 72 of FIG. 5 also contains attachment features 83A, 83B. However, the attachment features 83A, 83B are integrated into the furcation body 72 and located contiguous with the substantially planar surface 82. The attachment features 83A, 83B are provided in the form of attachment platforms 84A, 84B disposed on each side of the furcation body 72 to facilitate attaching the furcation body 72 to the mounting surface 30. The attachment platforms 84A, 84B are provided as part of the furcation body 72 such as molded therewith in this example. In this regard, each attachment platform 84A, 84B includes attachment platform orifices 86A, 86B disposed therein that are configured to receive securing devices for securing the furcation body 72 to the mounting surface 30. Thus, a separate clip is not required for mounting fucation body 72.

However, like the embodiment of FIG. 2, the securing devices are used to secure furcation body 72 to a suitable mounting surface. Specifically, attachment platforms 84A, 84B are configured to receive securing devices such as plungers 88A, 88B or other suitable securing devices. The plungers 88A, 88B engage the attachment platform orifices 86A, 86B or other suitable structure. Specifically, the plungers 88A, 88B are inserted into appropriate apertures 32 of the mounting surface for securing the attachment platforms 84A, 84B to the mounting surface. As a result, furcation body 72 is secured to the mounting surface with the substantially planar surface 82 abutting the same. The fiber optic cable assembly 70 of FIG. 5 provides the attachment features 83A, 83B integrated into the furcation body 72. It also provides a low profile attachment structure for the furcation body 72 such that no intermediate securing devices or structures, such as standoffs, are provided between the furcation body 72 and the mounting surface to minimize the standoff height of the furcation body 72 from the mounting surface. Like the clip, the furcation body may also have a marking indicia such as a label, markable surface, color code, etc. so that the craft can quickly identify the cable assembly within the fiber optic equipment.

Figure 6:
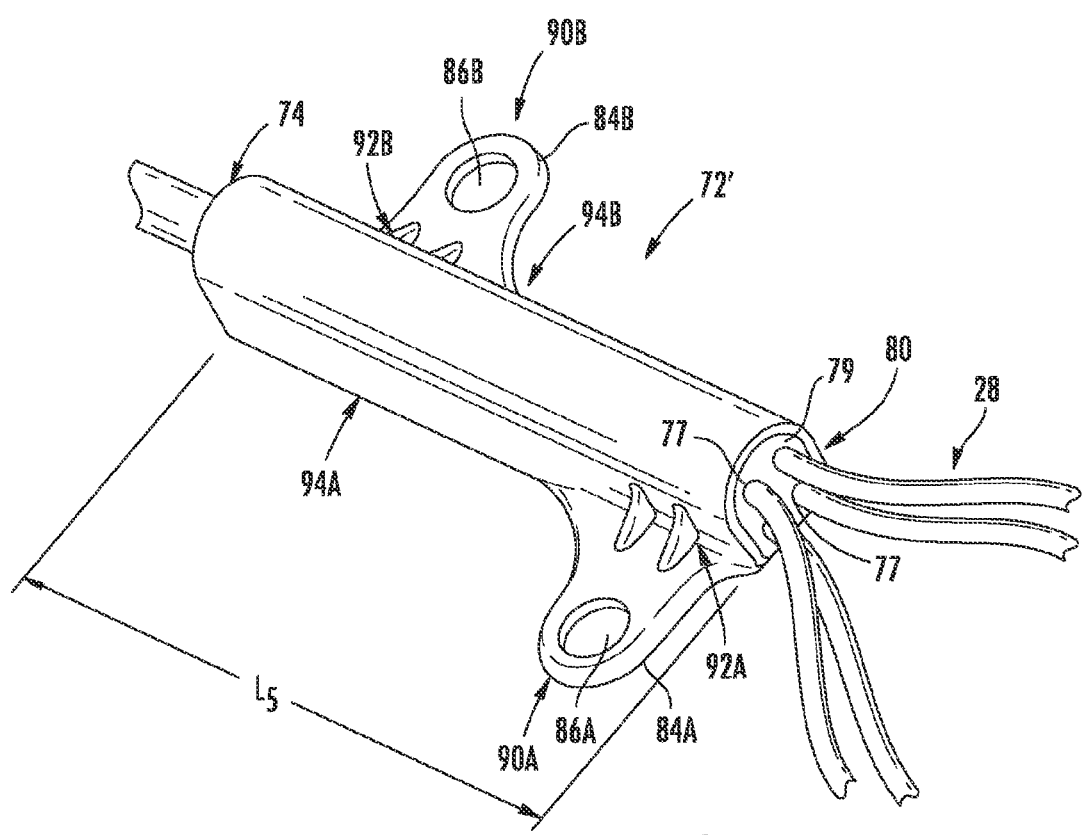
FIG. 6 is a perspective view of a fiber optic cable assembly similar to FIG. 5 without securing devices disposed in the attachment features.

FIG. 6 also illustrates a furcation body 72' that is similar to furcation body 72 of FIG. 5. Furcation body 72' includes attachment platforms 84A, 84B provided in the form of ear-shaped platforms that are rounded on their ends 90A, 90B. To provide greater support between the attachment platforms 84A, 84B one or more ribs 92A, 92B are provided. Additionally, like furcation body 26 of FIG. 2, the attachment platforms 84A, 84B may be located on opposite sides 94A, 94B of the furcation body 72' and symmetrically opposed. Again, in this manner, the furcation bodies 72' may be located adjacent to each other such that one attachment platform orifice 86A from one furcation body 72' will align in the same or different longitudinal axes with another attachment platform orifice 86B of another furcation body 72'.

One reason to secure the furcation body directly to the mounting surface, as provided in the fiber optic cable assembly of FIGS. 5 and 6, is to reduce or minimize any rotational forces translated to the furcated legs 28 from a rotational force applied to the fiber optic cable 22. In this manner, the attachment platforms 84A, 84B are disposed on each side of the furcation body. Thus, regardless of which direction a rotational force is applied to the fiber optic cable 22, the securing of the attachment platforms 84A, 84B to the mounting surface will inhibit rotation of the furcation body about the mounting surface. The attachment platforms 84A, 84B are also provided on opposing ends of the furcation body. In particular, the attachment platform 84B is provided in the furcation body adjacent the first end of the furcation body and attachment platform 84A is provided in the furcation body adjacent the second end 80 of the furcation body. This arrangement provides symmetrically opposed attachment platforms 84A, 84B in the furcation body and is not only resistant to rotational forces to provide an anti-rotational feature; but, also provides the ability to provide a greater density of furcation bodies adjacent to each other on the mounting surface.

Figure 7:
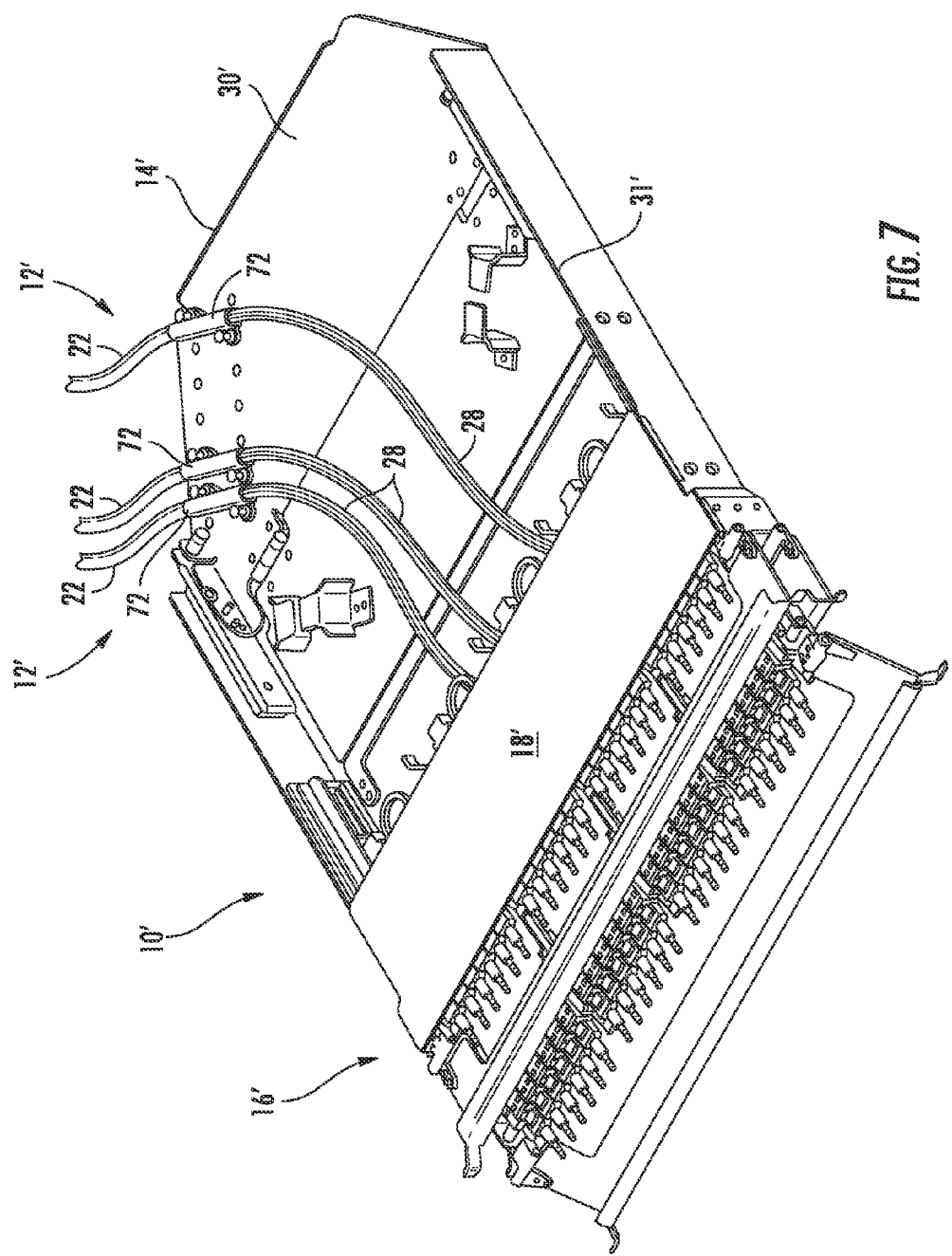
FIG. 7 is a perspective view of fiber optic cable assemblies of FIGS. 5 and 6 secured to a mounting surface of an exemplary fiber optic shelf assembly.
Figure 8:
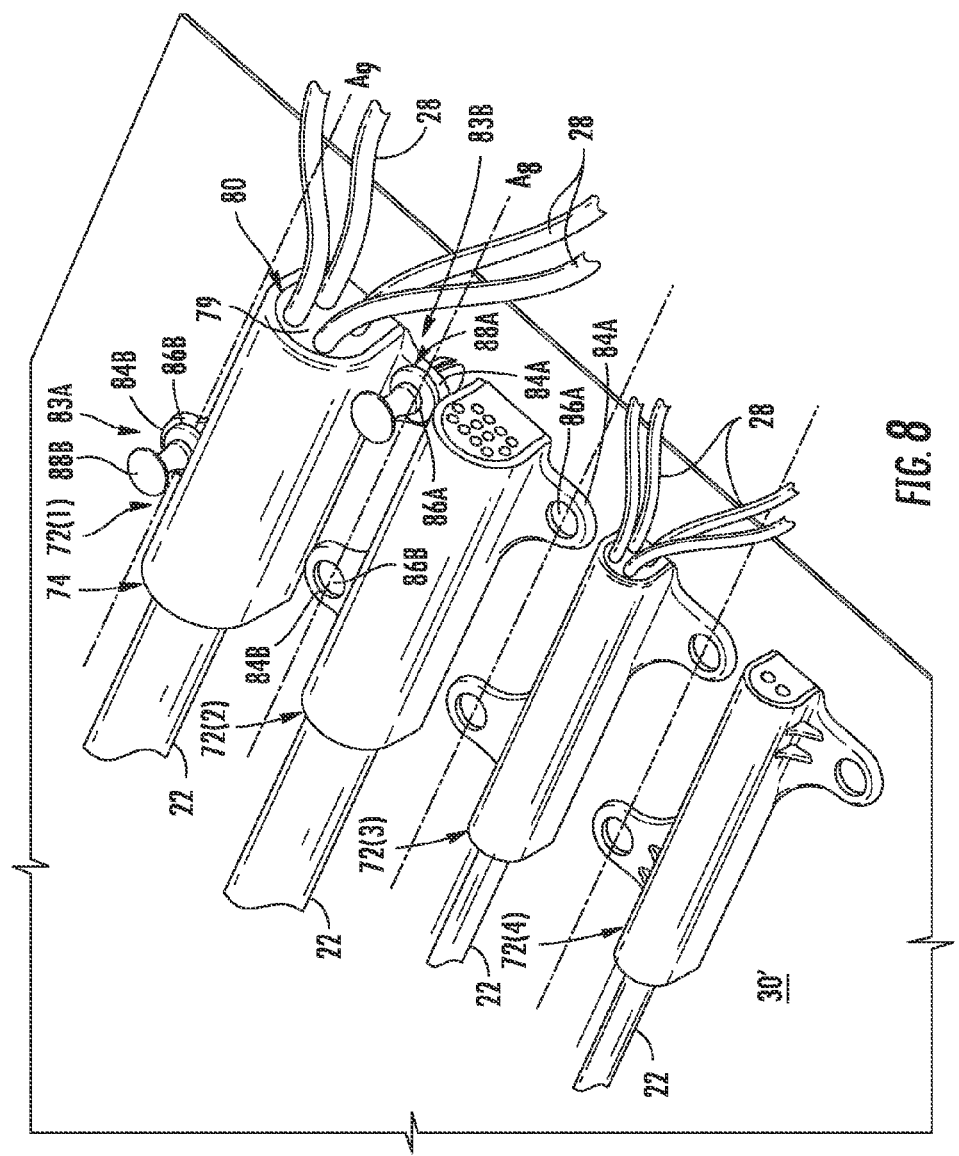
FIG. 8 illustrates a close-up view of FIG. 7 illustrating the fiber optic cable assemblies of FIGS. 5 and 6 secured to a mounting surface of an exemplary fiber optic shelf assembly.

By way of example, FIGS. 7 and 8 illustrate the furcation bodies 72 secured on a mounting surface 30' in a rear section 14' of another exemplary fiber optic shelf assembly 10' using attachment features. Like the fiber optic shelf assembly 10 in FIGS. 1A and 1B, the fiber optic shelf assembly 10' in FIG. 7 contains one or more fiber optic trays 16' that each contain one or more fiber optic adapter modules 18'. The fiber optic cable assemblies 12' are routed to the rear section 14' of the fiber optic tray 16' for optical connection to the fiber optic adapter modules 18'. As shown in this embodiment, furcation bodies 72 are secured to the mounting surface 30' of the fiber optic shelf assembly 10' at an angled orientation with regard to the rear portion 14'.

FIG. 8 provides a close-up view of furcation bodies 72 attached to the mounting surface 30'. As illustrated therein, the attachment platform orifices 86A, 86B disposed in respective attachment platforms 84A, 84B of adjacent furcation bodies may be aligned along a common longitudinal axis. In particular, the attachment platform orifice 86A for the furcation body 72(1) is aligned along longitudinal axis $A_8$ and the attachment platform orifice 86B for the furcation body 72(1) is aligned along longitudinal axis $A_9$. As shown, the attachment platform 84B for furcation body 72(2) is located in the same longitudinal axis $A_8$ of the attachment platform 84A for the furcation body 72(1). By providing the symmetrically opposed attachment platforms 84A, 84B in the furcation bodies, the two furcation bodies can be arranged on the mounting surface 30' closer to each other than would otherwise be possible if the attachment platforms 84A, 84B were not symmetrically opposed (i.e., disposed in attachment platforms located directly across from each other). Thus, this arrangement may facilitate higher density arrangements for cable management in a fiber optic shelf assembly or the like.

Figure 9A:
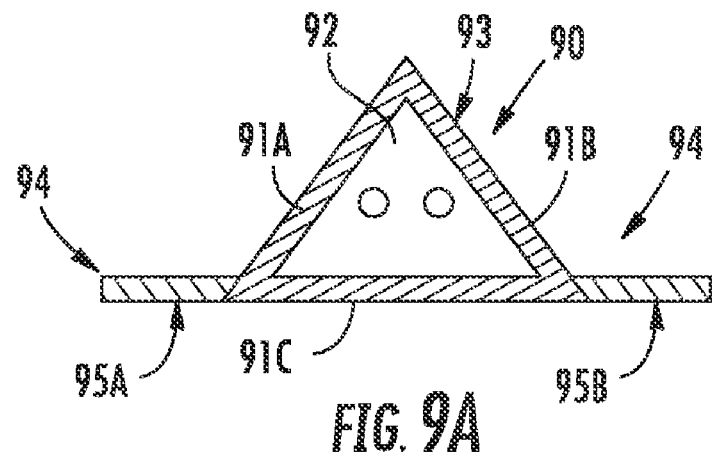
FIGS. 9A and 9B illustrate front views of alternate furcation bodies having different cross-sectional shapes.
Figure 9B:
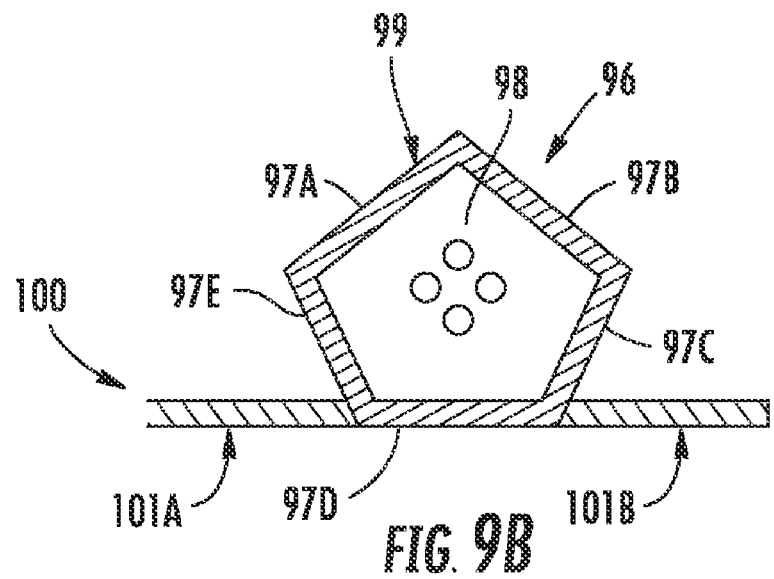

A furcation body having one or more anti-rotation features can take other forms or arrangements as long as at least one substantially planar surface is provided in the furcation body for abutting with at least one complementary planar mounting surface for inhibiting rotation of the furcation body with respect to the mounting surface. FIGS. 9A and 9B schematically depict alternate furcation bodies. As illustrated in FIG. 9A, a triangular-shaped furcation body 90 is provided. In this embodiment, the furcation body 90 is comprised of three substantially planar surfaces 91A-91C arranged at approximately one-hundred and twenty (120) degree intervals with respect to each other. In other words, the furcation body 90 is rotated about one-hundred and twenty degrees to advance to the next substantially planar surface. Furcated legs (not shown) from a fiber optic cable can extend through an end cap 92 provided on an end 93 of the furcation body 90. One or more attachment features may be provided for securing the furcation body 90 to a mounting surface. In one embodiment, the attachment features 94 are provided in the form of attachment platforms 95A, 95B integrated into the furcation body 90 and configured to receive one or more securing devices (not shown), similar to the attachment feature arrangement provided in the furcation body of FIGS. 5 and 6, but this allows for only one mounting orientation. If a clip or other similar attachment feature is used, then the fucation body can have a plurality of mounting orientations.

FIG. 9B illustrates a furcation body 96 having five substantially planar surfaces 97A-97E arranged at approximately sixty (60) degree intervals with respect to each other. Furcated legs (not shown) from a fiber optic cable can extend through an end cap 98 provided on an end 99 of the furcation body 96. One or more attachment features may be provided for securing the furcation body 96 to a mounting surface. As depicted, the attachment features 100 are attachment platforms 101A, 101B integrated into the furcation body 96 to receive one or more securing devices, similar to the attachment feature arrangement provided in the furcation body 72 of FIGS. 5 and 6. Likewise, if a clip or other similar attachment feature is used, then the fucation body can have a plurality of mounting orientations.

FIGS. 10A and 10B illustrate a portion of another fiber optic cable assembly 102 that may be employed to provide furcation of the fiber optic cable 22 into one or more furcated legs 28. As illustrated, the fiber optic cable assembly 102 comprises a furcation body 104. The furcation body 104 can be mounted to any suitable mounting surface. The furcation body 104 may also contain anti-rotation and attachment features, as will be described below. The furcation body 103 receives a fiber optic cable 22 on a first end 106 of the furcation body 104 along a longitudinal axis $A_{10}$ of the furcation body 104. An end cap 105 is attached to the furcation body 104, but other structures are possible. In this embodiment, end cap 105 snap-fits into furcation body 104 to secure the same to the furcation body 104. However, a one-piece molded furcation body 104 without a separate end cap 105 is also possible. Additionally, the end cap or end portion may be flexible for providing strain relief such as a boot. The fiber optic cable 22 extends into a passage 108 extending through the furcation body 104 from the first end 106 of the furcation body 104 to a second end 110 of the furcation body 104. One or more furcated legs 28 extend through the second end 110 of the furcation body 104. In this embodiment, the furcation body 104 has a generally cylindrically-shaped body which contains a beveled surface 112 at the first end 106.

An attachment feature 114 is provided to attach the furcation body 103 to the mounting surface 30 that also includes an anti-rotation feature. As depicted, the attachment feature 114 is integrated into a substantially planar surface 118 of the furcation body 104. As best shown in FIG. 10B, the attachment feature 114 is provided in the form of one or more T-shaped push latch mechanisms 120A, 120B ("push latches 120A, 120B") attached to the furcation body 104. The push latches 120A, 120B are include attachment platforms 122A, 122B each having two substantially planar surfaces 123A, 123B to provide an integrated anti-rotation feature in the furcation body 104 located contiguous with the attachment feature 114. The attachment platforms 122A, 122B are attached to the substantially planar surface 118. Respectively, each substantially planar surface 123A, 123B of the attachment platforms 122A, 122B is attached to outer support rails 124A, 124B extending generally orthogonally to the attachment platform 122A, 122B. The outer support rails 124A, 124B are adapted to engage with the furcation body 104 to support and securably hold the the furcation body 104.

Latches 126A, 126B are integratedly formed into same mold piece as the outer support rails 124A, 124B, respectively, and extend from the attachment platforms 122A, 122B such that they are adapted to be inserted into apertures, thereby securing the cable assembly to the mounting surface. In this manner, the latches 126A, 126B are biased forward and contain shoulder structures 128A, 128B that flex inward to be inserted into the apertures to attach the latches 126A, 126B and thus the furcation body 103 onto the mounting surface. When the latches 126A, 126B are inserted into apertures in the mounting surface, the substantially planar surfaces 123A, 123B abut with the mounting surface to provide an anti-rotation feature for the cable assembly. The latches 126A, 126B are biased downward such that the shoulder structures 128A, 128B cannot be pulled from the apertures unless the latches 126A, 126B are compressed inward so that the shoulder structures 128A, 128B can pass through the apertures to release the furcation body 103 from the mounting surface 30.

Figure 11:
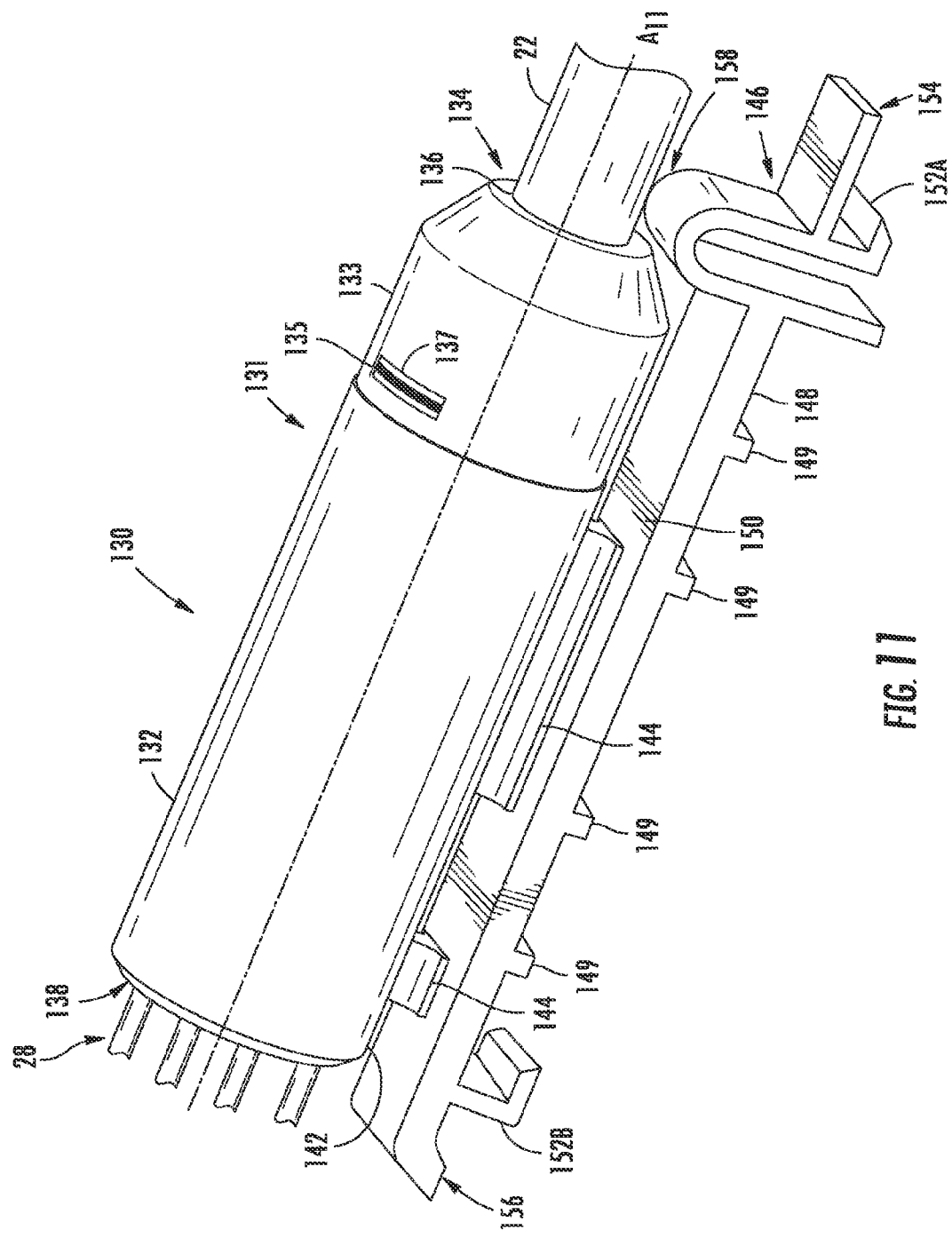
FIG. 11 illustrates a perspective view of another exemplary fiber optic cable assembly.

FIG. 11 illustrates another embodiment of a fiber optic cable assembly 130 that may be employed to secure a furcation body to a suitable fiber optic shelf assembly. The fiber optic cable assembly 130 includes a furcation body 131 having an end cap 133 attached thereto. A latching finger 135 disposed in the furcation body 132 protrudes and interlocks with a latch orifice 137 disposed in the end cap 133 to secure the end cap 133 to the furcation body 132. However, a one-piece molded furcation body 132 without a separate end cap 133 is also possible. The furcation body 132 has a first end 134 for receiving a fiber optic cable 22 along a longitudinal axis $A_{11}$ of the furcation body 132. A fiber optic cable is furcated inside a passage 136 disposed within the furcation body 132 between the first end 134 and a second end 138 of the furcation body 132. Once the fiber optic cable is furcated, one or more furcated legs 28 extend from the second end 138 to be connected to fiber optic components.

In order to secure the furcation body 132 to a mounting surface, the furcation body 132 has a substantially planar surface 126 disposed on its bottom wherein a plurality of support members 144 are attached. The furcation body 132 is integrally molded with support members 144 that support the furcation body 132. The support members 144 are also integrally formed with the attachment feature to mount and secure the furcation body 131. The attachment feature 146 is comprised of an integrally molded clip 148. The integrally molded clip 148 has a top substantially planar surface 150 to which the support members 144 are integrally molded. The top substantially planar surface 150 of the integrally molded clip 148 is aligned along the longitudinal axis $A_{11}$ of the furcation body 131 such that the entire furcation body 131 is supported. The integrated molded clip 148 also includes a plurality of substantially planar surfaces 149 to provide an anti-rotation feature in the furcation body 131. The substantially planar surfaces 149 are disposed on a bottom portion of the furcation body 131 and are configured to abut with a mounting surface when the furcation body 132 is mounted to a mounting surface.

The integrally molded clip 148 contains latch mechanisms in the form of two attachment latches 152A, 152B, wherein one attachment latch 152A is disposed on a first end 154 of the integrally molded clip 148 and the second attachment latch 152B is disposed on a second end 156 of the integrally molded clip 148. The attachment latches 152A, 152B are configured to engage suitable apertures in the mounting surface 30 using a compressible fit. In this regard, the integrally molded clip 148 contains a U-shaped compressible member 158 that attaches the attachment latch 152A to the integrally molded clip 148. In this manner, when the attachment latch 152A is placed in an aperture, a force can be asserted on the integrally molded clip 148 towards the first end 154 such that the attachment latch 152A will move forward in the aperture such that attachment latch 152B can be placed in another aperture. The compression energy contained in the compressible member 158 will exert a forward-biased force between the attachment latch 152A and an aperture such that the integrally molded clip 148 will be secured. When secured, the substantially planar surfaces 149 will abut with a mounting surface to provide an anti-rotation feature.

Figure 12A:
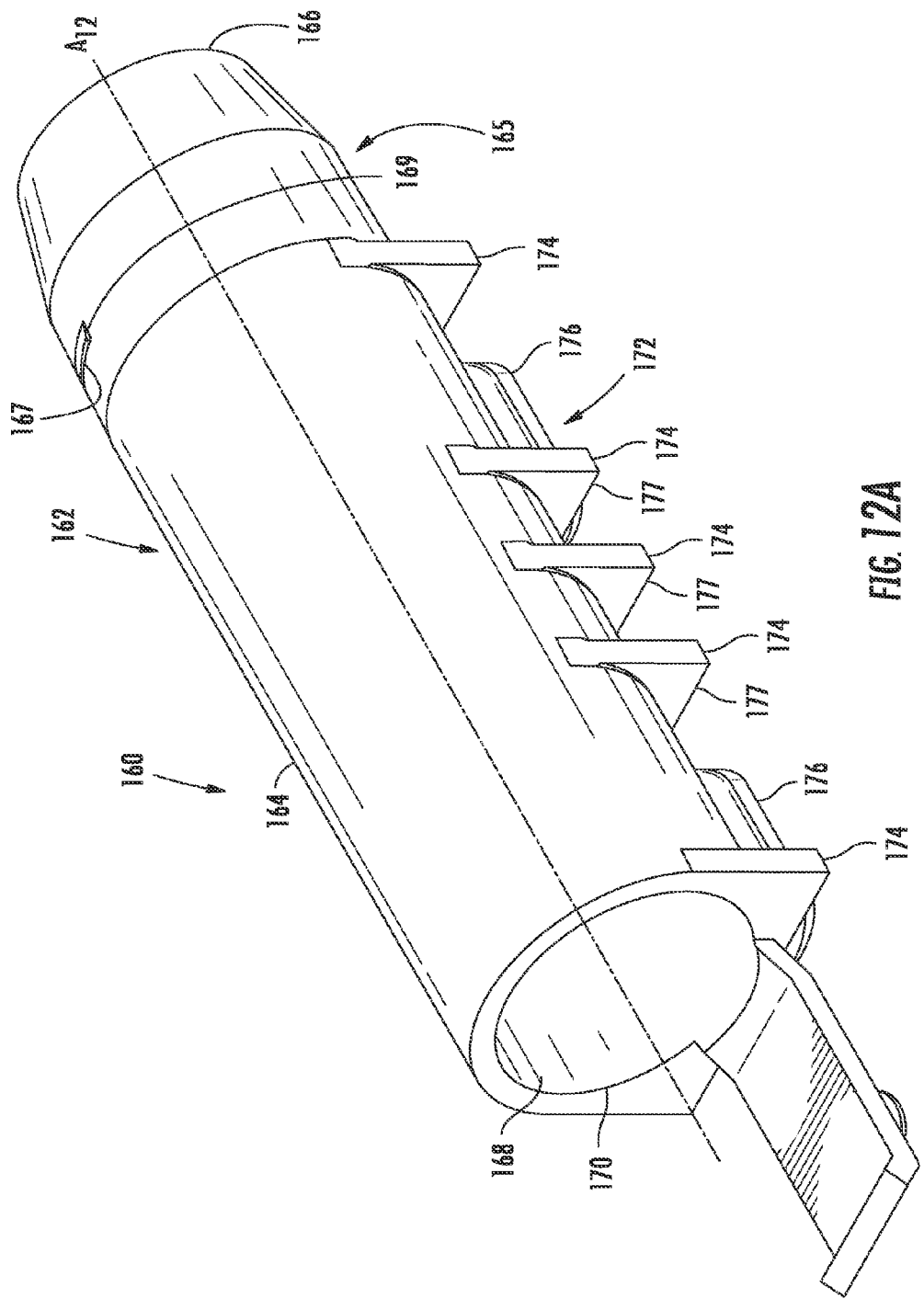
FIG. 12A illustrates a perspective view of another exemplary fiber optic cable assembly.

FIGS. 12A-12D illustrate another embodiment of a fiber optic cable assembly 160 having an anti-rotation feature for securing the furcation body to a suitable fiber optic shelf assembly. FIG. 12A is a perspective view of the fiber optic cable assembly 160 with a two-piece molded furcation body 162, but other structures are possible. The furcation body 162 includes an end cap 165 attached thereto. A latching finger 167 disposed in the furcation body 164 protrudes and interlocks with a latch orifice 169 disposed in the end cap 165 to secure the end cap 165 to the furcation body 164. However, a one-piece molded furcation body 164 without a separate end cap 165 is also possible. The furcation body 164 has a first end 166 for receiving a fiber optic cable (not shown) along a longitudinal axis $A_{12}$ of the furcation body 164. The fiber optic cable is received in a passage 168 disposed within the furcation body 164 between the first end 166 and a second end 170 of the furcation body 164. Therein, the fiber optic cable is furcated into a plurality of furcated legs (not shown) that extend out of the second end 170 of the furcation body 164 to attach to fiber optic components.

In order to secure the furcation body 162 of the cable assembly an attachment feature 172 is provided. The attachment feature is an integral portion of the furcation body 164. The furcation body 164 includes a plurality of attachment platform members 174 each having a substantially planar surface 177 to provide an anti-rotation feature (see also FIG. 12D). The furcation body 164 also includes keyhole members 176 attached via attachment platform supports 175 (see FIGS. 12B and 12C). The furcation body 162 and the attachment platform members 174 are mounted to a mounting surface when the keyhole members 176 are inserted into apertures. In this manner, the substantially planar surfaces 177 abut and rest flat against a mounting surface to provide an anti-rotation feature. This is further illustrated in the side, front, and bottom views of the fiber optic cable assembly 160 in FIGS. 12B-12D, respectively. As illustrated therein, the keyhole members 176 are shown as being disposed along the longitudinal axis $A_{12}$ below the surface of the furcation body 164 and the attachment platform members 174. Thus, when the keyhole members 176 are disposed in apertures, the substantially planar surfaces 177 of the attachment platform members 174 will abut with and rest against the mounting surface. In other variations, the keyhole members may be included on a clip that has a side with a living hinge that closes about the furcation body for securing the same within the clip.

FIG. 13 illustrates the fiber optic cable assemblies 160 of FIGS. 12A-12D installed on a mounting surface 180. The mounting surface 180 may be disposed in any suitable fiber optic shelf assembly. As illustrated in FIG. 13, the furcation body 162 receives a fiber optic cable 182 through the first end 166 of the furcation body 164. The fiber optic cable 182 is furcated inside the passage 168 of the furcation body 164 extending therethrough to the second end 170.

A plurality of furcated legs 184 extend through the second end 170 as illustrated. The mounting surface 180 comprises a series of keyholes 186 (i.e., apertures with a given shape) for allowing the fiber optic cable assembly 160 to be attached to the mounting surface 180. The keyhole members 176 are inserted into wide portions 188 of the keyholes 186 that will allow the geometry of the keyhole members 176 to pass therethrough. Thereafter, the furcation body 162 and its keyhole members 176 are pushed or pulled as indicated by the arrows 190 in FIG. 13 such that the attachment platform support 175 is inserted into narrow portions 192 of the keyholes 186. When locked therein, the substantially planar surfaces 177 abut with the mounting surface 180 to provide an anti-rotation feature for the fiber optic cable assembly 160. The keyhole members 176 cannot pass through the narrow portions 192 of the keyholes 186 such that the furcation body 162 is locked into place on the mounting surface 180.

To prevent the furcation body 162 from being pulled opposite of the direction of the arrows 190 such that the keyhole members 176 could be released from the mounting surface 180, a front locking mechanism 194 is provided. The front locking mechanism 194 comprises a T-shaped appendage 196 extending out of the second end 170 of the furcation body 164. The appendage 196 contains a pin 198 that is located in substantially the same plane as the attachment platform support 175. Thus, when the pin 198 is inserted into a pin aperture 199, as illustrated in FIG. 13, the furcation body 162 is prevented from moving laterally such that the furcation body 162 cannot accidentally be pushed forward opposite the direction of the arrows 190 such that the keyhole members 176 may be released from the keyholes 186 for an accidental removal or detachment from the mounting surface 180. Although shown and described as only being able to mount furcation body 164 in one direction relative to the keyholes 186, the keyholes may have a symmetrical profile so that the furcation body can also be mounted when rotated 180 degrees as shown and described in FIG. 16E (i.e., mounting in more than two different orientations).

FIGS. 14A and 14B illustrate another alternative fiber optic cable assembly 200 that may be employed for securing a furcation body that includes an anti-rotation feature. In this embodiment, the fiber optic cable assembly 200 includes a furcation body 202 that is comprised of a furcation body 204. A fiber optic cable 206 is received in a first end 208 of the furcation body 204 and extends through a passage 210 extending through the furcation body 204 to a second end 212 of the furcation body 204 along a longitudinal axis $A_{13}$ of the furcation body 204. The fiber optic cable 206 is furcated inside the passage 210 disposed in the furcation body 204 and furcated into a plurality of furcated legs 214 that extend from the second end 212. The furcation body 202 in this embodiment is not designed to be placed against a mounting surface to secure the furcation body 202. Instead, an attachment feature 216 is provided in the form of a clip 218. As shown, one or more clips 218 are placed around the furcation body 204 to secure it. The attachment feature 216 is then secured to a mounting surface to secure the furcation body 202. Unlike the clip 50 of FIG. 3A, the clip 218 of the attachment feature 216 in FIGS. 14A and 14B completely surrounds the furcation body 202 such that the furcation body 202 does not touch the mounting surface.

The clip 218 is comprised of an attachment housing 222. The attachment housing 222 is formed from an elongated rectangular shaped piece of material that is banner formed in a substantially rectangular shape with first and second ends 224, 226 coming together onto themselves. The attachment housing 222 contains a substantially planar surface 223 that is configured to abut with a mounting surface when the attachment housing 222 secures the furcation body 202 to a mounting surface to provide an anti-rotation feature. A series of protrusions or ridges 225 are disposed on the attachment housing 222 on the first end 224. A locking structure 230 is disposed on the second end 226 of the attachment housing 222 such that it is configured to lock the first end 224 onto the second end 226 to form the attachment housing 222. After being installed around the furcation body 204 as illustrated in FIG. 14A, the attachment housing 222 also contains a button structure 232 disposed within an inner wall 234 of the attachment housing 222 that is designed to couple with a button receiver 236 disposed within the furcation body 204. The furcation body 204 contains a notched portion 238 that contains a series of button receivers 236 around its outer surface such that the attachment housing 222 can be rotated in a number of directions around the furcation body 202 to secure the furcation body 202 to differently-oriented mounting surfaces as desired. The notched portion 238 has a width $W_1$ that is about the same width as the width $W_2$ of the attachment housing 222 such that the attachment housing 222 sits inside the notched portion 238 to provide a secure fit between the attachment housing 222 and the furcation body 204 when attached.

In order to secure the attachment housing 222 to a mounting surface, which in turn will secure the furcation body 202 to the mounting surface, an integrated plunger 240 is provided in the attachment housing 222. The integrated plunger 240 is disposed within a plunger orifice 226 disposed in the attachment housing 222. The integrated plunger 240 contains a plunger support 244 that has an outer diameter larger than the plunger orifice 226 such that the plunger support 244 rests inside the attachment housing 222. A plunger head 246 is coupled to a plunger flange 248 to selectively engage the plunger flange 248 to cause it to expand or retract. When the plunger head 246 is pushed down, the plunger flange 248 expands. When the plunger head 246 is pulled up, the plunger flange 248 contracts. Thus, to secure the attachment housing 222 to and abut the substantially planar surface 223 to a mounting surface, the plunger flange 248 is placed inside an aperture or orifice and a force is exerted down on the plunger head 246 to cause the plunger flange 248 to expand within the orifice or aperture. Thus, the plunger flange 248 is secured within the aperture or orifice to secure the attachment housing 222 therein. As a result, the furcation body 202 is held in place within the attachment housing 222 to the mounting surface.

FIGS. 15A and 15B illustrate alternate fiber optic cable assemblies 250, 250' that include an anti-rotation feature and attachment features to mount the fiber optic cable assemblies 250, 250' to mounting surfaces 252, 252'. As illustrated therein, the fiber optic cable assemblies 250, 250' include fiber optic cable 22 received in first ends 254, 254' of furcation bodies 256, 256'. The fiber optic cable 22 is received along longitudinal axes $A_{14}$, $A_{15}$ of the furcation bodies 256, 256', respectively. The fiber optic cable 22 is furcated inside the furcation bodies 256, 256' into a plurality of furcated legs 28 extending from second ends 258, 258' of the furcation bodies 256, 256' opposite the first ends 254, 254' of the furcation bodies 256, 256', respectively. The furcation bodies 256, 256' each contain substantially planar surfaces 260, 260' that abut with the mounting surfaces 252, 252', respectively, to provide an anti-rotation feature when the furcation bodies 256, 256' are mounted to the mounting surfaces 252, 252'.

The furcation bodies 256, 256' also contain attachment features 262, 262' to secure the furcation bodies 256, 256' to the mounting surfaces 252, 252'. With regard to the fiber optic cable assembly 250 in FIG. 15A, the attachment feature 262 is provided in the form of button attachment features 264A, 264B. The button attachment features 264A, 264B each provide a female button portion 266A, 266B attached to a bottom surface 268 of the furcation body 256. The female button portions 266A, 266B may be provided by either of the female button portions 270A, 270B illustrated in FIG. 15C as examples. The female button portions 266A, 266B attach to male button portions 272A, 272B to secure the furcation body 256 to the mounting surface 252. The male button portions 272A, 272B may be provided by either of the male button portions 274A, 274B illustrated in FIG. 15C as examples.

With regard to the fiber optic cable assembly 250' in FIG. 15B, an attachment feature 262' is provided in the form of button attachment features 264A', 264B'. However, in this embodiment, the button attachment features 264A', 264B' each provide a male button portion 272A', 272B' attached to the substantially planar surface 260' of the furcation body 256'. The male button portions 272A', 272B' may be provided by either of the male button portions 274A, 274B illustrated in FIG. 15C as examples. The male button portions 272A', 272B' attach to female button portions 266A', 266B' to secure the furcation body 256' to the mounting surface 252. The substantially planar surface 260' abuts with the mounting surface 252' to provide an anti-rotation feature in the furcation body 256'. The female button portions 266A, 266B may be provided by either of the female button portions 270A, 270B illustrated in FIG. 15C as examples.

FIGS. 16A-16C depict views of another clip 280 for securing a fiber optic cable assembly while providing an anti-rotation feature for the fiber optic cable assembly. FIGS. 16A-16C show clip 280 with a cover 282 in the open position. FIG. 16A illustrates a perspective view of clip 280 having cavity 286 for securing a fiber optic cable assembly therein such as shown in FIG. 3B. FIGS. 16B and 16C respectively show a bottom view of clip 280 and a side view of clip 280, thereby illustrating details of the same. Cavity 286 is generally defined by the body of clip 280 and a cover 282. Although cover 282 is depicted with a living hinge in this embodiment, other variations can have the cover formed as a separated component that snaps, slides, or otherwise attaches in another suitable manner to the clip for securing a fiber optic cable assembly therein. Cavity 286 is sized to hold one or more furcation plugs of the fiber optic cable assembly therein while inhibiting rotation of the same. For instance, FIG. 16G depicts a clip 280' that is sized for securing furcation bodies of two fiber optic cable assemblies. Moreover, clip 280' and the associated furcation plugs may be sized so the assembly fits within a 1 U shelf space (a height of 1.75 inches). Clip 280 also includes one or more suitable attachment features as disclosed herein for securing the same to a mounting surface. In this embodiment, clip 280 has the attachment features disposed on a bottom surface 285 of the clip 280 (i.e., the bottom surface of the clip is generally planar) for mounting the same. Like the other embodiments, clip 280 is advantageous because no tools are required for securing the same to the mounting surface. Further, clip 280 is also advantageous since its width is not much greater than the furcation body, thereby allowing for relatively high density of fiber optic cable assemblies on a mounting surface. However, other variations can use other types of attachment features for mounting similar clips such as attachment features that extend from the side of the clip.

As best shown in FIGS. 16B and 16C, each attachment feature of clip 280 is configured as a keyhole member 287 for engaging an aperture having a suitable profile. In this embodiment, the keyhole member 287 has a generally triangular shape that allows for insertion of the same into an appropriately sized aperture of the mounting surface. Additionally, the keyhole member 287 is offset from the bottom surface 285 by a slot guide 287a that directs the motion of clip 280 within the aperture. Clip 280 may also include one or more catches 288 for securing the same to the mounting surface. In this embodiment, catch 288 is located on the bottom surface 285 of clip 280. As shown, catch 288 is a protrusion having a round shape and will have a corresponding shaped portion located in the aperture of the mounting surface to enable engagement therewith. Consequently, clip 280 is slid within the aperture until the catch 288 aligns with and is seated within a corresponding portion of the aperture, thereby inhibiting inadvertent removal of clip 280 from the mounting surface. In this embodiment, catch 288 is located on a cantilevered portion 289 of clip 280 that is deflected slightly upward when sliding the clip 280 into the aperture to secure the same as discussed below.

Figure 16D:
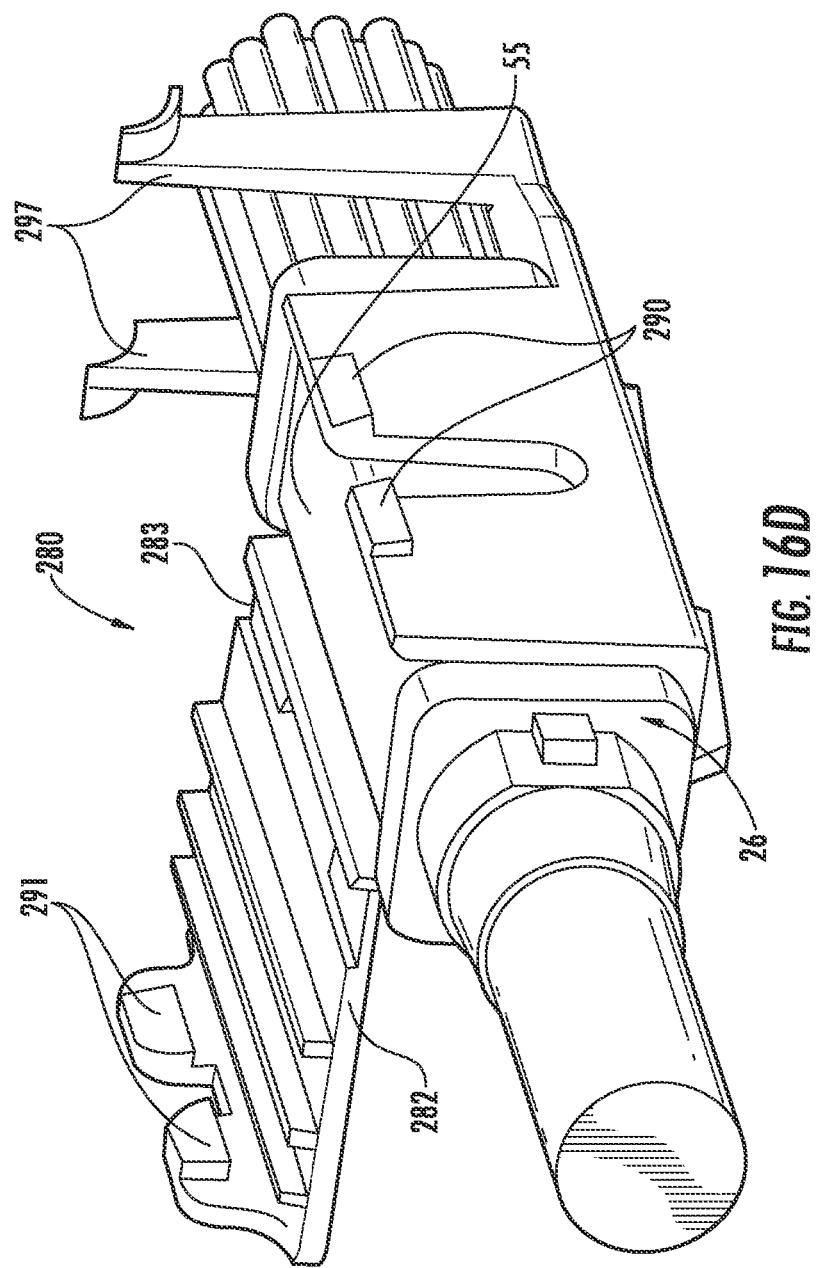
FIG. 16D depicts a perspective view of the clip of FIGS. 16A-16C receiving a portion of the fiber optic cable assembly therein.

FIG. 16D depicts the furcation body of the fiber optic cable assembly inserted into cavity 286 of clip 280 before cover 282 is closed. As depicted, furcation body 26 has a notched portion 55 that fits snugly within cavity 286, thereby inhibiting displacement of the same within the clip 280. The inner surface of cavity 286 of this embodiment includes a plurality of ribs (not numbered) for positioning and/or clamping furcation body 26 within cavity 286. Other embodiments can include other structures for securing the clip and/or inhibiting displacement of the furcation body such as longitudinal and/or rotational movement of the same. Thereafter, cover 282 may be closed to secure the furcation body 26 within the cavity 286 of clip 280.

Cover 282 is attached to clip 280 with a living hinge 283 that permits opening and closing of the same for removing or installing the furcation body 26 within clip 280. Cover 282 may also includes a plurality of ridges for thereon for pressing against the notched portion 55 of furcation body 26. Clip 280 also includes a plurality of cover latches 290 and cover 282 includes a plurality of complementary cover latches 291 that engage to secure the cover in a releasable snap-fitting arrangement. Additionally, a cutout (not numbered) is disposed between cover latches 290 for improving the flexibility for opening and closing cover 282. FIG. 16D also shows the furcated legs 28 of the fiber optic cable assembly being routed between a pair of guide arms 294. Cable portions of the fiber optic cable assembly are truncated for the purpose of simplicity. Besides acting as a routing guide for the furcated legs of the fiber optic cable assembly, guide arms 294 provide a lever to aid in the removal of clip 280 from the mounting surface. Specifically, the craft can push the end of one or both guide arms 294 toward the clip 280, thereby bending and lifting the cantilevered portion of clip 280 and releasing catch 288 from the mounting surface. In other words, the craft merely pushes on one or more of arcuate portions 297 of guide arms 295 toward the clip 280 to release catch 288, thereby allowing the removal of clip 280 from the mounting surface by sliding the same to disengage from the mounting surface.

Figure 16E:
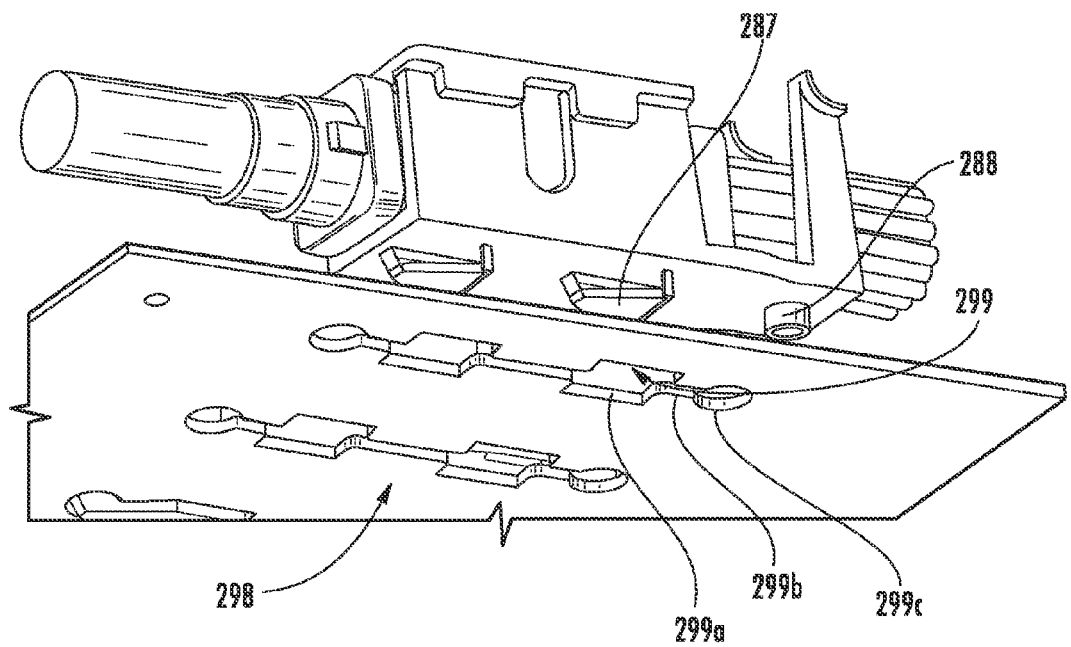
FIGS. 16E-16F depict perspective bottom views of the clip of FIGS. 16A-16C being secured to a mounting surface.
Figure 16F:
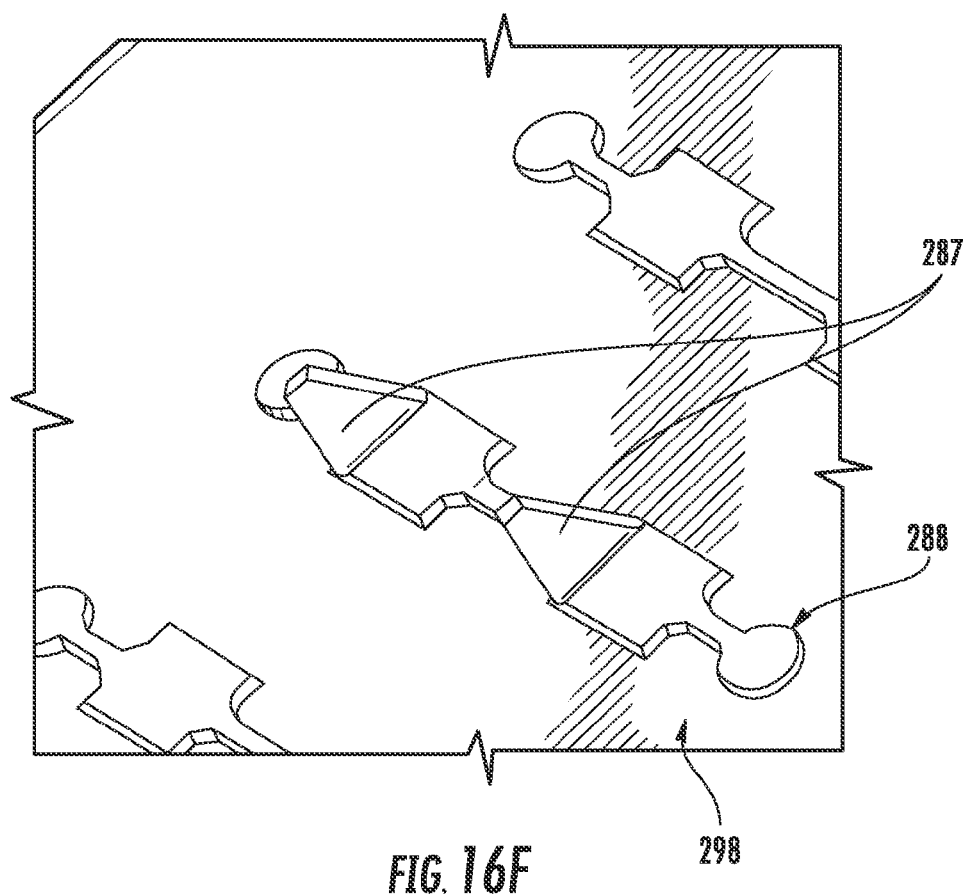
Figure 16G:
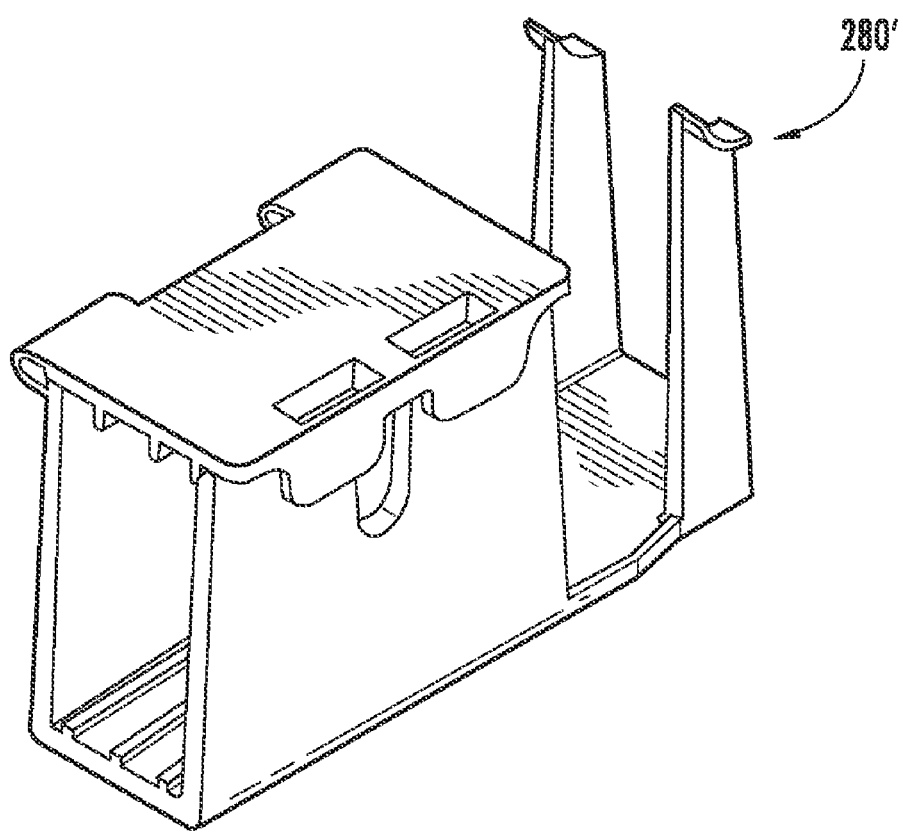
FIG. 16G is a perspective view of a clip similar to the clip of FIGS. 16A-16C which can secure a plurality of fiber optic cable assemblies.

FIGS. 16E and 16F show clip 280 being secured to an explanatory mounting surface 298 from a bottom view. FIG. 16E shows one such exemplary mounting aperture 299 formed on a mounting surface 298 such as a furcation management structure. Mounting aperture 299 is symmetric and advantageously allows mounting of clip 280 from either direction (i.e., mounting in more than two different orientations). Mounting aperture 299 has distinct portions such as a plurality of rectangular (or square) portions 299a, a plurality of slot portions 299b, and a plurality of round portions 299c as shown. As shown, slot portions 299b connect the respective rectangular portions 299a and each adjacent rectangular portion 299a and round portion 299c. In this embodiment, the aperture 299 receives respective keyhole members 287 within respective rectangular portions 299a of aperture 299, thereby allowing clip 280 to "drop" into the aperture 299. Thereafter, clip 280 is slid relative to the mounting surface 298 so that the keyhole member(s) 287 engage aperture 299 of mounting surface 298, thereby securing the clip 280 as shown in FIG. 16F. In other words, slot guides 287a of keyhole members 287 ride within slot portions 299b as clip 280 is secured. As clip 280 is fully seated, the catch 288 "pops" into the corresponding round portion 299c of the aperture when the clip 280 is fully seated, thereby securing the same. Although one particular geometry is shown for a cooperating aperture 299 and keyhole member 287 other variations are possible. For instance, catch 288 is shown as round, but it may have other suitable shapes such as square, rectangular, triangular, etc. Likewise, other variations of clip 280 are possible along with other features, configurations or the like. For instance, FIG. 16G depicts a clip 280' that is similar to clip 280, but is configured for securing a plurality of furcation bodies in a stacked arrangement; other variations include a clip holding a plurality of furcation bodies in a side-by-side arrangement.

Figure 17:
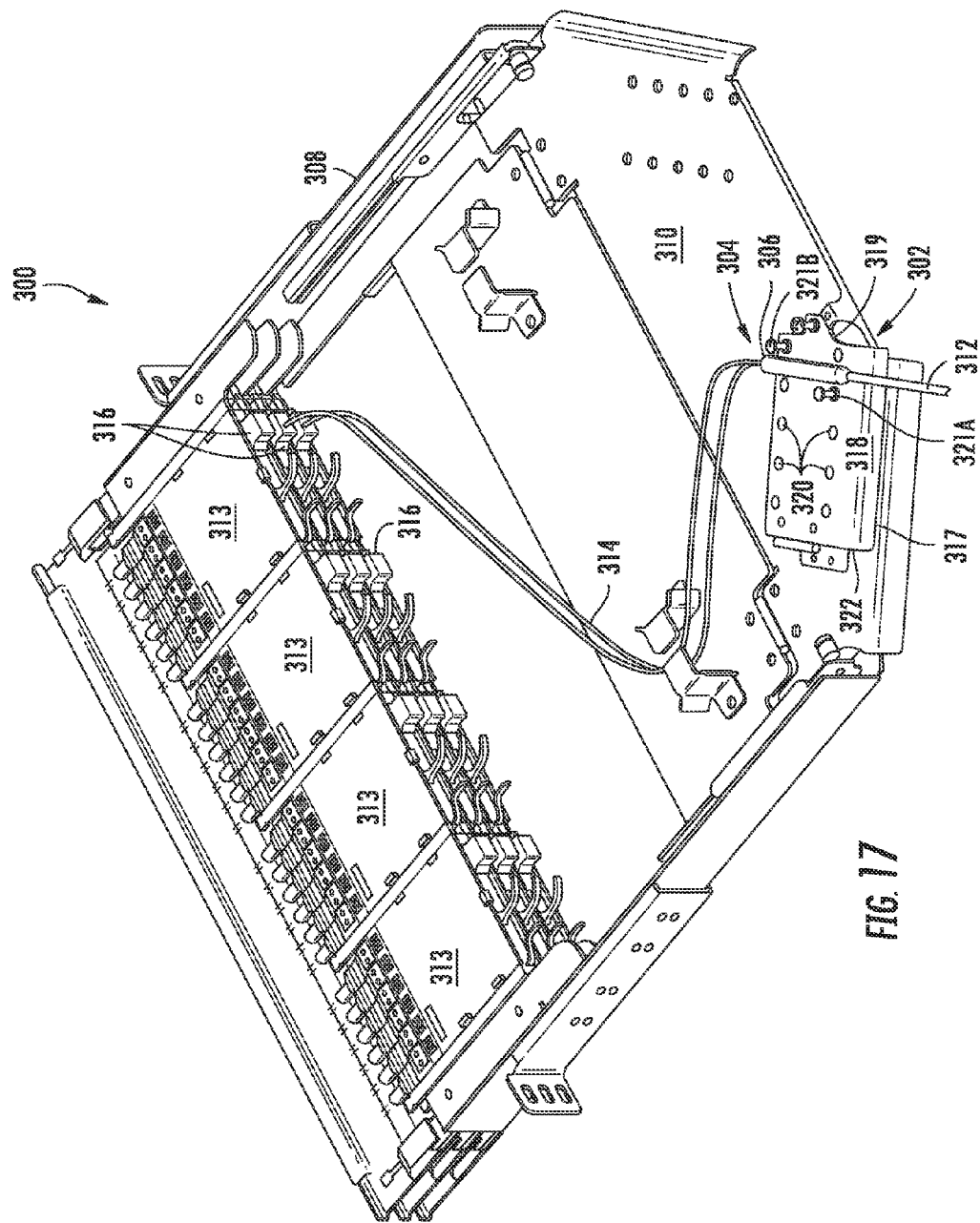
FIG. 17 is a rear perspective view of an exemplary fiber optic shelf assembly having a furcation management assembly.

Also disclosed are furcation management structures for mounting and/or managing a plurality of furcation bodies of respective fiber optic cable assemblies. Managing furcation assemblies can provide increased density of fiber optic cable assemblies supported by fiber optic equipment. FIG. 17 illustrates an embodiment of fiber optic equipment in the form of a fiber optic shelf assembly 300 providing one explanatory furcation management structure 302 having an array of apertures for mounting furcation bodies. A furcation management structure may be separate from and attachable and/or integrated into the fiber optic equipment such as a fiber optic shelf assembly for mounting one or more furcation assemblies. The furcation management structure 302 facilitates the management and routing of fiber optic cable assemblies 304 by securing one or more furcation bodies 306 thereto. Additionally, any suitable fiber optic cable assemblies 304 and/or furcation bodies 306 may be used.

As illustrated in FIG. 17, the furcation management structure 302 is attached to a chassis 308 of the fiber optic shelf assembly 300. More specifically, the furcation management structure 302 is attached to a rear portion 310 of the chassis 308. One or more fiber optic cables 312 of a fiber optic cable assembly 304 are typically routed to establish fiber optic connections with one or more fiber optic modules 313 provided in the fiber optic shelf assembly 300. The fiber optic cable assembly 304 includes furcation of the fiber optic cable 312 into one or more furcated legs 314, which are typically connectorized and connected to fiber optic adapters 316 disposed in the rear of the fiber optic modules 313.

To secure the fiber optic cable assembly 304 to the chassis 308, the furcation body 306 of the fiber optic cable assembly 304 is secured to the furcation management structure 302. In this embodiment, the furcation management structure 302 is comprised of a furcation bracket 317 comprising a mounting surface 318 containing an attachment feature in the form of a series of pre-defined apertures 320. The apertures 320 may be arranged like the apertures in the mounting surfaces previously described above. A securing device in the form of plungers 321A, 321B are disposed in an attachment feature of the furcation body 306, such as those previously described above, and secured to the apertures 320 in the furcation bracket 317 to mount the furcation body 306 to the furcation management structure 302. In this regard, the mounting surface 318 of the furcation bracket 317 is similar to the mounting surfaces previously described above. The furcation bracket 317 also contains a first end 319 and a second end 322 disposed on an opposite side of the first end 319. As will be described in more detail below, the furcation bracket 317 contains at least one portion that is removably attached to the chassis 308 such that additional furcation body of other fiber optic cable assemblies can be disposed underneath the furcation bracket 317 and mounted directly to the rear portion 310 of the chassis 308 to increase the density of fiber optic cable assemblies 304 that can be disposed in the fiber optic shelf assembly 300.

Figure 18:
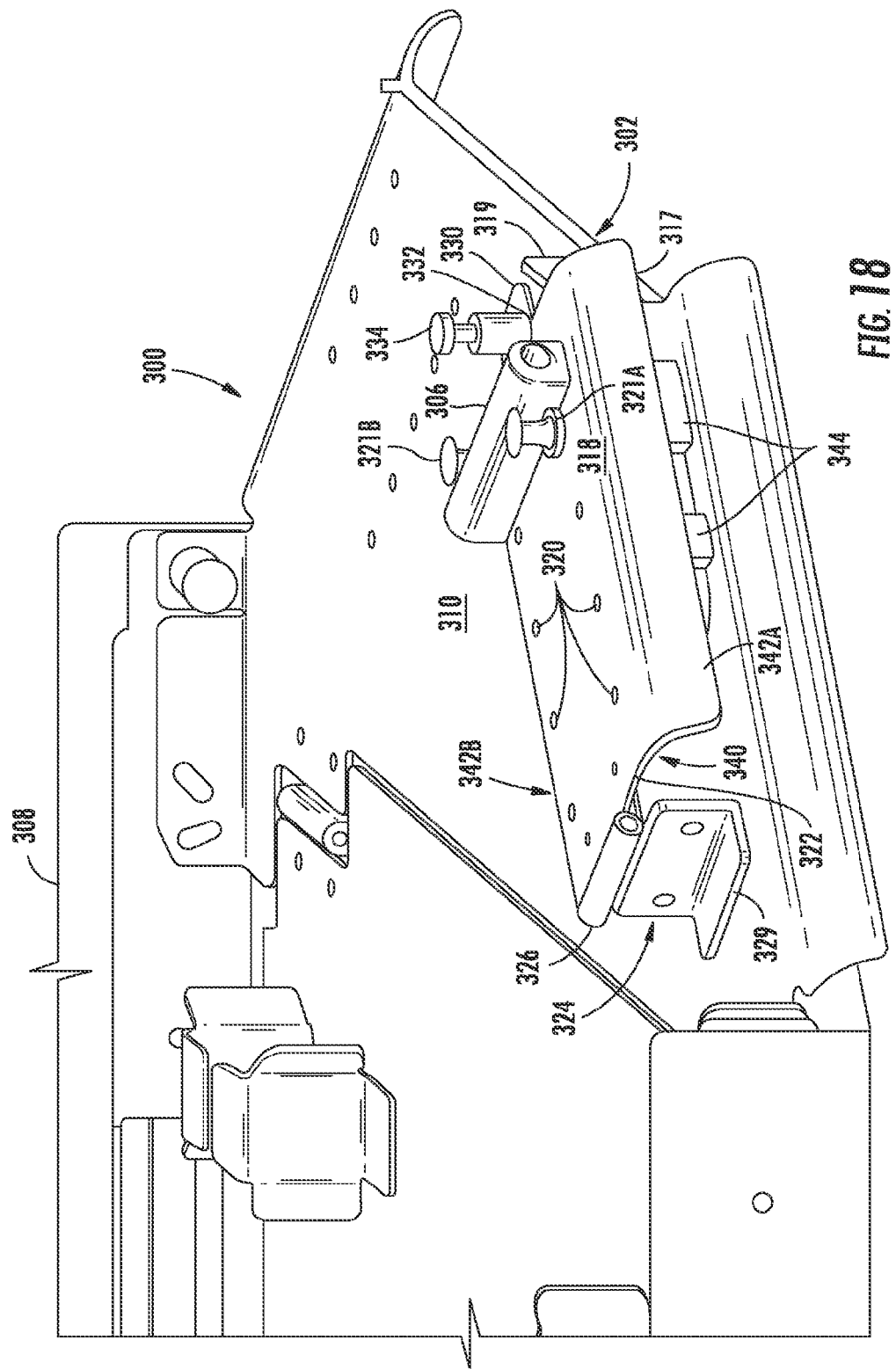
FIG. 18 is a close-up view of the furcation management assembly of FIG. 17 in a closed position.

FIG. 18 illustrates a close-up perspective view of the furcation management structure 302 with the furcation bracket 317 in a closed position. Only the furcation body 306 of the fiber optic cable assembly 304 is illustrated so as to not obstruct features discussed herein with regard to FIG. 18. However, the fiber optic cable 312 and furcated legs 314 would extend from the furcation body 306 in the actual fiber optic cable assembly 304. As illustrated, the furcation bracket 317 is hingedly mounted to the rear portion 310 via a hinge assembly 324. The hinge assembly 324 is comprised of a hinge 326 attached between a bottom side 328 (see FIG. 20) of the furcation bracket 317 on its second end 322 and the rear portion 310 of the chassis 308 via a standoff bracket 329. The hinge assembly 324 allows the furcation bracket 317 to be lifted on its first end 319 about the rear portion 310 for access underneath. The first end 319 is removably attached to the rear portion 310 via an attachment feature provided in the form of an attachment platform 330. The attachment platform 330 extends from the first end 319 of the furcation bracket 317 and contains an aperture 332 (see also, FIG. 19). A securing device in the form of a plunger 334 is disposed in the aperture 332 and is configured to cooperatively engage with an aperture 336 disposed in a standoff platform 338 (see FIG. 19) to be secured to the rear portion 310 in a closed position.

When closed, as illustrated in FIG. 18, the furcation bracket 317 forms an internal cavity 340 underneath the mounting surface 318 disposed between the first end 319, the second end 322, and curved surfaces 342A, 342B disposed orthogonally therebetween. The curved surfaces 342A, 342B provide a waterfall feature for the fiber optic cables 312 and the furcated legs 314 to lay over or against to prevent or reduce bending or kinking when installed on the furcation bracket 317. The internal cavity 340 provides for additional furcation bodies 344 (see also, FIG. 19) to be attached directly to the rear portion 310 underneath the furcation bracket 317 to allow for an increased density of fiber optic cable assemblies to be included in the fiber optic shelf assembly 300.

Figure 19:
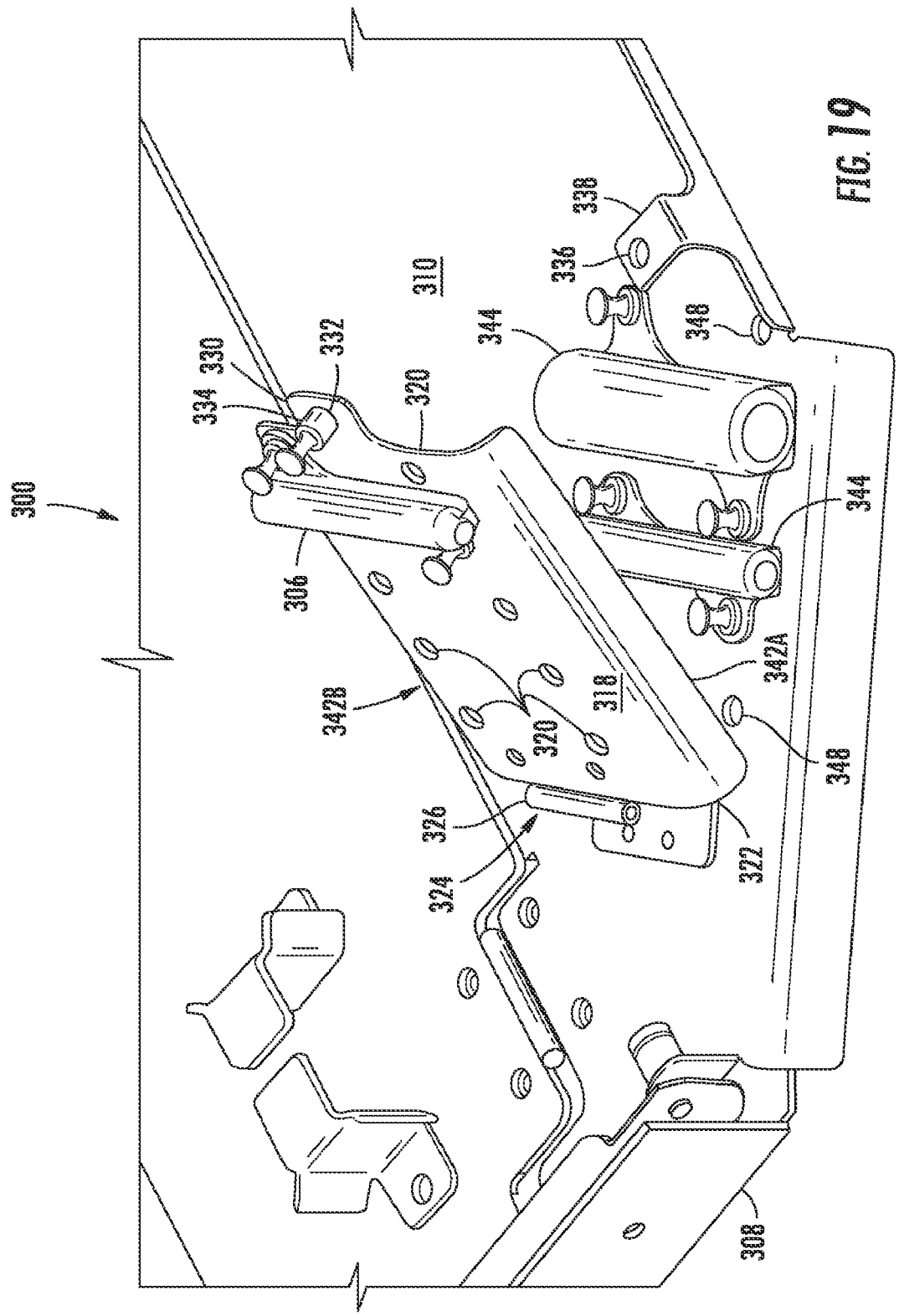
FIGS. 19 and 20 are different perspective close-up views of the furcation management assembly of FIG. 17 in an open position.
Figure 20:
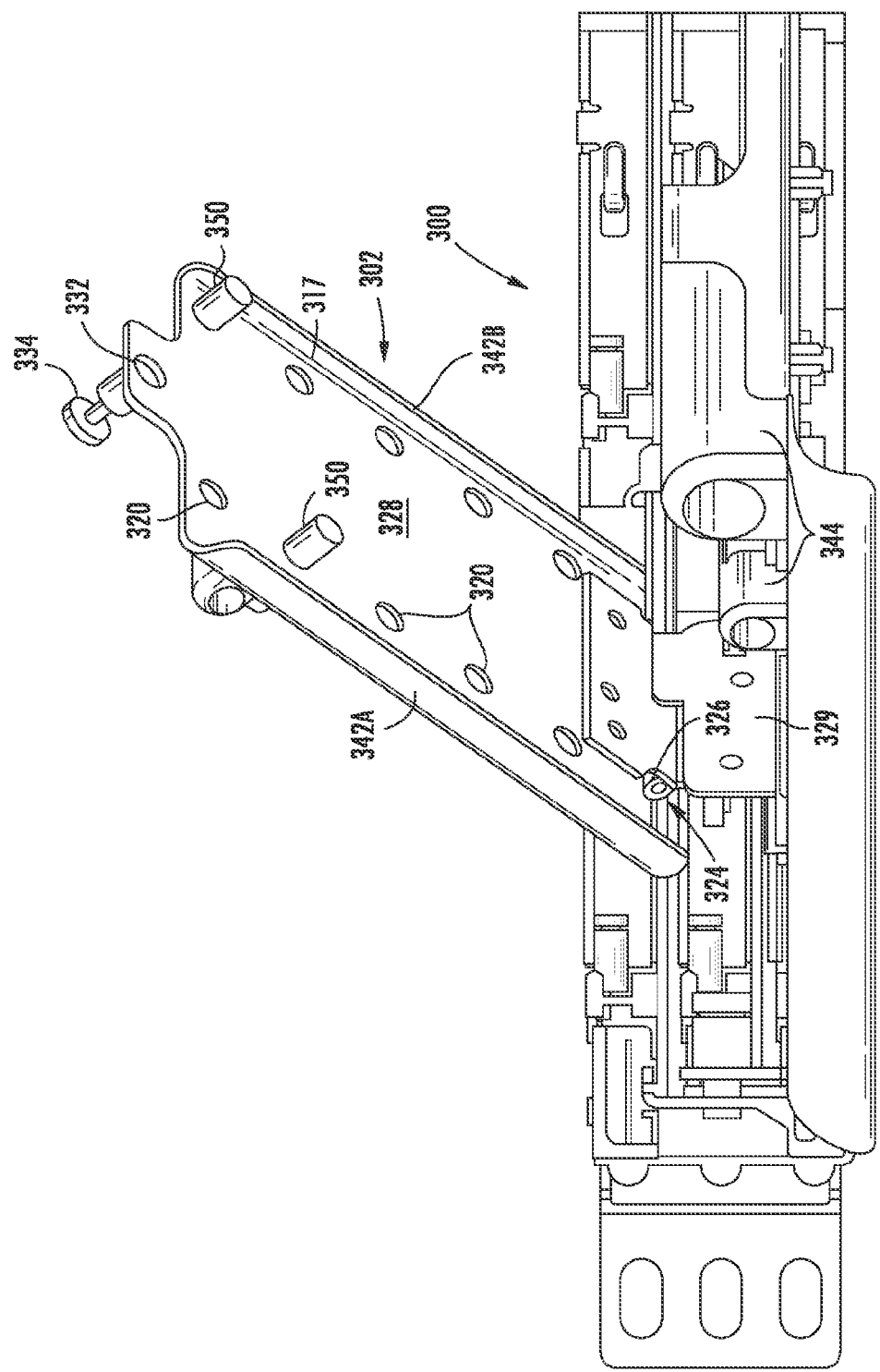

FIGS. 19 and 20 illustrate the furcation bracket 317 in an open position. In this manner, the first end 319 of the furcation bracket 317 is detached from the standoff platform 338 via release of the plunger 334 from the aperture 336. The hinge assembly 324 contains an internal spring (not shown) to bias the furcation bracket 317 in the open position when not secured to the standoff platform 338. As illustrated in FIGS. 19 and 20, the rear portion 310 has a series of apertures 348 to receive securing devices for attachment features of the furcation bodies 344 disposed beneath the furcation bracket 317, which may include the configurations previously provided and described in FIGS. 1-16. Further, one or more standoffs 350 may be disposed on the bottom side 328 of the furcation bracket 317 that rest against the rear portion 310 to provide additional support when the furcation bracket 317 is closed.

FIGS. 21-27 illustrate various additional embodiments of furcation management structures and/or assemblies that may be employed to manage furcation bodies of fiber optic cable assemblies. In these embodiments, one or more furcation trays 352 disposed in fiber optic equipment in the form of a fiber optic shelf assembly 354 are provided. Further, the furcation management structures may include one or more furcation platforms 356 that mount to the fiber optic equipment, thereby making it possible to retrofit into existing equipment. In other embodiments, the furcation management structure is integrated into the fiber optic shelf assembly. Both the furcation trays 352 and furcation platforms 356 are disposed on a bottom mounting surface 359 in a rear portion 357 of the fiber optic shelf assembly 354 to support one or more furcation bodies of respective fiber optic cable assemblies 357. Of course, trays, platforms or the like could be mounted on other surfaces such as the sides or top of the fiber optic shelf assembly. These fiber optic cable assemblies 357 include furcation bodies 358 receiving a fiber optic cable 360 and providing one or more furcated legs 362. The furcated legs 362 may be connectorized with fiber optic connectors and connected to fiber optic adapters 364 disposed in one or more fiber optic modules 366 in the fiber optic shelf assembly 354. Furcation management structures such as furcation trays 352 and furcation platforms 356 facilitate providing higher density of fiber optic cable assemblies 357 in the fiber optic shelf assembly 354 along with improved organization.

Figure 21:
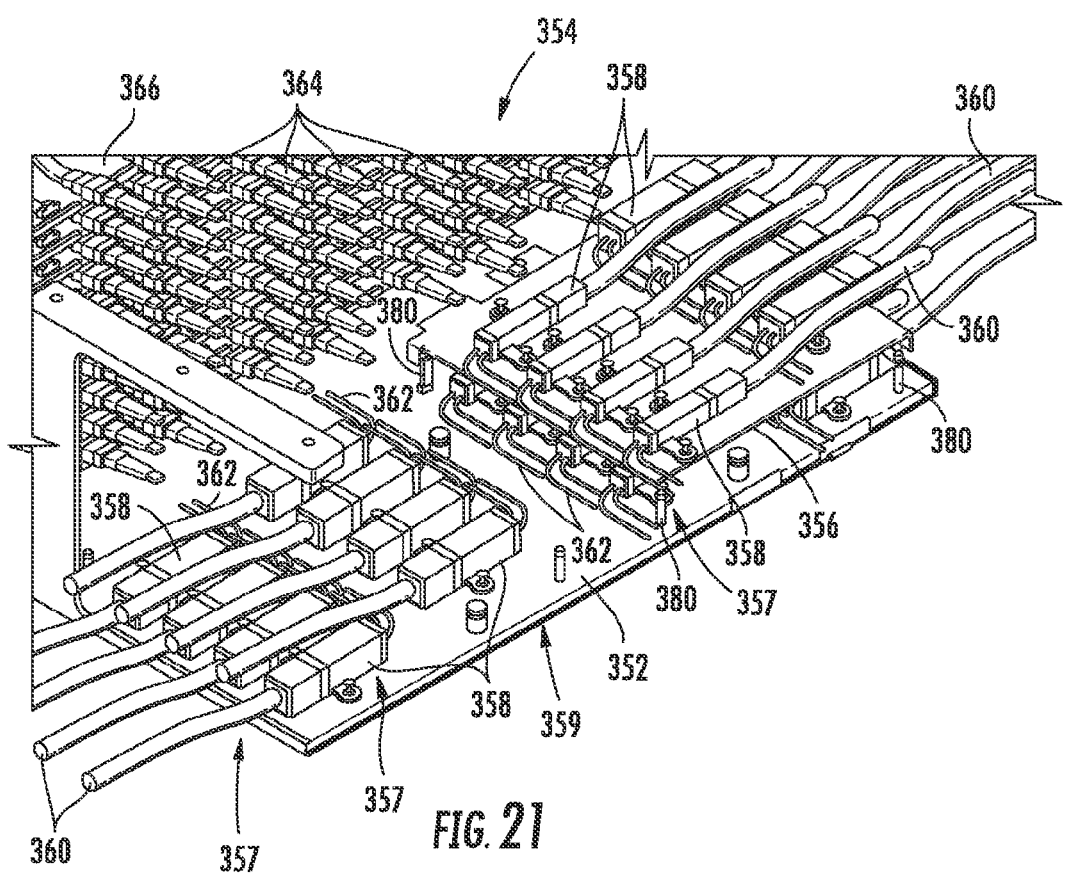
FIG. 21 illustrates a rear perspective view of an alternate exemplary fiber optic shelf assembly having an alternate furcation management assembly.
Figure 22:
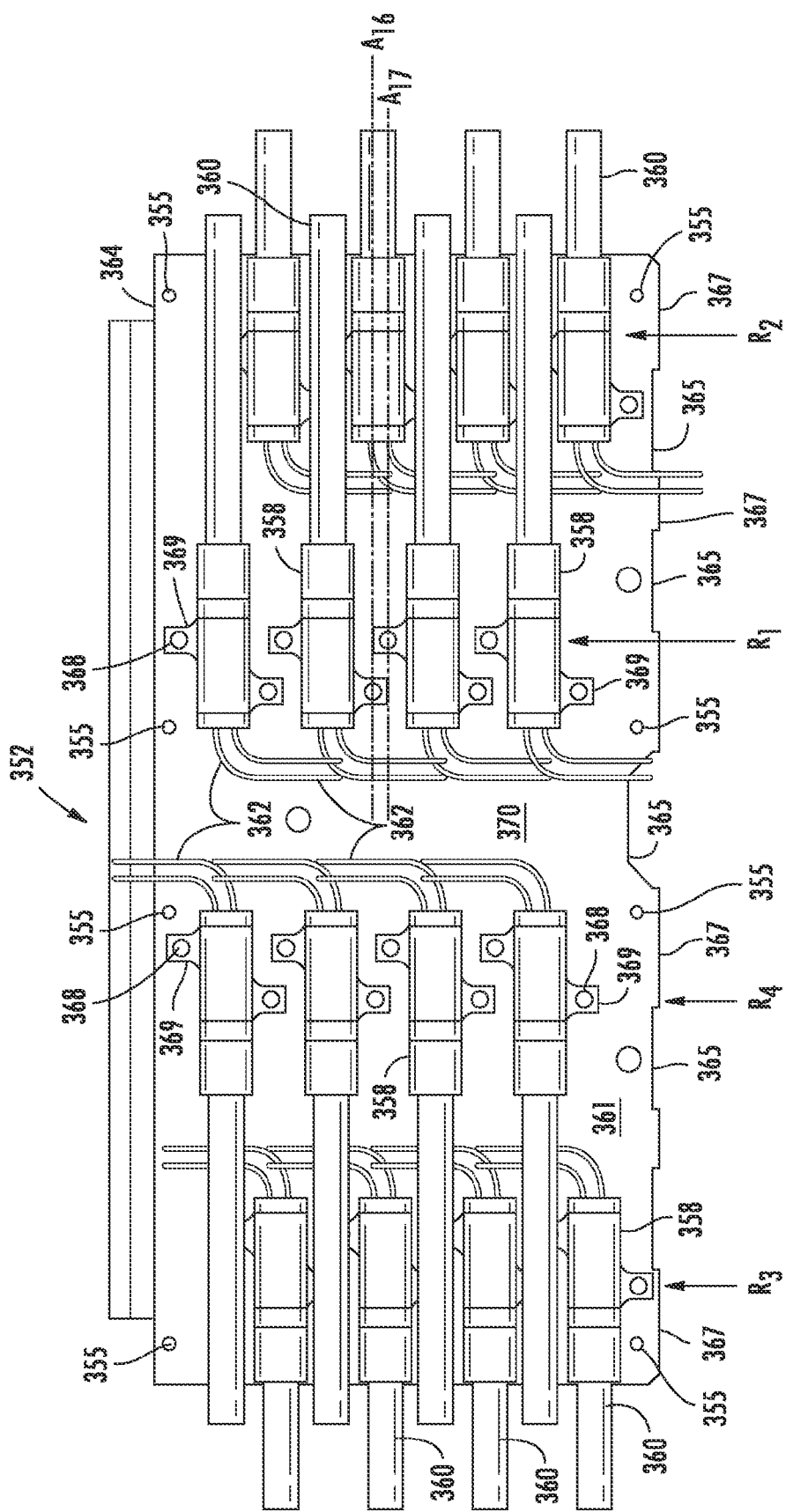
FIG. 22 illustrates a top view of the furcation tray disposed in the fiber optic shelf assembly of FIG. 21.

FIG. 22 illustrates a top view of a furcation tray 352 that is disposed in the fiber optic shelf assembly 354 in FIG. 21 in more detail. As illustrated therein, the furcation tray 352 is comprised of a mounting surface 361. By way of example, the furcation tray 352 may be constructed out of any suitable material such as sheet metal, aluminum, plastic, and the like. The furcation tray 352 may contain a series of indentures 365 and protrusions 367 on outer edges of the furcation tray 352 that are configured to cooperate with opposing protrusions and indentures disposed on the mounting surface 359 of the fiber optic shelf assembly 354. A series of pre-defined apertures 355 may also be provided in the mounting surface 359 to receive fasteners (not shown) for securing the furcation tray 352 to the fiber optic shelf assembly 354.

Similar to the mounting surfaces previously described herein, the mounting surface 361 of the furcation tray 352 contains a series of pre-defined apertures 368 that receive securing devices 371 (see FIG. 24) disposed in an attachment feature 369 of the furcation body 358. The apertures 368 are located in offsetting axes (e.g., $A_{16}$, $A_{17}$) such that the fiber optic cable 360 of one furcation body 358 disposed in a first row (e.g., $R_1$) is disposed in between two adjacent furcation bodies 358 in a second row (e.g, $R_2$). This allows two rows (e.g., $R_1$, $R_2$) of furcation bodies 358 facing the same direction to be located in the furcation tray 352 to provide for greater density furcation management. In the example of FIG. 22, the furcation tray 352 includes eight (8) furcation bodies 358 facing the same direction. Similarly the furcation tray 352 includes eight (8) additional furcation bodies 358 in rows $R_3$ and $R_4$ facing an opposite direction of the furcation bodies 358 in rows $R_1$ and $R_2$ to provide for a total of sixteen (16) furcation bodies 358. In this embodiment, the furcated legs 362 are all routed to a center section 370 of the furcation tray 352 for routing to the fiber optic modules 366.

Figure 23:
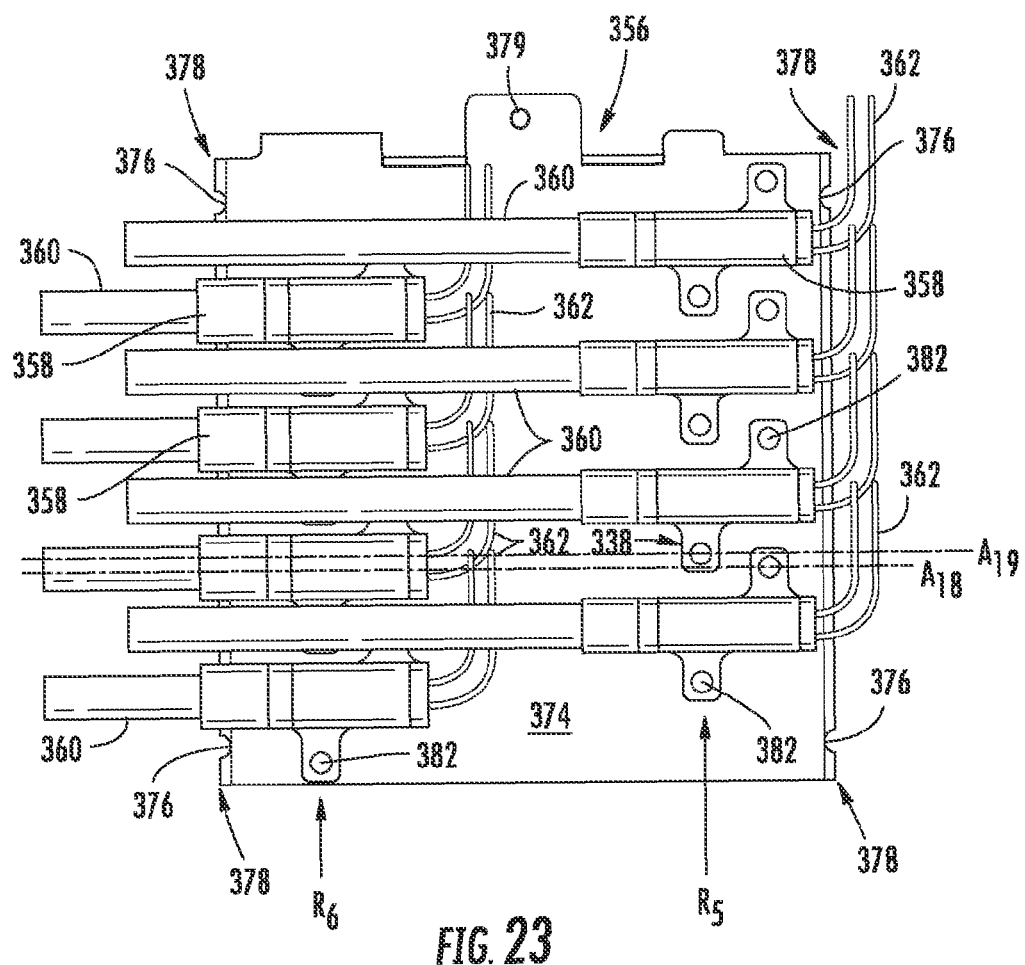
FIG. 23 illustrates a furcation platform provided in the fiber optic shelf assembly of FIG. 21.

To provide even greater density possibilities in the fiber optic shelf assembly 354 of FIG. 21, one or more furcation platforms 356 may also be disposed in the fiber optic shelf assembly 354 to provide additional furcation management. One furcation platform 356 is illustrated as being provided in FIG. 21; however, additional furcation platforms 356 can be disposed above the furcation tray 352 in a stacked arrangement in the Y-axis ("Y") (see FIG. 25), as desired. As illustrated in FIG. 23, the furcation platform 356 contains a mounting surface 374 similar to the mounting surface 361 of the furcation tray 352. One or more indentures 376 are provided in corners 378 of the furcation platform 356 to mount the furcation platform 356 above the furcation tray 352. The furcation platform 356 is mounted to standoffs 380 (FIG. 21) inserted into the indentures 376. As will be described later below with regard to FIG. 24, an additional aperture 379 is provided for mounting the furcation platform 356 as an appendage from the furcation tray 352. In this manner, the furcation platform 356 is mounted above the mounting surface 359 of the fiber optic shelf assembly 354 similar to the furcation bracket 317 to provide additional mounting space for fiber optic cable assemblies.

Similar to the furcation tray 352, the mounting surface 374 of the furcation platform 356 contains a series of pre-defined apertures 382 that receive securing devices disposed in attachment features of the furcation bodies 358. The apertures 382 are located in offsetting axes (e.g., $A_{18}$, $A_{19}$) such that the fiber optic cable 360 of one furcation body 358 disposed in a first row (e.g., $R_5$) is disposed in between two adjacent furcation bodies 358 in a second row (e.g, $R_6$). This allows two rows (e.g., $R_5$, $R_6$) of furcation bodies 358 facing the same direction to be located in the furcation platform 356 to provide for greater density furcation management. In the example of FIG. 23, the furcation tray 352 includes eight (8) furcation bodies 358 facing the same direction.

Figure 24:
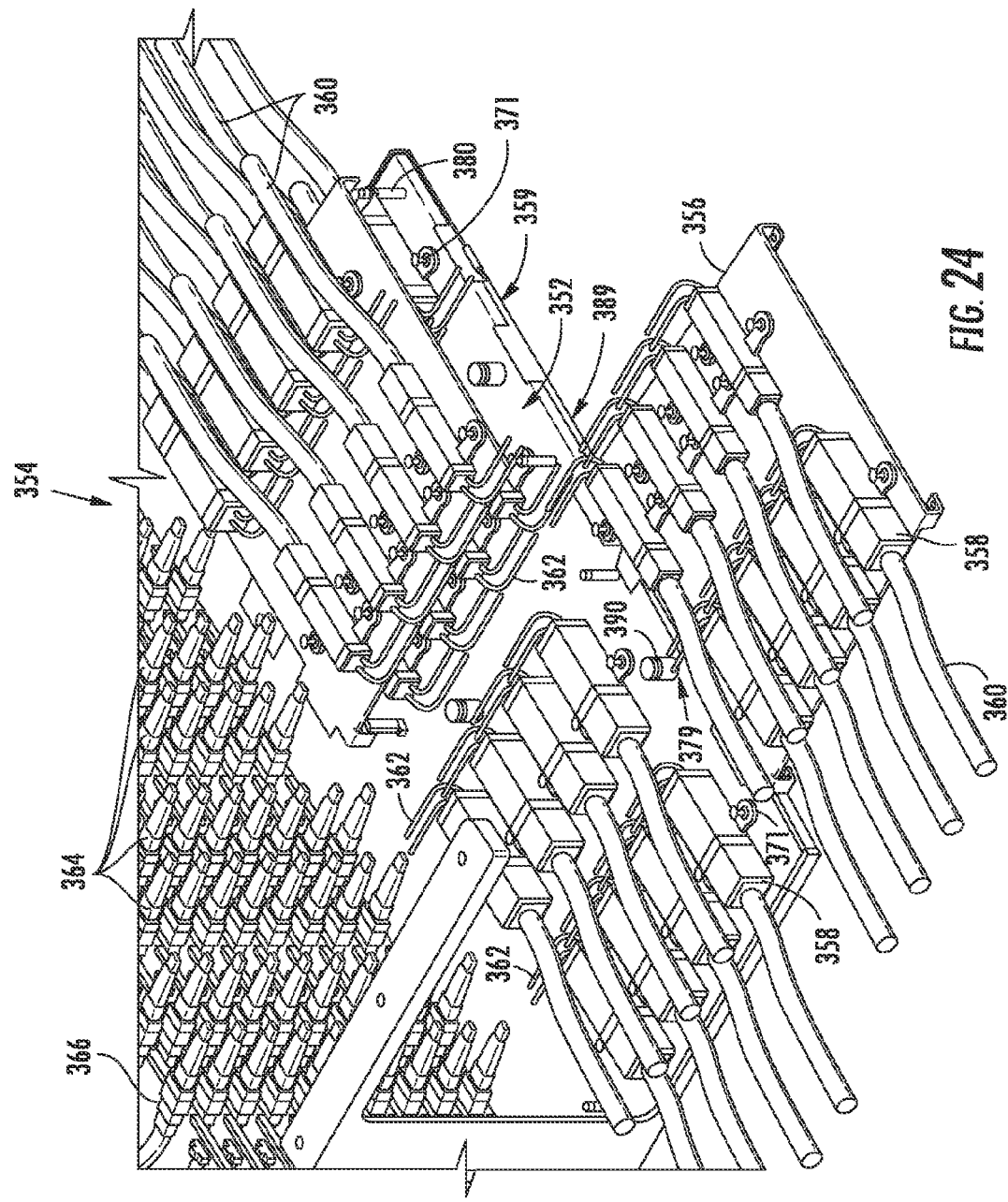
FIG. 24 illustrates the furcation platform of FIG. 23 disposed as an appendage to the fiber optic shelf assembly of FIG. 21.

FIG. 24 illustrates a furcation platform 356 provided as an appendage to a furcation tray 352 and a fiber optic shelf assembly 354 to provide additional options for providing additional furcation management. The furcation platform 356 and furcation bodies 358 secured therein are the same as illustrated in FIG. 22. The furcation platform 356 is secured to a rear side 389 of the fiber optic shelf assembly 354 via the additional aperture 379, which receives a securing device 390 disposed in the furcation tray 352 to secure the furcation platform 356 to the fiber optic shelf assembly 354.

Figure 25:
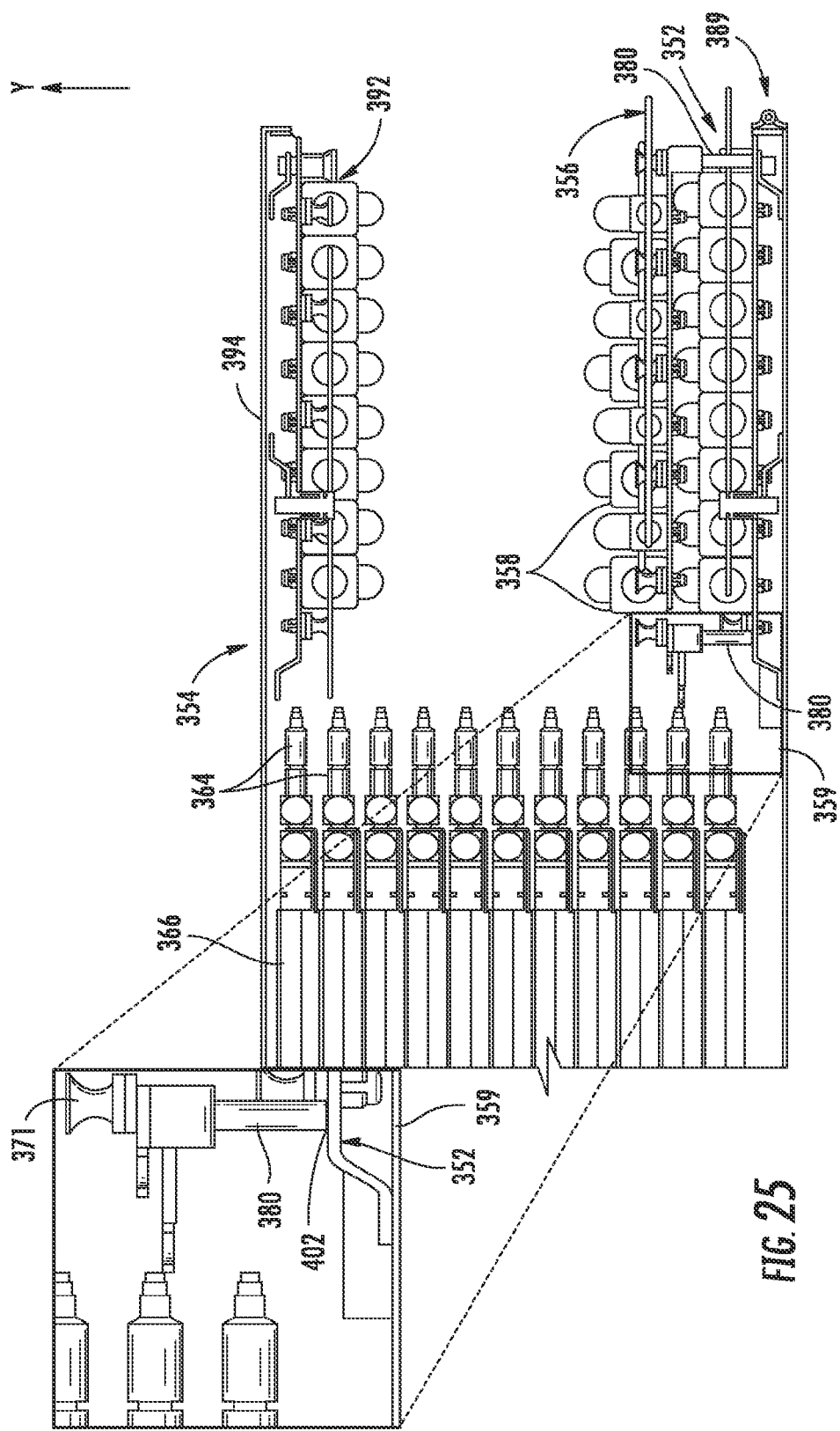
FIG. 25 illustrates a side view of the fiber optic shelf assembly of FIG. 21 including an additional top furcation tray.
Figure 26:
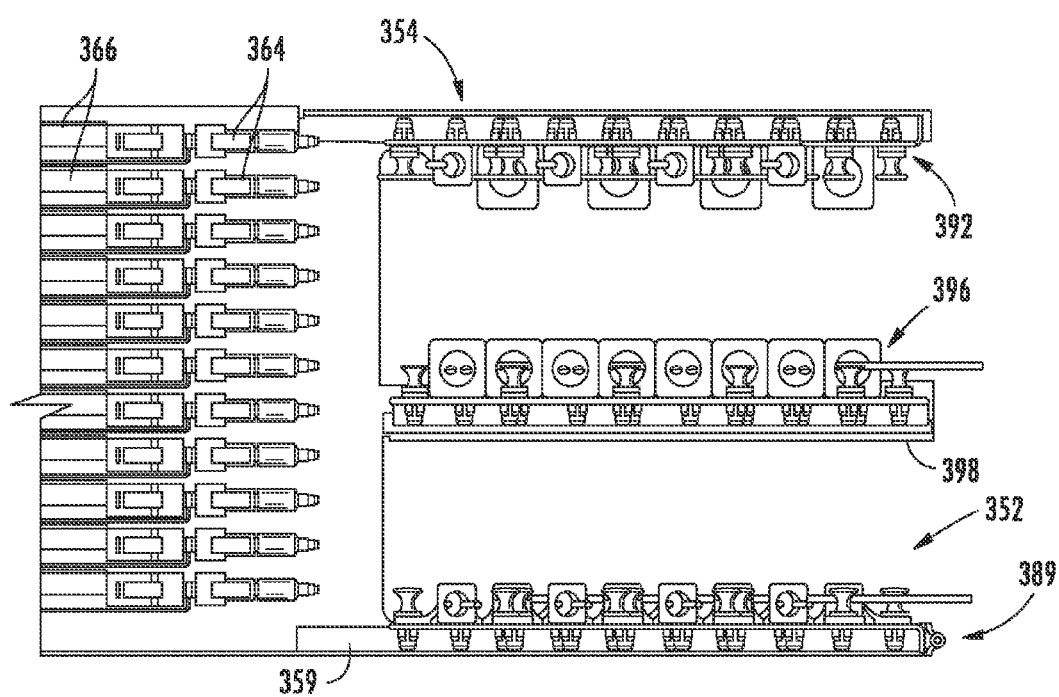
FIG. 26 is a side view of the fiber optic shelf assembly of FIG. 21 providing top, bottom, and intermediate furcation trays.

FIG. 25 illustrates a side view of the fiber optic shelf assembly 354 of FIG. 21, and illustrates a furcation tray 392 disposed on a top shelf 394 of the fiber optic shelf assembly 354 to provide additional furcation management. In this illustration, in addition to a furcation tray 352 and a furcation platform 356 mounted on the furcation tray 352 being disposed on the bottom mounting surface 359 of the fiber optic shelf assembly 300, the top shelf 394 provides another mounting surface to mount additional furcation trays 392 and/or furcation platforms (not included in FIG. 25), if desired. In this manner, the furcation tray 392 may be provided that contains the same features as the furcation tray 352 illustrated in FIG. 22 and thus will not be repeated here. Further, FIG. 25 illustrates more detail regarding the standoff 380 to support a furcation platform 356 disposed above the furcation tray 352. The standoff 380 is disposed in a standoff orifice 402 disposed in the furcation tray 352 and into the mounting surface 359. FIG. 26 illustrates the fiber optic shelf assembly 354 as well, but with an intermediate shelf 396 provided. The intermediate shelf 396 can support an intermediate furcation tray 398 for providing furcation management. In this manner, the furcation tray 392 may be provided that contains the same features as the furcation tray 352 illustrated in FIG. 22 and thus will not be repeated here.

FIG. 27 illustrates furcation management structures such as furcation trays, platforms or the like may be slidable with respect to the fiber optic shelf assembly 354 to be translated in and out from the fiber optic shelf assembly 354. Translation of a furcation tray allows access to any fiber optic cable assemblies, including their furcation bodies, disposed in the furcation tray for access, routing, configuration, reconfiguration, etc. As illustrated, the intermediate furcation tray 398 is translated out from the fiber optic shelf assembly 354. The intermediate furcation tray 398 is disposed between shelves provided in the form of shelf supports 410A, 410B on each side of the rear side 389 of the fiber optic shelf assembly 354. The shelf supports 410A, 410B include a guide system in the form of rail guides 412A, 412B. The rail guides 412A, 412B receive rails 413A, 413B disposed on each side of a rear side 414 and a front side 416 of the intermediate furcation tray 398. In this manner, the intermediate furcation tray 398 can be pulled and pushed about on the rails 413A, 413B to translate in and out of the fiber optic shelf assembly 354 about the rails guides 412A, 412B. The rail guides 412A, 412B is provided in FIG. 27 as a friction fit guide system; however, a bearing guide system, or any other type of guide system may be employed.

FIGS. 28-30 depict a various views of another alternate furcation management structure mounted in a fiber optic shelf assembly. As shown, fiber optic shelf assembly 354 includes two furcation platforms 356 (i.e., a plurality of furcation management structures) mounted on opposing sides of the fiber optic shelf assembly for securing and managing respective fiber optic cable assemblies 357 that are routed therein. As best shown in FIGS. 29 and 30, furcation platform 356 has multiple levels 356a and 356b for securing the furcation bodies. Moreover, the multiple levels are located on non-parallel planes, but it is possible to locate the multiple levels on generally parallel planes. Having different mounting levels allows angling the cable assemblies on the inner level upward at the rear portion to inhibit interference with the cable assemblies on the outer level. In other words, the cables assemblies on the inner level tend to ramp over the cable assemblies on the outer level as shown in FIG. 29. Moreover, this arrangement allows for improved finger access for the craft. Also this multi-level construction can be used on furcation management assemblies that extend, translate (i.e., the tray moves) and/or rotate for access. Still other embodiments can have more than two levels, stack the platforms, have the platforms hingely mounted and/or other arrangements as discussed herein. Likewise, although depicted with cable assemblies having furcation bodies that mount using clips any suitable type of furcation body may be used. FIG. 30 shows that furcation platforms 356 are mounted to the sides of fiber optic shelf assembly 354 using a suitable fasenter 393 such as screws, but they mount to the rear, top, or other location. Of course, other fasteners are possible. Other variations of furcation platforms and furcation trays are possible according to the concepts disclosed herein.

Figure 31D:
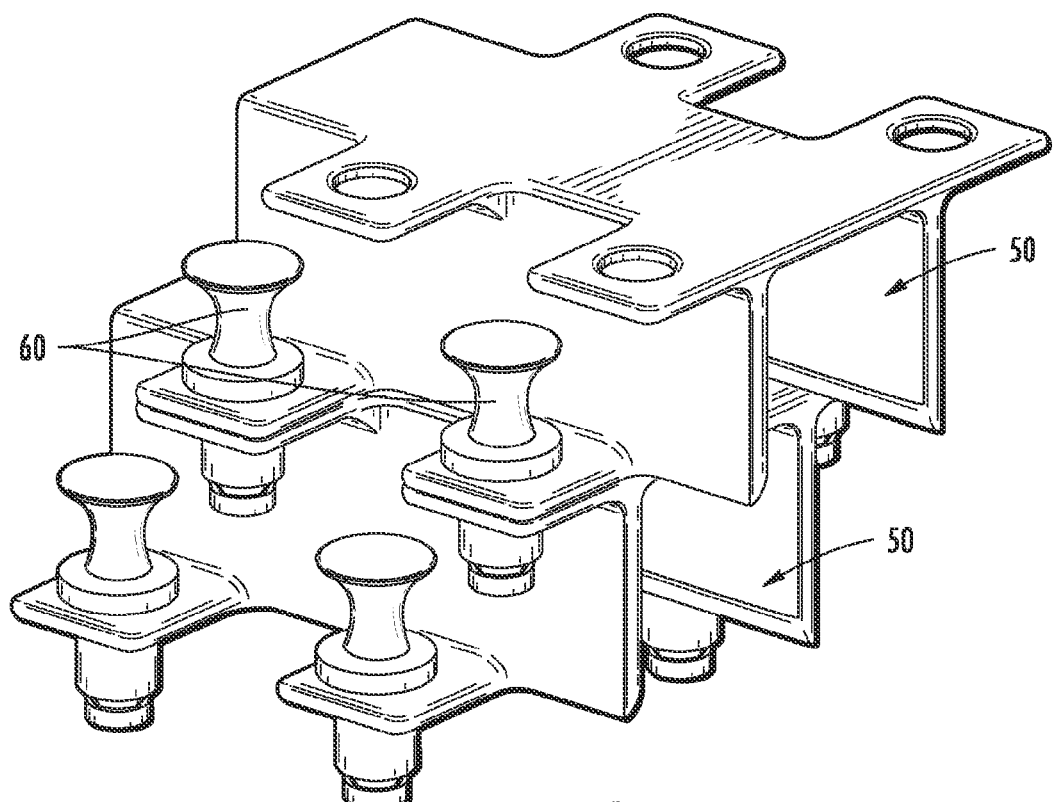

Likewise, variations are also possible to structures disclosed herein such as the clips for securing the furcation body. For instance, FIGS. 31A-31D show perspective views of other clips for securing furcation bodies of fiber optic cable assemblies. In more detail, FIG. 31A depicts clip 50 for securing a plurality of furcation bodies 26 of cable assemblies in a vertical arrangement; instead of a horizontal arrangement. This arrangement is most advantageous when the furcation bodies are smaller, but may be used with any size furcation body. Moreover, other variations of the clip may be configured to secure any suitable number of rows and/or columns of furcation bodies secured by the clip. Other variations of clips can modify the number and/or location of attachment platforms on the clips as shown in FIGS. 31B and 31C. More specifically, the clip of FIG. 31B has four attachment platforms with respective apertures that receive plungers for securing the same and the clip of FIG. 31C has three attachment platforms. Other clip variations include having attachment platforms with apertures on upper and lower surfaces, thereby creating a vertical stacking arrangement as shown in FIG. 31D. The furcation bodies are not shown in the view so that the stacking arrangement is visible. Simply stated, one or more plungers 60 are used to secure a first clip to as second clip as shown to increase the fiber optic cable assembly density of the structure or assembly.

Figure 33:
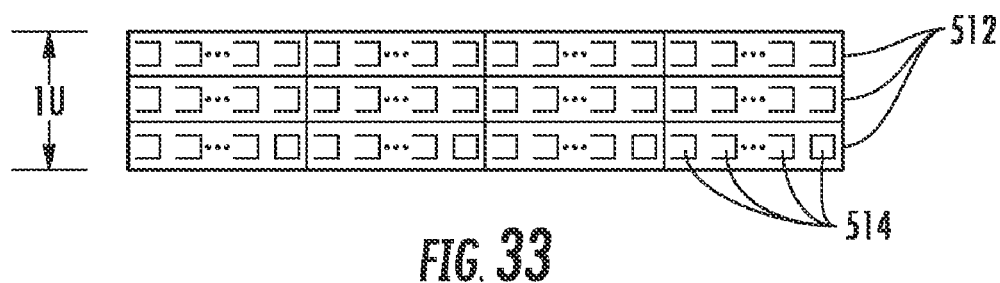
FIGS. 33 and 33A respectively schematically represent a fiber optic shelf assembly and rack for mounting fiber optic shelf assemblies.

As discussed, the concepts disclosed herein advantageously allows securing relatively large numbers of furcation bodies within fiber optic shelf assemblies and the like while still allowing easy access for the craft. Moreover, the relatively large number of furcation bodies can allow the fiber optic shelf assembly to support relatively large optical fiber connections as discussed below. FIGS. 32 and 34-36 depict rear perspective views of various fiber optic shelf assemblies having a plurality of furcation bodies of fiber optic cable assemblies secured therein and FIG. 33 is a schematic representation of a fiber optic shelf assembly. More specifically, FIGS. 32 and 34-36 depict fiber optic shelf assemblies employing clips 280 or 280', which allow for higher furcation body packing in a given space since clips 280 and 280' have a width that is similar to the width of the furcation body. In other words, the clips may be spaced closer together on the mounting surface since there is no extending mounting feature(s). Other structures and/or configurations for mounting the furcation bodies are possible as disclosed herein and the description and illustrations of fiber optic shelf assemblies showing clips 280 and 280' is merely for explanatory purposes and not limitation.

For instance, clip 280' (FIG. 16G) is advantageous since it allows stacking of multiple furcation bodies therein, thereby doubling the density compared with clip 280. Further, clip 280' is advantageous for high density solution where the associated furcation plugs and clip is sized to fits within a 1 U shelf space as discussed below. In one embodiment, the fiber optic shelf assemblies or the like may have a one-to-one correspondence between a plurality of respective modules and respective fiber optic cable assemblies as shown by FIG. 32, but other arrangements are possible. The one-to-one correspondence is advantageous for the craft because it simplifies labeling and port mapping to the modules (i.e., one fiber optic cable assembly per module). By way of example, the one-to-one correspondence simplifies moves, additions, and/or changes to the optical network, thereby saving time and reducing complexity.

By way of example, FIG. 32 illustrates a fiber optic shelf assembly 400 having a furcation management structure 402 for securing a plurality of furcation bodies 403 of respective fiber optic cable assemblies 406 within the fiber optic shelf using a plurality of clips 280. In this embodiment, furcation management structure 402 includes two furcation platforms (not numbered) mounted on opposing sides of the fiber optic shelf assembly 400 so that the fucation bodies 403 are oppositely facing each other within the fiber optic shelf assembly. Stated another way, the furcated legs 407 of fiber optic cable assemblies 406 are directed toward the middle of the fiber optic shelf assembly for routing to the rear of a plurality of respective modules 410. As shown, respective furcated legs 407 of the fiber optic cable assemblies 406 each have a respective multi-fiber ferrule 408 such as a twelve fiber connector that connects with a respective module 410, thereby providing a one-to-one correspondence between the modules 410 and fiber optic cable assemblies 406 (i.e., each fiber optic cable assembly has twelve optical fibers). In this embodiment, the fiber optic shelf assembly 400 has a 1 U footprint and each furcation platform accommodate four clips 280.

However, other 1 U embodiments of fiber optic shelf assembly 400 could include more modules such as twelve modules disposed in three trays and each platform could accommodate six clips 280, thereby providing a one-to-one correspondence and supporting up to 144 optical connections or more. Further, a relatively large number of furcation bodies may be secured in the 1 U shelf space/footprint using the concepts disclosed herein. FIG. 33 is a schematic representation showing a 1 U shelf space having twelve modules each represented by a plurality of respective rectangular spaces 512 and supported by fiber optic cable assembly, clips, furcation mounting structures, etc. as disclosed herein. Within rectangular spaces 512 are a plurality of front-side connector footprints 514 that represent individual connector ports on modules represented by rectangular spaces 512. Connector footprints 514 may have any suitable configuration such as LC, duplexed LC, SC, duplex SC, MT (i.e., multiple fiber connectors) of various fiber counts such as 4-fiber, 8-fiber, 12-fiber, 24-fiber, etc. For the sake of simplicity, each module has four connector footprints 514 with ellipses therebetween for representing any desired number of connector footprints 514 on rectangular spaces 512. By way of example, each rectangular space may have six duplexed LC connections, four 12-fiber MT connectors, four 24-fiber MT connectors, or any other suitable connector configuration as represented by connector footprints 514. For the sake of brevity and simplicity, Table 1 below summarizes several configurations of fiber optic shelf assemblies having a 1 U shelf space that may support the given number of optical fiber connections using clips 280 or 280'.

TABLE 1

Explanatory Embodiments Per 1U Rack Space and Supported Optical Connections

| Fiber Count of Cable Assembly | # of Furcation Bodies per Clip | # of Fibers Per Clip | # of Clips within Shelf Assembly | # of Optical Connections Supported |
| --- | --- | --- | --- | --- |
| 12 | 2 | 24 | 12 | 288 |
| 24 | 2 | 48 | 12 | 576 |
| 36 | 2 | 72 | 12 | 864 |
| 48 | 1 | 48 | 12 | 576 |
| 72 | 1 | 72 | 12 | 864 |
| 96 | 1 | 96 | 12 | 1152 |
| 144 | 1 | 144 | 12 | 1728 |

By way of explanation, the first row of Table 1 discloses using fiber optic cable assemblies 406 that each include twelve optical fibers, thereby allowing the mounting of two furcation bodies 403 in one clip 280' within a 1 U shelf space. Consequently, the given fiber optic shelf assembly has twenty-four optical fibers per each of twelve clips 280', thereby supporting up to 288 optical fiber connections. Typically, the furcation body increases in size at a certain optical fiber count of the fiber optic cable assemblies due to space restrictions of the furcation body. Moreover, using clips that secure stacked furcation bodies (i.e., two or more furcation bodies per clip) may be limited based on the headroom of the 1 U shelf assembly with respect to the stacked furcation bodies. For instance, Table 1 makes the transition to a larger furcation bodies and single furcation body clips 280 at a fiber count of forty-eight optical fibers, but other transition points are possible. Typically, this headroom limitation is not an issue with larger shelf spaces such as a 2 U or 4 U shelf space. The values of Table 1 are for the purpose of illustration within a 1 U shelf space and can easily be increased in a number of ways. Simply stated, Table 1 is a scaling "per 1 U rack space" and can be increased for larger shelf spaces by multiplying number of supported optical fiber connections for the 1 U shelf space by the size of the given shelf space.

Figure 33A:
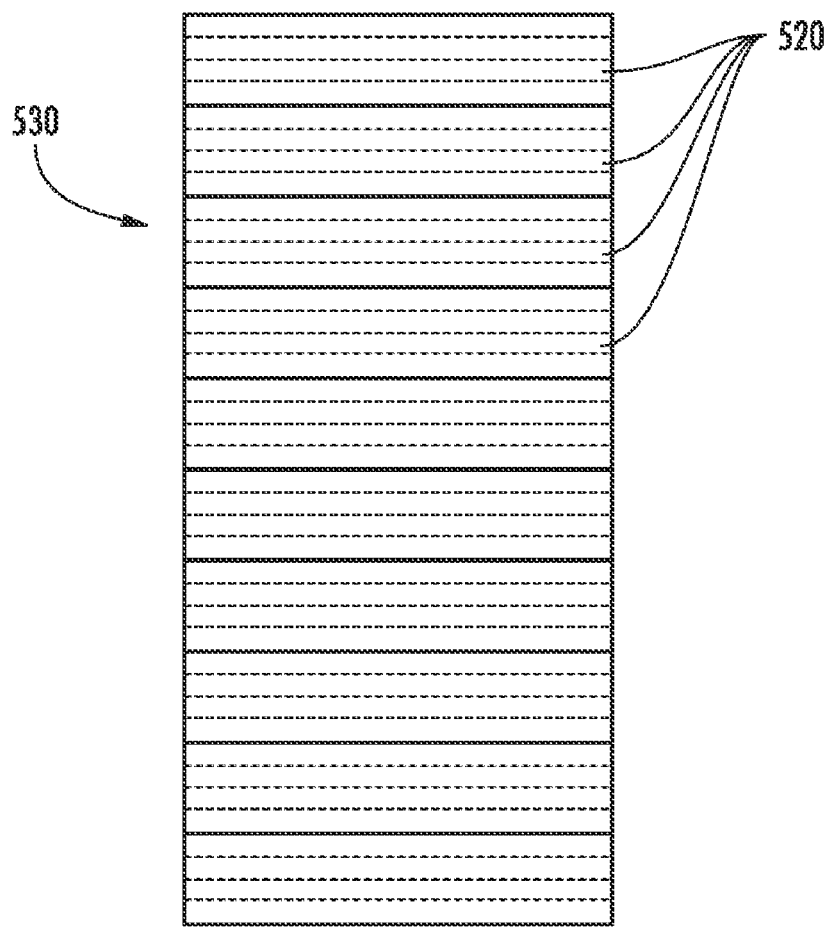

For instance, the number of supported fiber optic connections is increased by migrating to a larger shelf space such as a 4 U fiber optic shelf space may be calculated by simply multiplying Table 1 by a factor of 4 to scale up. By way of example, the schematic representation of FIG. 33 can be stacked four times to represent a 4 U fiber optic shelf assembly 520 as shown in FIG. 33A, which depicts ten 4 U fiber optic shelf assemblies 520 mounted in a rack 530 (the dashed lines represent a 1 U shelf space). Thus, if connector footprint 514 (not shown for purposes of clarity) of the 4 U shelf configuration represents a twenty-four fiber connector footprint, then the 4 U fiber optic shelf assembly 520 supports up forty-eight rectangular spaces 512 (which represent modules) with each rectangular space 512 supporting up to ninety-six optical connections (twenty-four fiber connector times four connectors per module). Thus, each 4 U fiber optic shelf assembly 520 supports up to 4608 optical fiber connections (96 optical fiber connections times 48 modules) and rack 530 can support up to 46,080 optical fiber connections. Of course, this is only a representative explanatory example and the other rows of Table 1 can also be scaled up to a 2 U shelf space, 4 U shelf, or rack accordingly to arrive at a multitude of different optical fiber count.

Additionally, fiber optic shelf assemblies supporting different numbers of optical connections are possible as discussed below. Illustratively, FIG. 34 depicts a fiber optic shelf assembly 400' having a furcation management structures 402 for securing a plurality of furcation bodies 403 of respective fiber optic cable assemblies 406 within the fiber optic shelf using a plurality of clips 280'. Fiber optic shelf assembly 400' is a 1 U shelf assembly having a height H of about 1.75 inches like fiber optic shelf assembly 400, but it includes six clips 280' mounted on each furcation management structure 402, thereby increasing the furcation body density. In other words, one furcation management structure 402 secures up to twelve furcation bodies 403 of fiber optic cable assemblies 406 within fiber optic shelf assembly 400'. Consequently, the two furcation management structures 402 of fiber optic shelf assembly 400' secure up to twenty-four furcation bodies 403. By way of example, the furcation management structure 402 can have a form-factor as small as about 3.25 inches by 5.5 inches (83 millimeters by 140 millimeters) and fit within a 1 U shelf space while securing at least twelve furcation bodies 403. Of course, the furcation management structure can have a larger size and/or a standard size with the same number of apertures for securing furcation bodies thereto while still accommodating mounting within the fiber optic shelf assembly. By way of example, a standard size for the furcation management structure may be about 7.5 inches by 9.375 inches and fit within a 1 U shelf space while securing up to twelve furcation bodies 403, but other standard sizes are possible. Moreover, the fiber optic cable assemblies 406 can have different fiber counts such as 12-fibers per cable assembly, 24-fibers per cable assembly, or other suitable number of fibers. Thus, the 1 U fiber optic shelf assembly 400' can have up to twenty-four furcation bodies secured therein and support up to 144 optical fiber connections, up to 288 optical fiber connections, or even more optical fiber connections in the fiber optic shelf assembly while still being readily accessible by the craft. In other words, the craft can simply pull back on guide arms and slid the clip out of the furcation management structure or open the cover of the clip and remove the desired furcation body.

The mounting density of fiber optic cable assemblies within the fiber optic shelf assembly may be increased in other ways while still providing ease of access for initial installation, moves, adds, and/or changes for the craft. For instance, FIG. 35 depicts a fiber optic shelf assembly 400" having a furcation management structures 422 for securing a plurality of furcation bodies 403 of respective fiber optic cable assemblies 406 within the fiber optic shelf using a plurality of clips 280'. Like fiber optic shelf assembly 400', fiber optic shelf assembly 400" is a 1 U shelf assembly having a height H of about 1.75 inches, but it includes twelve clips 280' mounted on each furcation management structure 422, thereby increasing the furcation body count therein. Simply stated, the number of clips secured within the fiber optic shelf assembly are doubled; and, thus, it is possible to double the number of supported optical fiber connections given in Table 1 to the extent there is connector space within the fiber optic shelf assembly. In other words, the two furcation management structures 422 of fiber optic shelf assembly 400" secure a total of up to forty-eight furcation bodies 403 using twenty-four clips within a 1 U shelf. The furcation management structure 422 can have any suitable size that accommodates mounting within the fiber optic shelf assembly. By way of example, furcation management structure 422 may have a footprint of about 7.5 inches by 9.375 inches and fit within a 1 U shelf space while securing at least twenty-four furcation bodies 403, but other sizes are possible. Moreover, the fiber optic cable assemblies 406 can have different fiber counts such as 12-fibers per assembly, 24-fibers per assembly, or other suitable number of fibers like disclosed in Table 1. Thus, the 1 U fiber optic shelf assembly 400" can have up to forty-eight furcation bodies secured therein and support up to 288 optical fiber connections, up to 576 optical fiber connections, or even more optical fiber connections in the fiber optic shelf assembly while still being readily accessible by the craft for initial installation, moves, adds and/or changes.

FIG. 36 depicts another fiber optic shelf assembly 420 having a plurality of furcation management structures 422 for securing a plurality of furcation bodies 403 of fiber optic cable assemblies 406 in a suitable arrangement. For instance, the cable assemblies 406 may include the one-to-one correspondence with a plurality of modules (not visible), but this is not necessary. In this embodiment, fiber optic shelf assembly 420 has a 4 U footprint with forty-eight fiber optic cable assemblies 406 secured within fiber optic shelf assembly 420 using two furcation management structures each having multiple levels for mounting clips 280'. Each clip 280' can secure two furcation bodies 403, thereby doubling the density of the furcation bodies secured by each furcation management structure compared with clip 280. Each fiber optic cable assembly 406 includes twelve optical fibers with a single multi-fiber connector that is connected to a respective module so that fiber optic shelf assembly supports up to 576 optical fiber connections. The number of furcation bodies secured by fiber optic shelf assembly 420 can be varied by using different combinations of clips 280 and/or 280', for instance, the number of secured furcation bodies can be reduced to twenty-four by substituting clips 280 for clips 280'.

FIG. 37 depicts another fiber optic shelf assembly 440 that is similar to fiber optic shelf assembly 420 by securing up to forty-eight furcation bodies, but it has a higher connectivity (i.e., supporting up to 1152 optical fiber connections) compared with fiber optic shelf assembly 420. Simply stated, the density is double by doubling the fiber count within the fiber optic cable assembly 406. Fiber optic shelf assembly 440 includes a plurality of furcation management structures 422 for securing a plurality of furcation bodies 403 of fiber optic cable assemblies 406. In this embodiment, fiber optic shelf assembly 420 has a 4 U footprint (e.g., 12 trays each with 4 modules in 4 U footprint) with forty-eight fiber optic cable assemblies 406 secured within fiber optic shelf assembly 420 using two furcation management structures each having multiple levels for mounting clips 280'. Each fiber optic cable assembly 406 includes twenty-four optical fibers with the furcated leg(s) 407 having one or more a multi-fiber connectors connected with a respective module, but other configurations are possible. Further, the number of furcation bodies and/or number of fiber optic connections can be increased by adding more furcation management structures to the fiber optic shelf assembly such as by mounting the furcation management structure to the top of the fiber optic shelf assembly or in other suitable locations. By way of example, four furcation management structures disposed within fiber optic shelf assembly 420 allows for securing up to ninety-six furcation bodies within the same.

FIG. 38 depicts a top view of furcation management structure 422 having a plurality of fiber optic cable assemblies 406 secured thereto using a plurality of clips 280. Furcation management structure 422 is used in suitable fiber optic shelf assemblies as disclosed herein and can include suitable mounting features similar to that illustrated with furcation platform 356 in FIG. 30. Likewise, furcation management structure 422 has a plurality of apertures (not visible) similar to apertures 299 shown in FIG. 16E. For instance, furcation management structure 422 has twelve apertures for securing up to twelve clips in a staggered arrangement between rows as shown, thereby allowing the fiber optic cables passage rearward out of the fiber optic shelf assembly. Furcation management structure 422 preferably has a relatively small footprint represented by a X-dimension and a Y-dimension as depicted. By way of example, the X-dimension is about 190 millimeters and the Y-dimension is about 235 millimeters, but the form-factor depends on the size of the clips, spacing of clips, size of the furcation bodies, etc. Thus, other suitable dimensions are possible for the furcation management structure. Likewise, the furcation management structure can have other suitable mounting features, layouts, and/or constructions. For instance, the apertures for the clips may be formed directly in a top or bottom of the fiber optic shelf assembly, rather than being a separate component. Moreover, the furcation management structure 422 may have any suitable size or shape to accommodate it within the fiber optic shelf assembly or have features for mounting it in other locations such as on a rack.

Many modifications and other embodiments of the invention set forth herein will come to mind to one skilled in the art to which the invention pertains having the benefit of the teachings presented in the foregoing descriptions and the associated drawings. These modifications include, but are not limited to, different types and sizes of fiber optic equipment, fiber optic cables, furcated legs, furcation bodies, attachment features, and securing devices. Therefore, it is to be understood that the invention is not to be limited to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

We claim:

1. A fiber optic shelf assembly having at least one furcation management structure for securing a plurality of furcation bodies of respective fiber optic cable assemblies within the fiber optic shelf, wherein the fiber optic shelf has a one-to-one correspondence between a plurality of respective modules and the respective fiber optic cable assemblies and a plurality of clips removably mounted to the furcation management structure, the plurality of clips each having a cavity to receive and hold at least one of the plurality of furcation bodies, thereby securing the plurality of furcation bodies to a furcation management structure.

2. The fiber optic shelf assembly of claim 1, wherein the fiber optic shelf can accommodate mounting at least twelve furcation bodies within the fiber optic shelf.

3. The fiber optic shelf assembly of claim 1, wherein the fiber optic shelf can support at least 144 optical fiber connections.

4. The fiber optic shelf assembly of claim 1, wherein the fiber optic shelf can accommodate mounting at least twenty-four furcation bodies within the fiber optic shelf.

5. The fiber optic shelf assembly of claim 1, wherein the fiber optic shelf can accommodate mounting at least forty-eight furcation bodies within the fiber optic shelf.

6. The fiber optic shelf assembly of claim 1, further including a plurality of furcation management structures for securing the plurality of furcation bodies.

7. The fiber optic shelf assembly of claim 1, the furcation management structure having multiple levels for mounting the plurality of furcation bodies.

8. The fiber optic shelf assembly of claim 1, wherein the plurality of clips have an attachment feature integrally molded therein.

9. The fiber optic shelf assembly of claim 1, wherein the plurality of clips include keyhole members.

10. The fiber optic shelf assembly of claim 1, wherein some of the plurality of clips can secure at least two furcation bodies of respective fiber optic cable assemblies.

11. The fiber optic shelf assembly of claim 1, wherein the fiber optic shelf supports at least one-hundred and forty-four optical fiber connections per 1U rack space.

12. The fiber optic shelf assembly of claim 1, further comprising at least two furcation bodies oppositely facing each other within the fiber optic shelf assembly.

* * * * *